(12) United States Patent
Kleinberger et al.

(10) Patent No.: US 8,611,006 B2
(45) Date of Patent: *Dec. 17, 2013

(54) SYSTEMS FOR THREE-DIMENSIONAL VIEWING AND PROJECTION

(75) Inventors: Paul Kleinberger, Jerusalem (IL); Ilan D. Kleinberger, Jerusalem (IL)

(73) Assignee: EHN Spire Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,549

(22) Filed: May 15, 2006

(65) Prior Publication Data

US 2006/0203339 A1 Sep. 14, 2006

Related U.S. Application Data

(63) Continuation of application No. 09/987,793, filed on Nov. 16, 2001, now abandoned, which is a continuation of application No. 09/750,702, filed on Jan. 2, 2001, now abandoned, which is a continuation of application No. 09/101,984, filed as application No. PCT/US97/00778 on Jan. 21, 1997, now Pat. No. 6,252,707, which is a continuation of application No. 08/657,227, filed on Jun. 3, 1996, now Pat. No. 5,822,117, which is a continuation-in-part of application No. 08/589,510, filed on Jan. 22, 1996, now Pat. No. 5,973,831.

(51) Int. Cl.
*G02B 27/26* (2006.01)
*G02B 27/22* (2006.01)
*H04N 13/04* (2006.01)

(52) U.S. Cl.
USPC .............. 359/465; 359/462; 348/57; 348/58; 349/15

(58) Field of Classification Search
USPC ......... 359/465, 462, 464; 348/57, 58; 349/15, 349/129; 353/8
See application file for complete search history.

(56) References Cited

U.S. PATENT DOCUMENTS

| 2,218,875 A | | 10/1940 | Parsell |
|---|---|---|---|
| 2,631,496 A | * | 3/1953 | Rehorn ........................ 359/465 |
| 2,820,395 A | | 1/1958 | Rehorn |
| 2,974,562 A | | 3/1961 | Rosenbloom |
| 3,858,001 A | * | 12/1974 | Bonne ............................ 348/57 |

(Continued)

FOREIGN PATENT DOCUMENTS

| DE | 4123895 | 1/1993 |
|---|---|---|
| EP | 0595023 | 5/1994 |

(Continued)

OTHER PUBLICATIONS

Official Action Dated Nov. 14, 2005 From the US Patent and Trademark Office Re.: U.S. Appl. No. 09/987,793.

(Continued)

*Primary Examiner* — Audrey Y Chang

(57) ABSTRACT

Systems for three-dimensional viewing and projection aimed at full-color flat-screen binocular stereoscopic viewing without the use of eyeglasses for the viewer. According to the invention, light emanating from a display or projected thereat presenting a left image and a right image is directed only to the appropriate left or right eyes of at least one viewer using various combinations of light polarizing layers and layers of light rotating means.

20 Claims, 32 Drawing Sheets

(56) References Cited

U.S. PATENT DOCUMENTS

| | | |
|---|---|---|
| 4,111,695 A | 9/1978 | Yevick |
| 4,671,632 A | 6/1987 | August |
| 4,719,482 A | 1/1988 | Hora |
| 4,719,507 A | 1/1988 | Bos |
| 4,792,850 A | 12/1988 | Liptoh et al. |
| 4,807,965 A | 2/1989 | Garakani |
| 4,829,365 A | 5/1989 | Eichenlaub |
| 4,873,516 A | 10/1989 | Castleberry |
| 4,957,351 A | 9/1990 | Shioji |
| 5,002,387 A | 3/1991 | Baljet et al. |
| 5,050,961 A | 9/1991 | Venolia |
| 5,083,851 A | 1/1992 | MacDonald |
| 5,113,285 A | 5/1992 | Franklin et al. |
| 5,126,878 A | 6/1992 | Trumbull |
| 5,146,246 A | 9/1992 | Marks |
| 5,245,319 A | 9/1993 | Kilian |
| 5,264,964 A * | 11/1993 | Faris ............................. 359/465 |
| 5,311,220 A | 5/1994 | Eichenlaub |
| 5,315,377 A * | 5/1994 | Isono et al. ..................... 348/51 |
| 5,537,144 A | 7/1996 | Faris |
| 5,629,798 A | 5/1997 | Gaudreau |
| 5,706,062 A | 1/1998 | Stolov |
| 5,717,522 A * | 2/1998 | Hattori et al. ................. 359/465 |
| 5,757,546 A * | 5/1998 | Lipton et al. .................. 359/464 |
| 5,822,117 A * | 10/1998 | Kleinberger et al. ......... 359/465 |
| 5,825,541 A | 10/1998 | Imai |
| 5,861,931 A * | 1/1999 | Gillian et al. .................. 349/129 |
| 5,875,055 A | 2/1999 | Morishima et al. |
| 5,917,539 A * | 6/1999 | Sorensen et al. ................ 348/56 |
| 5,917,562 A * | 6/1999 | Woodgate et al. .............. 349/15 |
| 5,973,831 A * | 10/1999 | Kleinberger et al. ......... 359/465 |
| 6,094,216 A * | 7/2000 | Taniguchi et al. .............. 348/51 |
| 6,195,205 B1 * | 2/2001 | Faris ............................. 359/465 |
| 6,252,707 B1 * | 6/2001 | Kleinberger et al. ......... 359/465 |
| 2001/0013971 A1 | 8/2001 | Kleinberger et al. |
| 2006/0203339 A1 | 9/2006 | Kleinberger et al. |

FOREIGN PATENT DOCUMENTS

| | | |
|---|---|---|
| JP | 03-119889 | 5/1991 |
| JP | 05-257083 | 10/1993 |
| JP | 06-217347 | 8/1994 |
| JP | 07-043666 | 2/1995 |
| JP | 07-092936 | 4/1995 |
| JP | 07-311364 | 11/1995 |
| JP | 07-322304 | 12/1995 |
| JP | 09-101482 | 4/1997 |
| JP | 09-197344 | 7/1997 |
| WO | WO 97/26577 | 7/1997 |

OTHER PUBLICATIONS

Official Action Dated Dec. 2, 2008 From the US Patent and Trademark Office Re.: U.S. Appl. No. 11/433,549.

Official Action Dated Mar. 17, 2008 From the US Patent and Trademark Office Re.: U.S. Appl. No. 11/433,549.

Official Action Dated Sep. 26, 2007 From the US Patent and Trademark Office Re.: U.S. Appl. No. 11/433,549.

Official Action Dated Jan. 18, 2007 From the US Patent and Trademark Office Re.: U.S. Appl. No. 11/433,549.

International Search Report for PCT/US97/00778, mailed Apr. 16, 1997.

* cited by examiner

FIG. 1
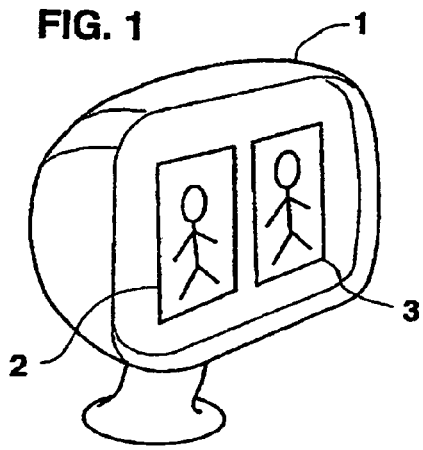
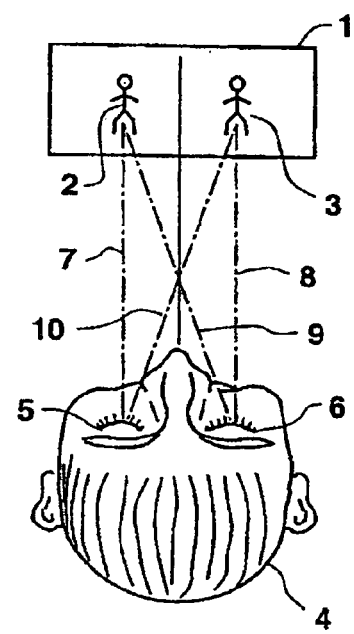
FIG. 2
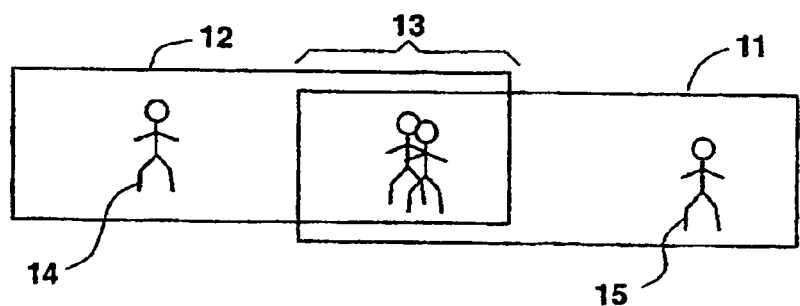
FIG. 3

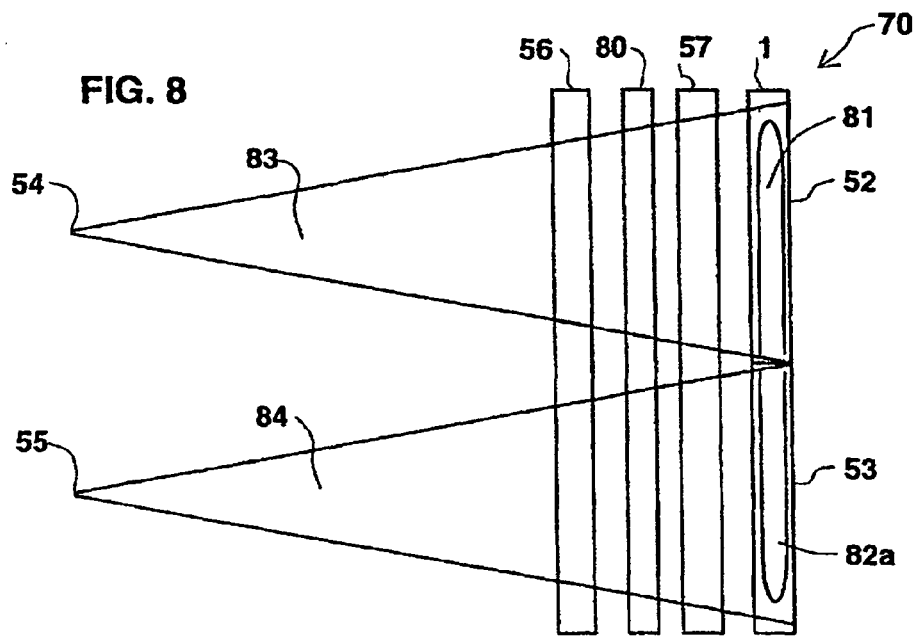
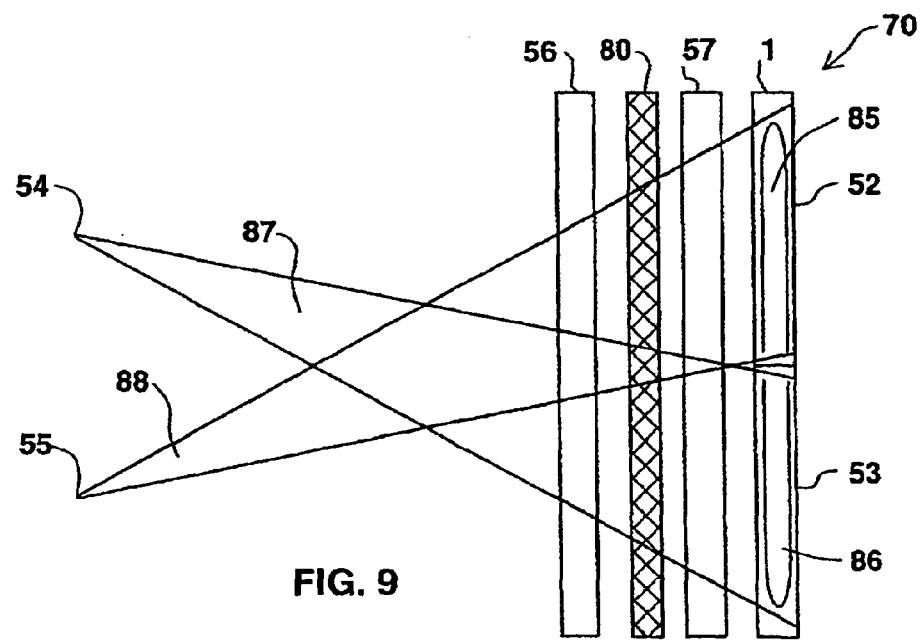

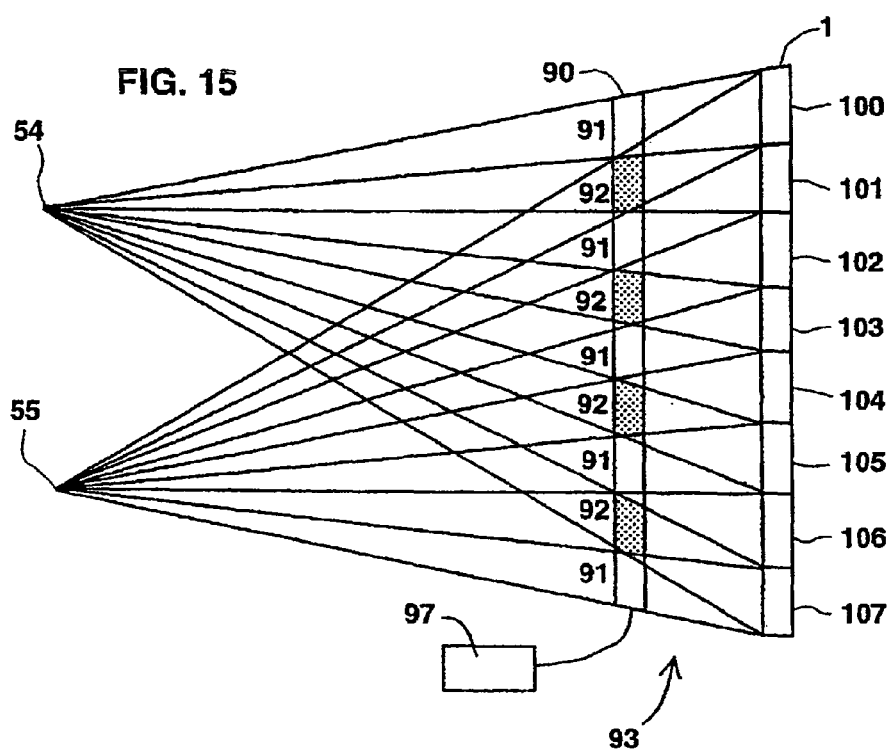

SYSTEMS FOR THREE-DIMENSIONAL VIEWING AND PROJECTION

RELATED APPLICATIONS

This is a continuation of U.S. patent application Ser. No. 09/987,793, filed on Nov. 16, 2001, which is a continuation of U.S. patent application Ser. No. 09/750,702, filed on Jan. 2, 2001, now abandoned, which is a continuation of U.S. patent application Ser. No. 09/101,984, filed on Jul. 21, 1998, now U.S. Pat. No. 6,252,707, which is a National Phase of PCT Patent Application No. PCT/US97/00778, filed on Jan. 21, 1997, which is a continuation of U.S. patent application Ser. No. 08/657,227, filed on Jun. 3, 1996, now U.S. Pat. No. 5,822,117, which is a continuation-in-part of U.S. patent application Ser. No. 08/589,510, filed on Jan. 22, 1996, now U.S. Pat. No. 5,973,831. PCT Patent Application No. PCT/US97/00778, also claims priority from Israel Patent Application No. 119437, filed on Oct. 16, 1996. The contents of the above applications are all incorporated by reference.

FIELD AND BACKGROUND OF THE INVENTION

The present invention relates in general to systems for three-dimensional viewing and projection. More particularly, the present invention relates to systems for three-dimensional viewing and projection which can be used by one or more viewers to obtain a perception of depth while viewing still or motion pictures needless of use of eyeglasses.

Various attempts have been made over the years to develop and implement methods and apparatuses to represent scenes and objects in a manner which produces a sense of depth perception, known in the art as three dimensionality.

Aside from methods involving rotating objects, rotating mirrors, and the like (usually classified as 'depth illusion' in the American patent classification scheme), and methods involving holographic techniques or using coherent light sources, the methods used involve a variety of schemes for transporting two different images to a viewer's left and right eyes. The two different images are typically produced by two cameras placed side by side in a manner which in turn simulates the vision of two human eyes.

The mammalian vision system, as well known, employs the differences between a given scene as perceived by the right eye and the same scene as perceived by the left eye, to extract information regarding the distance of objects within the scene relative to the viewer. Since objects close to the viewer appear displaced to the right in the view seen by the left eye, and the very same objects appear displaced to the left in the view seen by the right eye, while more distant objects show less such displacement and most distant objects show no such displacement at all, it is possible to calculate the distance of objects within the scene as a function of the amount of lateral displacement observed, and this, apparently, is what the human visual system does in our normal binocular (i.e., three-dimensional) vision of the world.

When a pair of images containing an appropriate parallax information is presented, one image to the left eye and the other to the right eye, a similar experience of apparent depth perception results. In the following, an image intended for the left eye is referred to as a 'left image', and an image intended for the right as a 'right image'.

The prior art of three-dimensional viewing may be broken into categories as follows. The first category includes hand-held viewing apparatuses (known in the art as 'viewers') of various sorts, based on lenses, prisms, mirrors, or combinations thereof, which viewers are held close to the eyes and deliver an appropriate image to each of the eyes. The second category includes methods aimed at viewing images without optical apparatus held next to the eye (i.e. without eyeglasses and/or viewers), which methods are based on interposing a plurality of lenticular elements in the display. The third category includes systems involving eyeglasses worn by the viewer, which eyeglasses filter light according to its polarization. The fourth category includes systems involving eyeglasses worn by the viewer, which eyeglasses filter light according to wavelength (i.e., color). The fifth category includes systems involving eyeglasses worn by the viewer and employing switching mechanisms capable of rapid on/off switching (i.e., shutter systems) of optical elements. The sixth category includes side-by-side implementations such as random-dot stereograms. And finally, the seventh category includes methods employing flat screens for viewing images without a need for optical apparatus to be held next to the eye (i.e. without eyeglasses and/or viewers) and not involving lenticular surfaces. These methods are based primarily on interposing physical impediments arranged in a flat screen placed between the viewer and the image to be viewed, which impediments hide part of an image from one eye while allowing it to be seen by the other eye.

Each of the above listed categories has its associated inherent disadvantages as follows.

As far as the first category is of concern, viewing apparatuses of the sort which require lenses, prisms, or mirrors held in proximity with the viewer's eyes, are generally less convenient than alternatives which do not require special eyewear and do not require the viewer using them to hold the apparatus or to approach his eyes to special eyepieces. As the invention here disclosed involves no necessary use of lenses, prisms, or mirrors, and does not require the viewer to look through a viewing apparatus placed or held near the eyes, it is basically dissimilar and advantageous over apparatuses thus categorized.

As far as the second category is of concern, lenticular systems are relatively difficult and expensive to manufacture for high quality image presentation due to the amount of precision associated with their production, if high-resolution images are desired. Moreover lenticular systems will always present images having a lower resolution than the resolution of which the display device to which the lenticular array is attached to is inherently capable. Evidently, lenticular systems are not well adapted for viewing systems such as computer displays and television and are therefore not in wide use. U.S. Pat. No. 4,957,351 to Shioji discloses an example of the second category, describing the use of a lenticular system, in which alternating lines representing parts of left and right images are refracted, each line through an associated lens, which directs it selectively to the right or left eyes.

As far as the third through fifth categories are of concern, they all require the use of eyeglasses or an equivalent by the viewer. The term 'eyeglasses' is referred to herein in a general sense of an optical apparatus having left and right eyepieces held close to the eyes of the viewer in such a way that substantially all the light entering the left eye is subject to an influence imposed by the left eyepiece, and all the light entering the right eye is subject to an influence imposed by the right eyepiece. As mentioned, three-dimensional systems thus categorized all require the use of eyeglasses, which select, whether by color (wavelength), timing (shutter), or polarization, the images reaching each of the eyes. These categories include apparatuses having a form of conventional eyeglasses (e.g., ones used for reading), but also include devices such as, but not limited to, pilot helmets having head-up displays (HUD), virtual-reality headgears and similar designs. As mentioned, systems falling into these categories share a common disadvantage, they all require an inherent use of special eyeglasses or a headgear. The necessity for optical apparatus held near the eyes subtracts from the pleasure, comfort and naturalness of the experience of viewing the display, and may, depending on the system used, add significantly to the expense.

As far as the third category is of concern, polarizing eyeglasses deal with arrangements in which a display system polarizes light derived from the left image in a given particular orientation and polarizes light derived from the right image in another particular orientation. Accordingly, the viewer wears a set of polarizing filters one for each eye. The filter of the left eye passes light polarized in the particular orientation in which the left image was polarized, whereas the filter of the right eye passes only light polarized in the particular other orientation in which the right image was polarized. Consequently each eye sees only the image appropriate to it and does not see the image which is inappropriate to it, thus a three-dimensional image is viewed by the viewer. U.S. Pat. No. 5,113,285 to Franklin discloses a system using polarizing eyeglasses to provide the left and right images to the appropriate eyes. U.S. Pat. No. 4,719,507 to Bos discloses a system employing polarizing eyeglasses to distinguish between the left and right images, and also uses switchable rotating means to determine, in a temporal sequence, which image receives which polarization. These and similar systems have the disadvantage of requiring use of polarizing eyeglasses. Certain further disadvantages characterize systems which use polarizing glasses yet do not use switching means (c.f., fifth category). U.S. Pat. No. 5,050,961 to Venolia, provides an example, and is representative of various others. According to the invention of Venolia, the display area is divided into subregions with left image and right image segments. Further according to Venolia, small polarizing sub-units process the light emanating from each subregion of the display, and the division of the image into left and right image areas coincides with the orientation of the polarizing means employed in a first layer, such that all the light emanating from the right image is polarized in a first orientation, while light emanating from the left image is polarized in a second orientation perpendicular to the first orientation. The user wears polarizing eyeglasses, so that each eye sees the appropriate image segments and only those. An inherent disadvantage associated with such schemes is that part of the display surface is blocked from the view of each eye. In better cases where the image segments are small the blockage is experienced not as holes in the picture but as a graininess or low resolution of the three-dimensional image viewed. On the other hand, systems aimed at ensuring that all areas of the display space will be used in representing each of the left and right images (sequentially if not simultaneously) tend to be somewhat complex and are potentially relatively expensive to manufacture. U.S. Pat. No. 5,083,851 to MacDonald provides an example of a system with undoubted qualities but which might be expensive to implement. Yet, a system which could provide similar services in a comparatively simple and inexpensive manner would be of service in many applications.

For sake of completeness it is worthy to mention the artificial three-dimensional experience best known to the public. This is the traditional three-dimensional movie (i.e., 3D-movie), in which a projection system projects full images of the right and left images simultaneously onto a common display (typically a reflective movie screen). Such traditional 3D-movies are presently displayed in for example Disneyland. This projection system has the advantage that each eye sees a continuous and uninterrupted image. Yet, this projection system has the disadvantages of (i) requiring the viewer to wear eyeglasses, and (ii) requiring special projection devices which involve two projectors (or a specially designed single projector having the effect of two projectors) simultaneously projecting related pairs of images onto the screen. Thus, this method calls for special projection equipment and, since it requires two separate light sources, it is not adaptable to standard computer displays nor to television displays.

As far as the fourth category is of concern, optical filters result in a right image made up of and substantially limited to particular wavelengths passed by a filter covering the right eye, and in a left image made up of and substantially limited to particular different wavelengths passed by the filter covering the left eye. Thus, in addition to the disadvantage of requiring the use of eye glasses, these systems prevent the use of natural color images.

As far as the fifth category is of concern, shutter systems are mechanisms consisting of elements capable of either blocking light or passing light, or of elements capable of rotating the orientation of polarized light (collectively referred to herein as switchable means). In both cases the mechanisms are capable of being switched on/off rapidly. In use, the switching of the mechanisms is coordinated with changes in the images being displayed, usually in such manner that the left image is displayed when the left eye's vision of the screen is enabled and the right eye's vision is blocked, and at a later time the right image is displayed when the right eye's vision is enabled and the left eye is blocked, wherein switching is intentionally rapid enough so that the persistence of human vision leaves the viewer with an impression of a continuous image. It should be noted that if switching would have been slower, an impression of flickering would have resulted. Accordingly, U.S. Pat. No. 5,002,387 to Baljet; U.S. Pat. No. 5,083,851 to MacDonald; and U.S. Pat. No. 5,245,319 to Kilian, provide examples of systems characterized by alternating eye 3D-glasses, alternating between left and right lens transmissiveness and synchronizing the left lens transmissiveness to left images and right lens transmissiveness to right images. Yet, these methods involve eyeglasses obligatorily worn by the viewer. This inherent obligation however is a primary disadvantage. Additional disadvantages of these systems include the complexity and thus expense of the shutter eyeglasses which must be connected to the display apparatus and simultaneously controlled, or alternatively (e.g. MacDonald) the increased complexity and expense of the display hardware itself. To avoid the use of complex eyeglasses U.S. Pat. No. 4,719,507 to Bos discloses an arrangement which allows use of passive polarizing filters in the eyeglasses, putting the more complex and high-voltage apparatus into the display device. U.S. Pat. No. 4,792,850 to Liptoh discloses a similar arrangement using circular light polarization. Nevertheless, these solutions have the disadvantage of making the entire screen appear and disappear to each eye during each cycle, which tends to increase the impression of flickering of the screen. As before, the principle disadvantage of the systems described by Bos and Liptoh is their dependence on eyeglasses worn by the viewer.

As far as the sixth category is of concern, side-by-side implementations such as for example random dot stereograms are essentially methods for utilizing parallax information, are difficult to see for many viewers, convey only simplified images, and cannot convey color. According to these methods a simple colorless image is combined with a complex background pattern, the background pattern substantially repeating itself at an interval less than the interpupillary distance of human observers, and the pattern being modified by the simplified image in such a way that elements of the simple image intended to be seen as being closer to the viewer cause corresponding areas of the repeating pattern of the complex background to be displaced towards each other. That is, if for example the background pattern would in large part repeat itself every inch, then an area representing a close object repeats itself at a distance of $^{19}\!/_{20}$ inch, and an area intended to appear further away repeats itself at a distance of $^{21}\!/_{20}$ inch. The viewer, often with some difficulty, views the stereogram by directing his right eye to some given area of the repeating pattern, and his left eye to an adjacent area of the repeating pattern, to the left of the point seen by the right eye. Since the patterns substantially repeat themselves, the viewer is (usually) able to coalesce the images. Thus the left eye is provided with a left image which is different (since it originates e.g. an inch away on the stereogram) from the right image. The eyes then have the ability to extract the information based on the consistent differences between the two images, and understand it in terms of the simplified scene which is in fact included in the stereogram only as modifications in the position of elements of the background pattern. Normal images have also been included in published stereograms, for example in the "Magic Eye" series of books published by Michael Joseph Ltd., London. In this case sets of normal full-color images with differing parallax information are included in the published image in such a way that they can be viewed by the viewer's directing his eyes in the same manner as he directs them for viewing a stereogram, namely by directing his right eye to a given image, and directing his left eye to a similar neighboring image which is physically next to the first, and differs from it in that it contains a different parallax view of the same scene.

As far as the seventh category is of concern, flat screens for three-dimensional viewing are disclosed in several recent patents. These patents disclose systems in which grids consisting of transparent sections interspersed with opaque sections are placed in various relationships to the image being seen or projected, the image is an interspersed composition of regions taken from the left image (i.e., to be eventually seen only by the left eye of the viewer) and regions taken from the right image (i.e., to be eventually seen only by the right eye of the viewer), the grid or grids being placed in positions which hide regions of the right image from the left eye and hide regions of the left image from the right eye, while allowing each eye to see sections of the display which are showing regions originating from its appropriate image. For example, U.S. Pat. No. 4,671,632 to August, discloses a system for using a "line screen", August's system includes vertical blocking portions alternating with vertical transparent portions, and a second blocking screen parallel to the first line screen, also composed of blocking portions and transparent portions. However, August's embodiments (as described in FIGS. 11, 12, and 13 therein) suffer from a major drawback that large percentages of the field of view of each eye (well more than half, according to August's drawings) are hidden from the eye at any given time, yielding a grainy low-resolution image. U.S. Pat. No. 5,264,964 to Faris, discloses a method for creating a parallax barrier by placing pairs of small polarizing regions one immediately above the other and of opposite polarization orientation, thus creating opaque regions, and also describes an embodiment in which simple opaque regions are used in place of the pairs of polarizing regions. In both cases a barrier is created with transparent regions alternating with opaque regions, with size and spacing adjusted such that the left and right eyes looking through the transparent regions of the barrier each sees a different pixel on the display layer, thus creating the possibility for supplying each eye with elements of the left and right image which are appropriate to it. However, Faris' invention is limited to a fixed position of the viewer with respect to the display during the whole time of viewing. The images viewed in an eyeglassesless mode in accordance with Faris' invention are inevitably grainy, since they always include at least 50% of areas which have no image, corresponding to the areas in which each eye's vision is blocked by the opaque parts of the barrier. U.S. Pat. No. 5,146,246 to Marks, discloses a method in which a raster grid is used to block narrow strips of image from one eye and show them to the other eye, while distributing the images in such a way that portions of the right image are visible to the right eye and portions of the left image are visible to the left eye. This is basically a projection system using a diffusion screen between two raster structures alternating opaque and transparent sections, and as such, is similar to some of the embodiments described by Faris. It, however, shares the limitations noted above, i.e., a significant percentage of the field of view is occupied by opaque regions which do not transmit either image, thereby limiting the resolution of the visible image and producing graininess.

There is thus a widely recognized need for, and it would be highly advantageous to have, systems for three-dimensional viewing and projection which can be used by a viewer to obtain a perception of depth while viewing still or motion pictures needless of use of eyeglasses, which systems devoid the above mentioned limitations.

DEFINITIONS OF TERMS

For the sake of clarity terms to be used herein in this document are defined as follows.

"Frame": a display or a part of a display to be three-dimensionally viewed.

"Left image": the image to be seen by the left eye of the viewer. In embodiments of the present invention used for producing the illusion of depth, this would correspond to the image seen by the left eye, captured for example by a camera playing the role of the left eye and placed near (typically to the left of) a second camera playing the role of the right eye, or to an image created by drawing, computer graphics, or other non-photographic means, which image contains parallax information appropriate to the left-hand position of a pair of images which, when viewed together and combined by the human perceptual system into a single image, give the illusion of depth. Note that this description is given for clarity only, and is not intended to limit the scope of the invention to the display of left and right images of any particular origin. The left image may be a still image, or one of a sequence of images displayed one after another to constitute a motion picture.

"Right image": the image intended to be seen by the right eye. The right image may be a still image, or one of a sequence of images displayed one after another to constitute a motion picture.

"3D-image": a three-dimensional image as viewed by a viewer according to any of the embodiments of the present invention.

"Display": a medium by which an image as defined hereinabove is initially presented. Suitable displays include but are not limited to display screens such as light reflecting means, a translucent screen, or light-emitting means, such as a CRT screen or an LCD screen. The nature of the "display" as used herein is not limited to these examples, nor is the invention described herein limited to the use of any particular technology of display. In particular, the meaning of "display" is not limited to means traditionally used for displaying three-dimensional images and motion pictures. Thus, for example, outdoor advertising displays and pictures such as those printed on cards or in books or magazines, are all additional examples of "display" relevant to certain embodiments of the invention described hereinbelow.

"Polarizing means": this term includes any linear polarizing means which block light whose angle of vibration is in one direction (i.e., orientation) while passing light whose angle of vibration is in another direction. The term also includes means which convert linearly polarized light into circularly polarized light, means which convert circularly polarized light into linearly polarized light, and means which pass light which is circularly polarized in one sense but do not pass light which is circularly polarized in the other sense.

"Light rotating means" are also known in the art as "light retarding means" and as "phase retarding means". As used herein, these terms refer in particular to means which change by 90 degrees the orientation of linearly polarized light, or which change the sense of circularly polarized light, converting right-handed polarized light into left-handed polarized light or left-handed polarized light into right-handed polarized light. When the concept 'active or inactive in light rotation' is used herein in this document and especially in the claims section below it also refers to a situation where in the inactive state the light is rotated m degrees and in the active state it is rotated m+90 degrees.

"Switchable light rotating means" are light rotating means whose light rotating effect can be turned on/off under electronic control, as under the Kerr effect. Thus light rotating means is defined 'on' when it rotates light and 'off' when it does not rotate light. Thus, 'on' and 'off' as used herein refers to the presence or absence of the optical phenomenon of light rotating effect, not to the presence or absence of an electrical field which controls the effect. When the phrases 'active/inactive in light rotation' are used herein in this document and especially in the claims section below it also refers to a situation where in the inactive state the light is rotated m degrees and in the active state it is rotated m+90 degrees.

"Shutter means": this term is taken to include any means by which particular portions of a screen or layer of material can be made to be substantially transparent, and at other times can be made to be substantially opaque, under the control of switchable means. This might, for example, be accomplished by a unit of switchable light rotating means (as defined above) sandwiched between two layers of linear polarizing means, both layers oriented in a given same direction. Such an arrangement is opaque or transparent depending on whether the light rotating means is on or off. This example, however, is given for the sake of clarity, yet the nature of the "shutter means" as used herein is not limited to this example nor to any particular technology of shutter means. Thus a solid material having transparent holes which is translated relative to the image as defined hereinabove can also be used as suitable shutter means in some of the embodiments of the present invention.

"Eyeglasses": the term is used throughout in this document as a shorthand way of referring to any arrangement which provides for optical means which are physically close to the viewer's eyes, and particularly those which are such that most or all of the light emanating or reflected from the display and directed towards the left eye, enters optical means located in front of the left eye, before reaching it, whereas most or all of the light emanating or reflected from the display and directed towards the right eye enters optical means located in front of the right eye before reaching it. Thus, eyeglasses as used herein includes the polarizing glasses and color-filter glasses traditional employed in the field of stereoscopy, yet the term also includes headsets, arrangements which place mirrors or lenses or prisms in close proximity with the eyes, and so forth.

"Viewer" is an individual facing and viewing the display.

An "appropriate image" for the viewer's left eye is the left image as defined above, whereas an "appropriate image" for the viewer's right eye is the right image as defined above. "Inappropriate images" are the right image with respect to the left eye and the left image with respect to the right eye. "Appropriate eye" and "inappropriate eye" are terms derived from the above description.

"Viewing stereoscopically" means in particular the viewing of pairs of left and right images containing appropriate parallax information, such that when the viewer views the images simultaneously or nearly simultaneously, and in the process of his viewing coalesces the two images into a single image gestalt in the manner well known in the art of stereoscopy, the result is a single perceived image giving the illusion of depth, as defined hereinabove a 3D-image. However, the term viewing stereoscopically as used herein is not limited to pairs of images containing such parallax information, it is intended to apply to any pair of images which can be so coalesced and give the viewer the impression of a single image containing information from two sources.

"Color Filters": Some embodiments of the invention utilize elements which are transparent to light within a certain range of wavelengths, but block light within other range(s) of wavelengths. The term "color filter" refers to any such element.

The present invention is couched in terms of linear light polarization. However, it is clear to one ordinarily skilled in the art that various aspects of the embodiments of the invention described hereinbelow can be effected using circular light polarization. Thus, for example, referring to embodiments of the invention wherein a light polarizing layer is placed close to a display, the layer may in fact include a linear polarizing layer coupled with a suitably aligned quarter-wave light retarding means, converting the linear polarized light into circular polarized light. Reference to light linearly polarized in a particular orientation can then be taken to refer to light circularly polarized in a particular sense (i.e., left-handedness or right-handedness). Referring to embodiments wherein an analyzing filter is positioned nearest to the eyes of a viewer, which analyzing filter is a linear light polarizing filter, the filter may in fact further include a suitably aligned quarter-wave light retarding means which converts circularly polarized light into linearly polarized light. Alternatively, the linear light polarizing filter might be replaced by circular polarizing means which pass light with circular polarization in one particular sense (i.e., left-handedness or right-handedness) while absorbing, diffusing or reflecting light circularly polarized in the other sense. For embodiments in which on/off switchable light rotating means are employed for rotating the orientation of linearly polarized light, reference to those means also refers to on/off switchable light rotating means for changing the sense of circularly polarized light.

Thus, considering the uses of light polarization and polarization based filtering which are hereinafter described, the essential characteristics of the invention are unaffected by substitutions of the kind described above. Consequently, and for sake of simplicity, the embodiments of the present invention are hereinafter described in terms of linear light polarization, yet this description by no means is to be taken as limiting the scope of the invention to any particular method of light polarization. Thus when the term 'orientation' is used to describe the direction of light polarization herein in this document and especially in the claims below, it refers both to linear and circular light polarization.

SUMMARY OF THE INVENTION

According to the present invention there are provided systems for three-dimensional viewing and projection which can be used by viewer to obtain a perception of depth while viewing still or motion pictures, some of the systems do not require use of eyeglasses, some are designed to enable simultaneous viewing by more than one viewer.

According to further features in illustrated embodiments of the invention described below, provided is a system for three-dimensional viewing of a display, the display presents a frame, the frame includes first subregions and second subregions distributed across and along the frame, the first subregions alternately present first and second picture elements of a left image and a right image, respectively, while at the same times, the second subregions alternately present corresponding second and corresponding first picture elements of the right image and the left image, respectively, the system comprising (a) a light polarizing layer including first subareas and second subareas, the first subareas polarizing light in a first orientation, the second subareas polarizing light in a second orientation, the first and second subareas being distributed across and along the light polarizing layer in an arrangement corresponding to the distribution of the first and second subregions, respectively, such that light emanating from the first and second subregions passes through the first and second subareas, respectively, such that light emanating from the first subregions after passing through the first subareas is polarized in the first orientation, whereas light emanating from the second subregions after passing through the second subareas is polarized in the second orientation, the light polarizing layer being located closest to the display; (b) a layer of on and off switchable light rotating means being between the light polarizing layer and a viewer, such that when the layer of light rotating means is on, light passing through it is rotated, whereas when the layer of light rotating means is off, light passing through it is not rotated; (c) eyeglasses including a left eyepiece and a right eyepiece, the left eyepiece allowing light polarized in the first orientation to reach the left eye of the viewer, substantially blocking light polarized in the second orientation from reaching the left eye of the viewer, the right eyepiece allowing light polarized in the second orientation to reach the right eye of the viewer, substantially blocking light polarized in the second orientation from reaching the right eye of the viewer; and (d) a coordinating switching means for alternately switching on and off the layer of switchable light rotating means, such that when the layer of switchable light rotating means is off, the first subregions present the first picture elements of the left image and the second subregions present the second picture elements of the right image, whereas when the layer of switchable light rotating means is on, the first subregions present the second picture elements of the right image and the second subregions present the first picture elements of the left image.

According to still further features in the illustrated embodiments the alternation of the first and the second picture elements between the first and the second subregions is in a rate, whereat due to the visual persistence of the human vision system, an illusion in which the left eye sees the left image and the right eye sees the right image substantially at all times, is formed.

According to still further features in the described preferred embodiments the distribution of the first and second subregions across and along the frame is selected from the group of distributions consisting of an arbitrary distribution and an alternating distribution.

According to further features in preferred embodiments of the invention described below, provided is a system for three-dimensional viewing of a display, the display presents a frame divided into at least one first region presenting at least a part of a first image and at least one second region presenting at least a part of a second image, the system comprising a first and a second light polarizing layers each being divided into first subareas and second subareas, the first subareas polarizing light in a first orientation, the second subareas polarizing light in a second orientation, the first layer being closest to the display, the second layer being between the first layer and a viewer, the first and second layers being in a distance from one another and the first and second subareas being distributed across and along the first and second layers such that light emanating from the at least one first region reaches one of the eyes of the viewer and is substantially blocked from the other eye, whereas light emanating from the at least one second region reaches the other eye of the viewer and is substantially blocked from the first eye.

According to still further features in the described preferred embodiments the first image is either a left image or a right image and the second image is either a right image or a left image respectively.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising first mechanical means for translating the first and second light polarizing layers one relative to the other.

According to still further features in the described preferred embodiments the system further comprising second mechanical means for translating any of the first and second light polarizing layers relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a system for three-dimensional viewing of a display, the display presents a frame divided into at least one first region and at least one second region, the system comprising (a) a first light polarizing layer being divided into first subareas and second subareas, at a first phase of operation the first subareas polarizing light in a first orientation and the second subareas polarizing light in a second orientation, whereas at a second phase of operation the first subareas polarizing light in the second orientation and the second subareas polarizing light in the first orientation, the second layer being between the display and the viewer, the first layer being between the viewer and the display; (b) a second light polarizing layer being divided into third subareas and fourth subareas, the third subareas polarizing light in the first orientation and the fourth subareas polarizing light in the second orientation, the second layer being between the first layer and a viewer, the second layer being between the display and the viewer, one of the first and second light polarizing layers being closer to the viewer, whereas the other being closer to the display, the second layer being between the viewer and the display, one of the first and second layers being closer to the display, whereas the other being closer to the viewer; (c) means for rapidly selecting between the first phase of operation and the second phase of operation, the first and second layers being in a distance from one another and the first, second, third and fourth subareas being distributed across and along the first and second layers, such that when the first phase of operation is selected, light emanating from the at least one first region reaches one of the eyes of the viewer and is substantially blocked from the other eye and light emanating from the at least one second region reaches the other eye of the viewer and is substantially blocked from the first eye, whereas when the second phase of operation is selected, light emanating from the at least one first region reaches the other eye of the viewer and is substantially blocked from the first eye and light emanating from the at least one second region reaches the first eye of the viewer and is substantially blocked from the other eye; and (d) a coordinating element coordinating between a rate of selecting the first and second phases of operation and between first and second parts of first and second images being presented on the regions of the frame, such that when the first phase of operation is selected, the first part of the first image is presented on the at least one first region and the second part of the second image is presented on the at least one second region of the frame, whereas when the second phase of operation is selected, the second part of the first image is presented on the at least one second region and the first part of the second image is presented on the at least one first region of the frame.

According to still further features in the described preferred embodiments the means for rapidly selecting between the first phase of operation and the second phase of operation are mechanical.

According to still further features in the described preferred embodiments the first image is a left image, the second image is a right image, the first parts are left parts and the second parts are right parts.

According to still further features in the described preferred embodiments the first image is a right image, the second image is a left image, the first parts are right parts and the second parts are left parts.

According to further features in preferred embodiments of the invention described below, provided is a system for three-dimensional viewing of a display, the display presents a frame divided into at least one first region and at least one second region, the system comprising (a) a first and a second light polarizing layers each being divided into first subareas and second subareas, the first subareas polarizing light in a first orientation, the second subareas polarizing light in a second orientation, the first layer being closest to the display, the second layer being between the first layer and a viewer; (b) a layer of on and off switchable light rotating means being between the light polarizing layers, such that when the layer of light rotating means is on, light passing through it is rotated, whereas when the layer of light rotating means is off, light passing through it is not rotated, the first and second layers being in a distance from one another and the first and second subareas being distributed across and along the first and second layers, such that when the layer of switchable light rotating means is off, light emanating from the at least one first region reaches one of the eyes of the viewer and is substantially blocked from the other eye and light emanating from the at least one second region reaches the other eye of the viewer and is substantially blocked from the first eye, whereas when the layer of switchable light rotating means is on, light emanating from the at least one first region reaches the other eye of the viewer and is substantially blocked from the first eye and light emanating from the at least one second region reaches the first eye of the viewer and is substantially blocked from the other eye; and (c) a coordinating element for coordinating between rate of on and off switching of the layer of switchable light rotating means and between first and second parts of first and second images being presented on the regions of the frame, such that when the layer of switchable light rotating means is off, the first part of the first image is presented on the at least one first region and the second part of the second image is presented on the at least one second region, whereas when the layer of switchable light rotating means is on, the second part of the first image is presented on the at least one second region and the first part of the second image is presented on the at least one first region.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments the first image is a left image, the second image is a right image, the first parts are left parts and the second parts are right parts.

According to still further features in the described preferred embodiments the first image is a right image, the second image is a left image, the first parts are right parts and the second parts are left parts.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the first and second light polarizing layers one relative to the other.

According to still further features in the described preferred embodiments the further comprising mechanical means for translating any of the first and second light polarizing layers and the layer of on and off switchable light rotating means relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a system for three-dimensional viewing of a display, the display alternately presents a left image and a right image, the system comprising (a) a first light polarizing layer being divided into first subareas and second subareas, at a first phase of operation the first subareas polarizing light in a first orientation and the second subareas polarizing light in a second orientation, whereas at a second phase of operation the first subareas polarizing light in the second orientation and the second subareas polarizing light in the first orientation, the first layer being closest to the display; (b) a second light polarizing layer being divided into third subareas and fourth subareas, the third subareas polarizing light in the first orientation and the fourth subareas polarizing light in the second orientation, the second layer being between the first layer and a viewer; (c) means for rapidly selecting between the first phase of operation and the second phase of operation, the first and second layers being in a distance from one another and the first, second, third and fourth subareas being distributed across and along the first and second layers, such that when the first phase of operation is selected, light emanating from the display reaches a first eye of the viewer and is substantially blocked from the second eye, whereas when the second phase of operation is selected, light emanating from the display reaches the second eye of the viewer and is substantially blocked from the first eye; and (d) a coordinating element coordinating between rates of selecting the first and second phases of operation and between alternately presenting the left and right images on the display, such that when the first phase of operation is selected the left image is presented on the display, whereas when the second phase of operation is selected the right image is presented on the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments the means for rapidly selecting between the first phase of operation and the second phase of operation are mechanical.

According to further features in preferred embodiments of the invention described below, provided is a system for three-dimensional viewing of a display, the display alternately presents a left image and a right image, the system comprising (a) a first and a second light polarizing layers each being divided into first subareas and second subareas, the first subareas polarizing light in a first orientation, the second subareas polarizing light in a second orientation, the first layer being closest to the display, the second layer being between the first layer and a viewer; (b) a layer of on and off switchable light rotating means being between the light polarizing layers, such that when the layer of light rotating means is on, light passing through it is rotated, whereas when the layer of light rotating means is off, light passing through it is not rotated, the first and second layers being in a distance from one another and the first and second subareas being distributed across and along the first and second layers, such that when the layer of switchable light rotating means is off, light emanating from the display reaches a first eye of the viewer and is substantially blocked from the second eye, whereas when the layer of switchable light rotating means is on, light emanating from the display reaches the second eye of the viewer and is substantially blocked from the first eye; and (c) a coordinating element for coordinating between rates of on and off switching of the layer of switchable light rotating means and between alternating the first and second images on the display, such that when the layer of switchable light rotating means is off, the left image is presented on the display, whereas when the layer of switchable light rotating means is on, the right image is presented on the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the first and second light polarizing layers one relative to the other.

According to still further features in the described preferred embodiments the system further comprising mechanical means for translating any of the first and second light polarizing layers and the a layer of on and off switchable light rotating means relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a system for three-dimensional viewing of a display, the display presents a frame, the frame includes first subregions and second subregions distributed across and along the frame, the first subregions alternately present first and second picture elements of a left image and a right image, respectively, while at the same times, the second subregions alternately present corresponding second and corresponding first picture elements of the right image and the left image, respectively, the system comprising (a) a layer of shutter means including alternating first and second subareas being arranged across and along the layer, wherein in a first phase of operation, the first subareas are substantially opaque and the second subareas are substantially transparent, whereas in a second phase of operation the first subareas are substantially transparent and the second subareas are substantially opaque, the layer of shutter means being in a distance from the display and the first and second subareas being distributed across and along the layer of shutter means, such that in the first phase of operation, light emanating from the first subregions reaches the one of the eyes of the viewer and is substantially blocked from the other eye and light emanating from the second subregions reaches the other eye of the viewer and is substantially blocked from the first eye, whereas in the second phase of operation, light emanating from the first subregions reaches the other eye of the viewer and is substantially blocked from the first eye and light emanating from the second subregions reaches the first eye of the viewer and is substantially blocked from the other eye; and (b) a coordinating element coordinating between rates of selecting the first and second phases of operation and between alternately presenting the first and second picture elements of the left and right images in the first and second subregions, such that when the first phase of operation is selected, the first picture elements are presented in the first subregions and the second picture elements are presented in the second regions, whereas when the second phase of operation is selected, the second picture elements are presented in the first subregions and the first picture elements are presented in the second regions.

According to still further features in the described preferred embodiments the layer of shutter means includes a first and a second light polarizing sublayers both polarize light in the same orientation, and a sublayer of alternating first and second on and off switchable light rotating means located between the first and second light polarizing sublayers, the first and second switchable light rotating means are under control of the coordinating element, such that when the first switchable light rotating means are on the second switchable light rotating means are off, and when the first switchable light rotating means are off the second switchable light rotating means are on.

According to still further features in the described preferred embodiments the layer of shutter means includes a first and a second light polarizing sublayers and a sublayer of multiple on and off switchable light rotating means located between the first and a second light polarizing sublayers, the system further comprising a multi-line controlling switching means, each of the multiple switchable light rotating means of each of the sublayer of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the layer of shutter means relative to the display.

According to still further features in the described preferred embodiments the system further comprising additional layers of shutter means being between the display and a viewer and being controlled by the multi-line controlling switching means.

According to still further features in the described preferred embodiments the system further comprising means for sensing the position and the distance of the viewer relative to the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments any of the systems further comprising means for sensing the position and the distance of the viewer relative to the display.

According to still further features in the described preferred embodiments described below, provided is a system for three-dimensional viewing of a display, the display presents a frame, the frame includes first subregions and second subregions distributed across and along the frame, at a given time the first subregions present first picture elements of a left image, the second subregions present corresponding second picture elements of a right image, the system comprising (a) a light blocking system for restricting light emanating from the first picture elements of the left image from reaching the right eye of a viewer during the given time, and for restricting light emanating from the second picture elements of the right image from reaching the left eye of the viewer during the given time; and (b) an optical system being positioned between the light blocking system and the eyes of the viewer, such that rays of light passing through the optical system are made to spread, so that an image reproduced on the retina of each of the eyes of the viewer includes less blank areas than would have been the case omitting the optical system, and thus appears less grainy.

According to still further features in the described preferred embodiments the optical system includes an array of diverging lenticular elements positioned closer to the light blocking system and an array of converging lenticular elements positioned closer to the eyes of the viewer.

According to still further features in the described preferred embodiments the optical system includes a diverging lens positioned closer to the light blocking system and a converging lens positioned closer to the eyes of the viewer.

According to still further features in the described preferred embodiments described below, provided is a system for direction restricted viewing of a display, the system comprising (a) a first and a second light polarizing layers, at a given time, each being divided into first subareas and second subareas, the first subareas polarizing light in a first orientation at the given time, the second subareas polarizing light in a second orientation at the given time, the first layer being closest to the display, the second layer being between the first layer and a viewer; and (b) at least one additional layer including a first sublayer of polarizing filter being disposed between a second sublayer and a third sublayer, each of the second and third sublayers including elements of on and off switchable light rotating means, such that when any of the elements is on, light passing through it is rotated, whereas when any of the elements is off, light passing through it is not rotated, such that at any given time, the first second and third sublayers forming an arrangement of first and second subunits, the first subunits permitting passage of light being polarized in the first orientation, the second subunits permitting passage of light being polarized in the second orientation, such that by selecting a distance between the first and second layers and controlling the on and off switchable light rotating means in the first and second sublayers of the additional layer, light emanating from the display is restricted to selected directions.

According to still further features in the described preferred embodiments the system further comprising (c) a controlling device for controlling the directions by controlling the on and off light rotating means.

According to still further features in the described preferred embodiments the display includes a left image and a right image, the system is for directing light emanating from the left image to the left eye of at least one viewer and for directing light emanating from the right image to the right eye of at least one viewer, such that each of the viewers acquires a three-dimensional perception of the display.

According to still further features in the described preferred embodiments described below, provided is a system for three-dimensional viewing comprising (a) a display for displaying small and intensive picture elements of right and left images, at least a fraction of the small and intensive picture elements being adjacent to (e.g., surrounded by) subregions substantially not emitting light; and (b) means for directing light emanating from picture elements of the right image to a right eye of a viewer and light emanating from picture elements of the left image to a left eye of the viewer.

According to still further features in the described preferred embodiments described below, provided is a system for three-dimensional viewing of a display, the display alternately presents a left image and a right image, such that in at least one region of the display, a section of an image presently displayed is displayed in a first subregion surrounded by a second subregion wherein no part of an image is displayed (e.g., either by actually not displaying the image, or alternatively, by hiding the displayed image by an opaque element which hides the displayed image), the system comprising (a) a first and a second light polarizing layers each being divided into first subareas and second subareas, the first subareas polarizing light in a first orientation, the second subareas polarizing light in a second orientation, the first layer being closest to the display, the second layer being between the first layer and a viewer; (b) a layer of on and off switchable light rotating means being between the light polarizing layers, such that when the layer of light rotating means is on, light passing through it is rotated, whereas when the layer of light rotating means is off, light passing through it is not rotated, the first and second layers being in a distance from one another and the first and second subareas being distributed across and along the first and second layers, such that when the layer of switchable light rotating means is off, light emanating from the display reaches a first eye of the viewer and is substantially blocked from the second eye, whereas when the layer of switchable light rotating means is on, light emanating from the display reaches the second eye of the viewer and is substantially blocked from the first eye; and (c) a coordinating element for coordinating between rates of on and off switching of the layer of switchable light rotating means and between alternating the first and second images on the display, such that when the layer of switchable light rotating means is off, the left image is presented on the display, whereas when the layer of switchable light rotating means is on, the right image is presented on the display.

According to still further features in the described preferred embodiments described below, provided is a light polarizing layer including first subareas polarizing light in a first orientation and second subareas polarizing light in a second orientation, perpendicular to the first, the layer comprising a first sublayer of light polarizing means, polarizing light in the first orientation, and a second sublayer of light rotating means having subareas active in light rotation, the subareas active in light rotation being shaped to solely correspond to the second subareas.

According to still further features in the described preferred embodiments the first and second subareas are arranged in alternating stripes pattern.

According to still further features in the described preferred embodiments the first and second subareas are arranged in a checkerboard pattern.

According to still further features in the described preferred embodiments the second sublayer includes a first set of parallel stripes disposed vertically in relation to a second set of parallel stripes to form a checkerboard pattern.

According to still further features in the described preferred embodiments described below, provided is a system for three-dimensional viewing of a display, the display presents a frame divided into at least one first region and at least one second region, the system comprising (a) a first light polarizing layer for polarizing light emanating from the display; (b) a light rotating layer which at a first phase of operation being active in light rotation, whereas at a second phase of operation being inactive in light rotation, such that at the first phase of operation light passing therethrough having a K orientation, is given a J orientation, which is perpendicular to K; (c) a light retarding layer divided into first subareas retarding light at n degrees and second subareas retarding light at n+90 degrees, such that light passing through the first light polarizing layer, the light rotating and the light retarding layer is polarized in a first orientation or a second orientation perpendicular to the first orientation depending on whether light rotating layer is in the first or second phase and depending on whether the light passes through any of the first or second subareas; (d) a second light polarizing layer being divided into third subareas and fourth subareas, the third subareas polarizing light in the first orientation and the fourth subareas polarizing light in the second orientation, all layers (a)-(d) being positioned one next to the other in sequence; and (e) means for rapidly selecting between the first phase of operation and the second phase of operation, the layers being arranged and in a distance from one another, and the first, second, third and fourth subareas being distributed across and along the light retarding layer and the second light polarizing layer, such that when the first phase of operation is selected, light emanating from the at least one first region reaches one of the eyes of the viewer and is substantially blocked from the other eye, and light emanating from the at least one second region reaches the other eye of the viewer and is substantially blocked from the first eye, whereas when the second phase of operation is selected, light emanating from the at least one first region reaches the other eye of the viewer and is substantially blocked from the first eye and light emanating from the at least one second region reaches the first eye of the viewer and is substantially blocked from the other eye.

According to still further features in the described preferred embodiments the system further comprising (f) a coordinating element coordinating between a rate of selecting the first and second phases of operation and between first and second parts of first and second images being presented on the regions of the frame, such that when the first phase of operation is selected, the first part of the first image is presented on the at least one first region and the second part of the second image is presented on the at least one second region of the frame, whereas when the second phase of operation is selected, the second part of the first image is presented on the at least one second region and the first part of the second image is presented on the at least one first region of the frame.

According to still further features in the described preferred embodiments described below, provided is a system for three-dimensional viewing of a projected display comprising (a) a screen for displaying the projected display; (b) a left projector projecting left picture elements of the display onto the screen; (c) a right projector projecting right picture elements of the display onto the screen; and (d) a light blocking system for permitting light emanating from the left projector onto first subregions on the screen and light emanating from the right projector onto second subregions on the screen, and for restricting light emanating from the left projector from reaching onto the second subregions of the screen and light emanating from the right projector onto the first subregions of the screen, the light blocking system being also for restricting light reflected from the first subregions from reaching right eyes of viewers, and for restricting light reflected from the second subregions of the screen from reaching left eyes of the viewers.

According to still further features in the described preferred embodiments described below, provided is a system for three-dimensional viewing of a projected display comprising (a) a light polarization maintaining screen for displaying the projected display; (b) a left projector projecting left picture elements of the display onto the screen; (c) a right projector projecting right picture elements of the display onto the screen; (d) a light polarizing layer being divided into first subareas and second subareas, the first subareas polarizing light in a first orientation and the second subareas polarizing light in a second orientation perpendicular to the first orientation, the light polarizing layer being between the projectors and the screen.

According to still further features in the described preferred embodiments (i) light emanating from the left projector and passing through the first subareas becomes polarized in the first orientation, reaches first subregions on the screen and is then reflected from the screen while maintaining its polarization; (ii) light emanating from the left projector and passing through the second subareas becomes polarized in the second orientation, reaches second subregions on the screen and is then reflected from the screen while maintaining its polarization; (iii) light emanating from the right projector and passing through the first subareas becomes polarized in the first orientation, reaches the second subregions on the screen and is then reflected from the screen while maintaining its polarization; and (iv) and light emanating from the right projector and passing through the second subareas becomes polarized in the second orientation, reaches the first subregions on the screen and is then reflected from the screen while maintaining its polarization.

According to still further features in the described preferred embodiments (v) the positioning of the screen, the layer and the projectors are selected such that a viewer's left eye receives light originating from the left projector, reflected from the first and second subregions of the screen, passing through the first and second subareas of the polarizing layer, respectively, while the viewer's right eye receives light originating from the right projector, reflected from the first and second subregions of the screen, passing through the second and first subareas of the polarizing layer, respectively.

According to still further features in the described preferred embodiments of the invention, provided is a system for three-dimensional viewing of a projected display comprising (a) a screen for displaying the projected display; (b) a left projector projecting left picture elements of the display onto the screen; (c) a right projector projecting right picture elements of the display onto the screen; and (d) a color filter layer being divided into first subareas and second subareas, the first subareas transmitting light in a first wavelength range and the second subareas transmitting light in a second wavelength range, the second range and the first range being substantially different ranges, the filter layer being between the projectors and the screen.

According to still further features in the described preferred embodiments (i) light emanating from the left projector and passing through the first subareas is filtered to consist wavelengths restricted to the first range, reaches first subregions on the screen and is then reflected from the screen; (ii) light emanating from the left projector and passing through the second subareas is filtered to consist wavelengths restricted to the second range, reaches second subregions on the screen and is then reflected from the screen; (iii) light emanating from the right projector and passing through the first subareas is filtered to consist wavelengths restricted to the first range, reaches the second subregions on the screen and is then reflected from the screen; and (iv) light emanating from the right projector and passing through the second subareas is filtered to consist wavelengths restricted to the second range, reaches the first subregions on the screen and is then reflected from the screen.

According to still further features in the described preferred embodiments (v) the positioning of the screen, the layer and the projectors are selected such that a viewer's left eye receives light originating from the left projector, reflected from the first and second subregions of the screen, passing through the first and second subareas of the filter layer, respectively, while the viewer's right eye receives light originating from the right projector, reflected from the first and second subregions of the screen, passing through the second and first subareas of the filter layer, respectively.

According to still further features in the described preferred embodiments of the invention, provided is a system for three-dimensional viewing of a display, the display presents a frame divided into at least one first region presenting at least a part of a first image and at least one second region presenting at least a part of a second image, the system comprising a first and a second color filters each being divided into first subareas and second subareas, the first subareas filtering light in a first wavelength range, the second subareas filtering light in a second wavelength range, the first layer being closest to the display, the second layer being between the first layer and a viewer, the first and second layers being in a distance from one another and the first and second subareas being distributed across and along the first and second layers such that light emanating from the at least one first region reaches one of the eyes of the viewer and is substantially blocked from the other eye, whereas light emanating from the at least one second region reaches the other eye of the viewer and is substantially blocked from the first eye.

According to still further features in the described preferred embodiments of the invention, provided is a system for three-dimensional viewing of a display, the display presents a frame divided into first regions presenting at least a part of a left image and second regions presenting at least a part of a right image, each of the first and second regions is divided into a first subregions emanating light of a first spectral range, a second subregion emanating light of a second spectral range and a third subregion emanating light of a third spectral range, the spectral ranges are selected such that by displaying each of the ranges in selected intensities, each of the regions is perceived by a viewer as having a desired color, the system comprising a light filtering layer, the light filtering layer including (a) first subareas for blocking light of the first spectral range; (b) second subareas for blocking light of the first and second spectral ranges; (c) third subareas for blocking light of all of the spectral ranges; (d) fourth subareas for blocking light of the second and third spectral ranges; (e) fifth subareas for blocking light of the third spectral range; and (f) sixth subareas transmitting light of all the spectral ranges; the first through sixth subareas being arranged along and across the light filtering layer such that light originating from the first regions is substantially blocked from the right eye of the viewer, and such that light originating from the second regions is substantially blocked from the left eye of the viewer.

The present invention successfully addresses the shortcomings of the presently known configurations by providing a flatscreen fullcolor directly displayed or projected stereoscopic vision without eyeglasses or other optical means engaged close to the eyes of the viewer. Furthermore, some of the systems for three-dimensional viewing according to the present invention do not restrict the viewer to specific position and distance relative to the display, which viewer is thus free to move his head while viewing the display, some of the systems are directed at providing more than one viewer with simultaneous three-dimensional viewing of a display. Yet furthermore, the more advanced systems of the present invention are highly suitable for three-dimensional viewing and projection for both still and motion pictures, yet in contrast with prior art systems do not involve moving parts, some may even be installed on existing hardware such as computers and television sets.

BRIEF DESCRIPTION OF THE DRAWINGS

The invention herein described, by way of example only, with reference to the accompanying drawings, wherein:

FIG. 1 depicts a manner of displaying left and right images on a display according to a first embodiment of the present invention;

FIG. 2 depicts a manner in which a viewer directs his eyes towards the left and right images, according to the first embodiment of the present invention;

FIG. 3 depicts the manner in which the images are perceived, according to the first embodiment of the present invention;

FIG. 8 depicts the operation of the system according to the fifth embodiment of the present invention during a phase in which the left eye sees the left side of the display and the right eye sees the right side of the display;

FIG. 9 depicts the operation of the system according to the fifth embodiment of the present invention during a phase in which the left eye sees the right side of the screen and the right eye sees the left side of the screen;

FIG. 15 is a simplified cross-section view of the system according to the sixth embodiment of the present invention in a second phase of operation;

DESCRIPTION OF THE PREFERRED EMBODIMENTS

Figure 4:
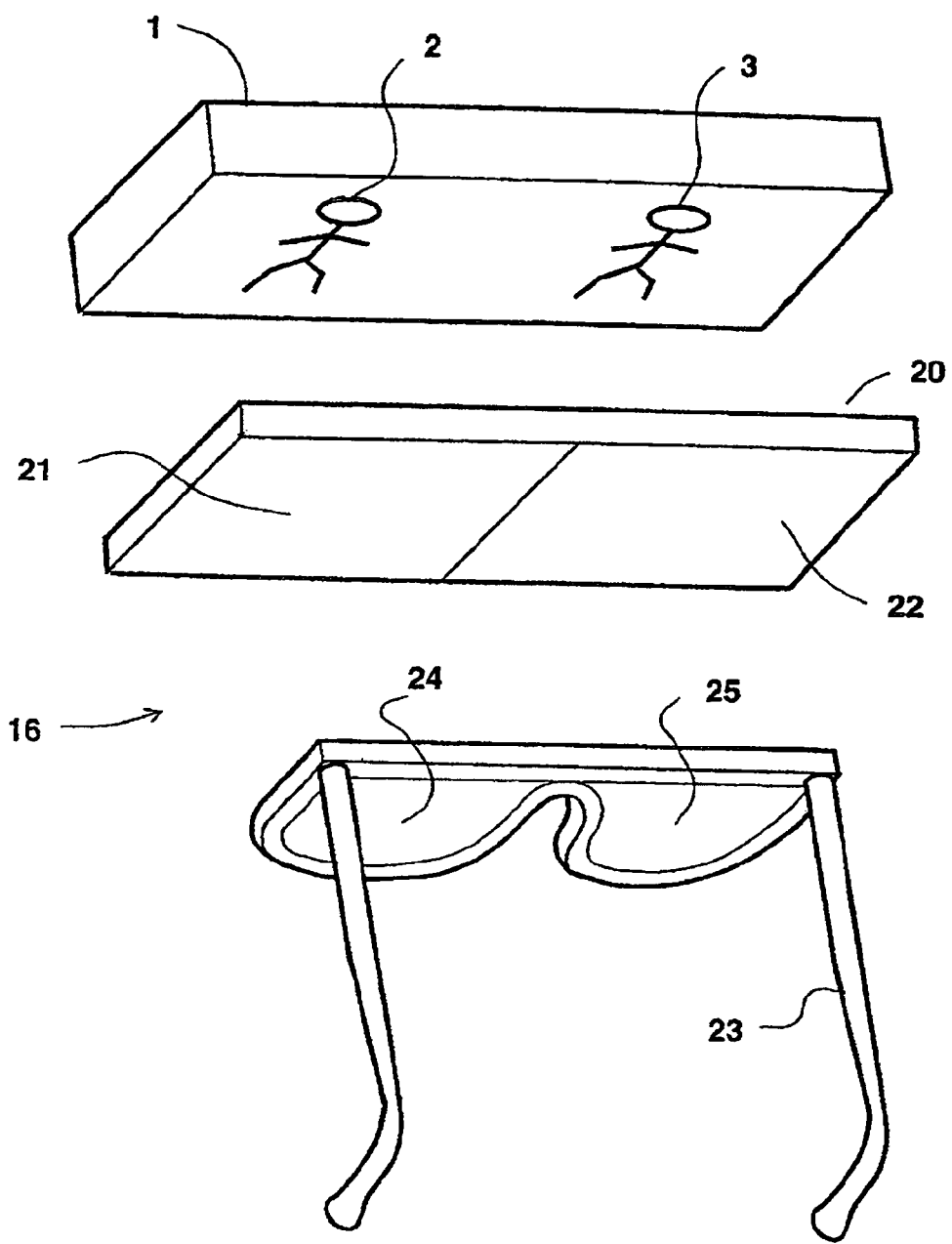
FIG. 4 is a simplified perspective view of a system for three-dimensional viewing according to a second embodiment of the present invention, using polarizing eyeglasses and images placed on the display as in the first embodiment, as depicted in FIGS. 1-3.

The present invention is of systems for three-dimensional viewing and projection which can be used by a viewer to obtain a perception of depth while viewing still or motion pictures. Specifically, the present invention can be used to three-dimensionally view still or motion pictures without the use of eyeglasses by more than one viewer at a time.

The principles and operation of systems for three-dimensional viewing according to the present invention may be better understood with reference to the drawings and accompanying descriptions.

Referring now to the drawings, FIGS. 1-3 illustrate a first embodiment of the present invention. According to the first embodiment of the invention, displayed (i.e., presented) is a stereoscopic movie made of frames of pairs of left and right images, which pairs of images, together, constitute stereoscopic views, by displaying (i.e., presenting) them side by side on a display, the pair of images size, placement, and surroundings are such that the viewer can view them stereoscopically by diverging the direction of his sight such that the viewer's right eye looks at the right image and the viewer's left eye looks at the left image.

FIG. 1 shows a display 1 displayed on a screen, which display 1 includes a displayed frame including a left image 2 to the left of a right image 3 as these terms are defined in the definition of terms section above. Left 2 and right 3 images are typically substantially identical in subject, yet they differ in orientation, as would be the case, for example, if a pair of video cameras separated by approximately the human interpupillary distance (about 6.5 cm) were pointed at a single scene each from it's slightly different perspectives, and the images thus generated were displayed (i.e., presented) as left 2 and right 3 images of FIG. 1, with left image 2 displayed on the left side of display 1. Please note however, as stated in the definitions section above, that this example and forthcoming examples of specific origins of images and/or specific techniques for displaying (i.e., presenting) them, are intended by way of clarification only and are not intended to limit the scope of the present invention to images or displays of any specific type.

The method of viewing a 3D-image according to the first embodiment of the present invention is illustrated in FIG. 2.

First, FIG. 2 shall be used to review the way a viewer 4 normally looks at an object. Viewer 4, when looking at an ordinary object, for example left image 2, in an ordinary manner, directs both his left eye 5 and his right eye 6 to image 2, resulting in line of sight 7 for left eye 5 and line of sight 9 for right eye 6. Similarly, when viewer 4 normally looks at image 3 the viewer directs both eyes 5 and 6 to that object, invoking lines of sight 10 for left eye 5 and 8 for right eye 6.

If image 2 is a left image as defined, and image 3 a right image, then a stereoscopic binocular (i.e., three-dimensional) view can be obtained by viewer 4 who diverges his eyes in such a way that left eye 5 is directed towards left image 2, resulting in line-of-sight 7, while at the same time right eye 6 is directed towards right image 3 resulting in line-of-sight 8.

Left 2 and right 3 images can then be coalesced by viewer 4 into a single image. If left 2 and right 3 images contain parallax information about a scene, a stereoscopic illusion of depth, in other words a 3D-image, results.

An alternative method of viewing is more comfortable for certain viewers. In this case left image 2 is displayed on the right side of display 1, whereas right image 3 is displayed on the left side. For perception of depth, viewer 4 crosses his eyes rather than diverging them, so that his left eye 5 looks at left image 3 along line of sight 10 and his right eye 6 looks at right image 2 along line of sight 9.

In both cases, left eye 5 sees the left image and right eye 6 sees the right image. Since the left and right images are substantially similar in many respects, viewer 4, after suitable training in the practice, can coalesce the images into a single image with a central area in which both the left and the right images are seen together combined into a single image, a single gestalt. Surrounding left 2 and right 3 images by identical surroundings facilitates the process, but is not required. If images 2 and 3 are left and right images of substantially the same subject differing essentially only in the differences introduced by parallax information as defined above, viewer 4 will perceive the illusion of depth (i.e., three-dimensionality) resulting from binary stereo-optic viewing, with no additional optical equipment.

If an appropriate sequence of frames are displayed, each of which combines a left image displayed on one part of a display screen along with a right image displayed beside it on another part of the display screen, then three-dimensional movies can be seen by the viewer who directs his eyes in the manner described above.

Thus, according to the first embodiment of the present invention, perception of depth is obtained while displaying a series of frames each including a right and a left image, each pair of images is viewed in the manner described, the frames succeeding each other over time in a traditional manner of motion pictures, so as to produce a stereoscopic 3D-motion picture requiring no special optical apparatus beyond conventional means for displaying images (e.g., a television or a computer screen).

In certain publications, for example the "Magic Eye" series of books mentioned above, random-dot stereograms have been associated with sets of small normal still images printed across the page in such a manner that the viewer can view them, as he views the random dot stereograms, by directing his right eye to one particular image and his left eye to another particular image, usually the one to the left of the image viewed by the right eye. The images portray a same scene from slightly different perspectives, such that the user, when coalesces the images, perceives a combined image generating the illusion of depth.

So far, to the best of our knowledge, the use of a viewing method as described, applied to a series of frames creating a motion picture has not been previously contemplated nor implemented. It is interesting, however, to note that in U.S. Pat. No. 5,126,878 to Trumbull et al., the idea of displaying left and right images side by side on a display is in fact contemplated. However, Trumbull et al., does not relate to the possibility of such images being displayed in such a manner that they can be coalesced into a single image and viewed stereoscopically without benefit of further optical apparatus. Alternatively, Trumbull's disclosure concerns an apparatus worn in front of the eyes, which moves the images and changes their dimensions. Such an apparatus participates in the general disadvantage of all the solutions requiring special eyeware (i.e., eyeglasses) to be worn, and while it presents certain advantages in terms of the apparent size of the images displayed, it also presents clear disadvantages in terms of expense, simplicity, attractiveness and perhaps also of comfort.

Nevertheless, two disadvantages are inherent to the first embodiment of the present invention as described herein. The first disadvantage is that, if the images are to be viewed without eyeglasses, lenses, mirrors, or other optical equipment, best results are obtained if the eyes are not required to diverge beyond the angle natural for normal unaided viewing of distant objects, in which the lines of sight of the two eyes are essentially parallel to each other. Consequently, the width of images which can be successfully combined into a single gestalt in their entirety has as an approximate upper limit the interpupillary distance of the viewer, typically less than 7 cm for each image.

The second disadvantage of the first embodiment is that each eye, in addition to seeing the image appropriate for it, also has a peripheral view of the image not appropriate to it. Thus, in the usual implementation of the first embodiment, with the left eye looking at the left image placed on the left side of the screen and the right eye looking at the right image placed on the right side of the screen, the left eye, while looking at the left image, also sees on the periphery the right image located to the right of the left image, and the right eye looking at the right image also sees on the periphery the left image located to the left of the right image. Referring again to FIG. 2, this means that viewer 4 while looking with his left eye 5 at left image 2 along line of sight 7, will also see, "out of the corner of his eye" (i.e., peripherally), right image 3 located to the right of left image 2 towards which left eye 5 is directed. Similarly, as viewer's 4 right eye 6 looks at right image 3 along line of sight 8, viewer 4 will also peripherally perceive left image 2 located to the left of right image 3 which is viewed by right eye 6ý.

With reference now to FIG. 3, the above described situation is demonstrated. Assuming that the left image is on the left side of the display, box 12 represents the scene as perceived by the left eye, whereas box 11 represents the scene as perceived by the right eye. Central region 13 of FIG. 3 is the area on which both eyes are focused, and the images at central region 13 are coalesced into a single gestalt. For clarity, the image from the left eye is displaced slightly to the left and upwards, hence the central region 13 shows a double image. In actual perception, the images are coalesced by the viewer, and the central region 13 appears as a single image (gestalt), and, if the left and right images are suitably chosen, that single image has the illusion of depth.

The disadvantage mentioned above lies in the fact that the entire scene perceived by the viewer resembles the entire drawing of FIG. 3, rather than only central region 13 of FIG. 3. When the viewer combines the two appropriate images into a single stereoscopic image (gestalt) in central region 13 of the viewer's field of view, two additional flanking images 14 and 15 appear, one to each side of central region 13. These can be largely ignored by experienced viewers, but they tend to be distracting and make it difficult for some viewers to resolve the two appropriate images into a single stereo-optical image.

Thus, the following embodiments of the invention are directed at systems in which each of the viewer's eyes views only it's appropriate image, that is the left eye views a left image and the right eye views a right image.

With reference now to FIG. 4, presented is a second embodiment of the present invention, aimed at solving the problem of flanking (i.e., peripheral) images as described above. FIG. 4 shows a system 16 for three-dimensional viewing. System 16 includes a layer 20, layer 20 includes light polarizing means and is divided into a first area 21 and a second area 22, area 21 substantially covering left image 2, whereas area 22 substantially covering right image 3, both images displayed on display 1. It should be noted that in intent, layer 20 is close to display 1, yet it has been moved disproportionally far away in the drawing for clarity in showing the placement of images on display 1. Area 21 polarizes light in a first orientation, whereas area 22 polarizes light in a second orientation, which is substantially perpendicular to the first. The viewer then wears polarizing eyeglasses 23 whose left eyepiece 24 allows only light polarized in the first orientation to enter the left eye, and whose right eyepiece 25 allows only light polarized in the second orientation to enter the right eye.

This solution is thus similar to the classical solution well known in the art of stereoscopy, whereby polarizing glasses are used to allow a left image polarized in one orientation to enter the left eye, and a right image polarized in a different orientation to enter the right eye, while preventing both eyes from seeing the inappropriate images. This technology has typically been used with the left and right images both distributed throughout the display, for example projecting two independent images, each polarized in a different orientation, onto a common display screen, e.g., 3D-movies are typically projected in this manner.

Note that is the present second embodiment and in embodiments to follow, a particular modification is called for in a case where the display is an LCD screen, since light emanating from a standard LCD is already polarized. In such a case, as demonstrated for the second embodiment of the invention, layer 20 would include light rotating means rather than light polarizing means such that area 21 would have no optical effect, consequently passing polarized light emanating from the LCD screen and having the first orientation, whereas area 22 would have a light rotating effect, and would thus 90 degrees rotate the polarized light emanating from the LCD screen giving it the second orientation.

The advantage of the present second embodiment, where the left image and the right image are placed as described in FIGS. 1-4, is found in the fact that very simple and inexpensive means can be used to create a situation where light emanating from the two images is polarized differently, allowing three-dimensional displays using this methodology to be constructed more simply and less expensively than using other methodologies know to the art of stereoscopy. The images are limited in width, but otherwise enjoy the full color and full resolution of the available display. An additional advantage of this embodiment lies in the fact that, if presented as a combination of light polarizing means layer 20 and eyeglasses 23, together with images provided as described, it can be applied to existing displays (e.g., standard televisions and computer display screens, printed material, etc.) in an extremely inexpensive manner, and requires no addition to nor modification of existing hardware.

Figure 5:
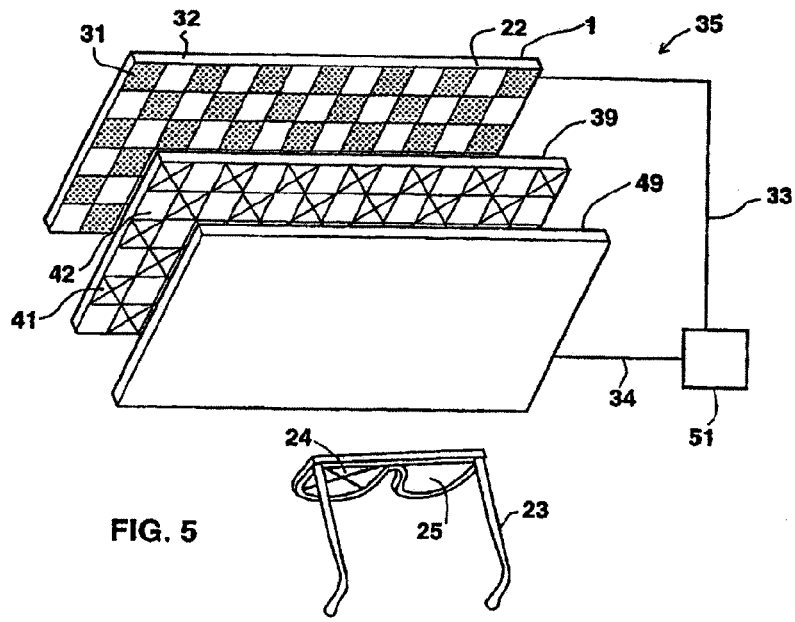
FIG. 5 is a simplified perspective view of a system for three-dimensional viewing according to a third embodiment of the present invention, using polarizing eyeglasses, in which left and right images are distributed throughout the display.

With reference now to FIG. 5, presented is a third embodiment of the present invention. According to the third embodiment provided is another system 35 for three-dimensional viewing, system 35 enables to use images which are not limited in width, and which do not require special divergence or convergence of the eyes for them to be three-dimensionally viewed.

As mentioned above, U.S. Pat. No. 5,050,961 to Venolia discloses a system which supplies appropriate subregions of left and right images to the appropriate eyes, yet leaves 50% of the display area unseen by each of the eyes, thus affecting the quality (i.e., resolution) of the perceived 3D-image. On the other extreme, U.S. Pat. No. 5,083,851 to MacDonald provides means for using all image information of the display area for both left and right images, yet MacDonald means is relatively expensive and complex compared to the system 35 presented in FIG. 5 and described hereinbelow.

System 35 includes a display 1, a light polarizing layer 39 similar in function to layer 20 of FIG. 4, polarizing eyeglasses 23 which are similar to those described for the previous second embodiment, and a layer 49 which includes an on/off switchable element of light rotating means, providing what is known in the art as the Kerr effect.

The left and right images are distributed in a frame 22 throughout display 1 in arbitrarily small first 31 and second 32 subregions (shown as alternating black 31 and white 32 picture elements in frame 22). Each of picture elements 31 and 32 can be as small as an individual pixel of a computer-driven raster display, or an alternate scan line of a television display. Utilization system 35 for three-dimensional viewing would typically involve very small subregions, nevertheless, their size has been exaggerated in FIG. 5 for sake of clarity. Furthermore, layers 39 and 49 are drawn far from display 1 and from one another for sake of clarity, yet layers 39 and 49 are typically much closer (e.g., adjacent) to one another and to display 1.

As further shown in FIG. 5, layer 39 of system 35 is divided into small first and second subareas 41 and 42 yielding an arrangement, such that light from each of subregions 31 and 32 of frame 22 passes through subareas 41 (marked with X in FIG. 5) and 42 of polarizing layer 39, respectively. Subareas 41 of light polarizing layer 39 which are traversed by light emanating from subregions 31 of frame 22 polarize that light in a first orientation, whereas subareas 42 of light polarizing layer 39 which are traversed by light emanating from subregions 32 of frame 22 polarize that light in a second orientation, which is substantially perpendicular to the first orientation. Thus in the example of FIG. 5, subareas 41 polarize light from subregions 31 of the left image in the first orientation, whereas subareas 42 polarize light from subregions 32 of the right image in the second orientation.

As in FIG. 4, left eyepiece 24 of eyeglasses 23 allows only light polarized in the first orientation to reach the left eye of the viewer, and right eyepiece 25 allows substantially only light polarized in the second orientation to reach the right eye of the viewer. Thus, each eye sees only its appropriate image.

If the light thus treated is to pass directly to eyeglasses 23, then one would have a system which would allow full-color stereographic viewing with no need for specially divergent or convergent vision, and which could occupy the entire width of the display, but which would be similar in essence to that described by Vanolia, and share with it the grainy image resulting from the fact that part the display is permanently blocked from sight of each of the eyes.

To overcome this problem, additional layer 49 is employed in system 35. As mentioned above, layer 49 includes an on/off switchable element of light rotating means providing what is known in the art as the Kerr effect. Thus, switching layer 49 on (i.e., activated), according to the Kerr effect, changes by 90 degrees the orientation of polarization of light emanating from all subareas 41 and 42 of polarizing layer 39. As a result, light from subregions 31 which was previously hidden from the right eye will now become visible to the right eye, whereas light from subregions 32 which was previously hidden from the left eye will become visible to the left eye, and no light will reach an eye for which it was not intended. On the other hand, having layer 49 switched off (i.e., inactivated) has no such effect.

Further according to the third embodiment of the present invention, when light rotating means layer 49 is inactivated, display 1 displays (i.e., presents) the left image in its original set of subregions 31, whereas the right image is accordingly displayed in its original set of subregions 32. On the other hand, when light rotating means layer 49 is activated, the left image is displayed in subregions 32 and the right image is accordingly displayed in subregions 31.

As is apparent to one ordinarily skilled in the art and as mentioned above, the picture elements of frame 22, or as referred herein as subregions 31 and 32 have no particular necessary structure. Thus, the picture elements may be pixels, scan lines, or any other size or shape which is convenient in terms of production of the equipment and production of the images, and which reduces any sensation of flickering of the image as perceived by the viewer.

Further according to the third embodiment of the present invention and as further shown in FIG. 5, a coordinating switching means 51 is employed to ensure that on/off switching of light rotating layer 49 as described above, coincides with the change in the distribution of the left and right image picture elements on the display. It will be appreciated by one ordinarily skilled in the art that switching means 51 may be connected with command lines 33 and 34 both to display 1 and to light rotating layer 49, yet to the extent that the information required for switching means 51 to appropriately operate is available independently, command line connection 33 to display 1 is not obligatory and not required. This would be the case if, for example, the scanning frequency of display 1 were dependent on the frequency of the mains current, or on a signal available from the display's input data stream and coordinating switching means 51 is similarly dependent. In these cases system 35, as described in FIG. 5, would not require command line 33 and might be manufactured independently of display 1. The system is thus provided, for example, together with sets of 3D-video tapes, and could then be used together with any standard television.

Figure 6:
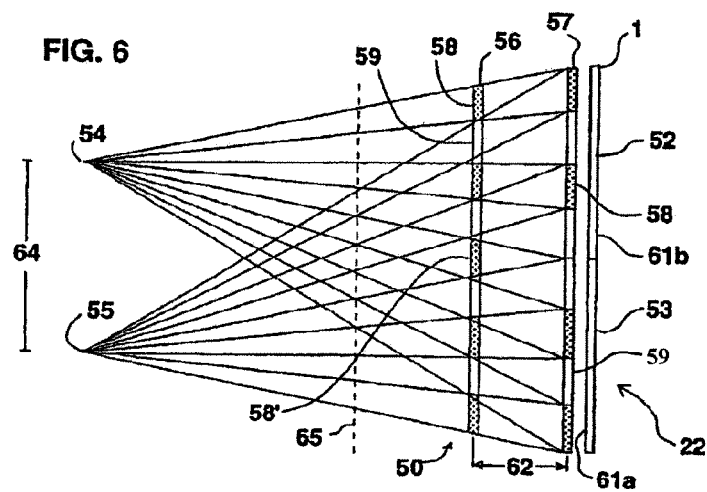
FIG. 6 is a simplified cross-section view of a system for three-dimensional viewing according to a fourth embodiment of the present invention, wherein left and right images are placed as in the first embodiment, and stereoscopic vision is achieved without the use of eyeglasses.

With reference now to FIG. 6, presented is a fourth embodiment of the present invention. The fourth embodiment provides yet another system 50 for three-dimensional viewing, system 50 provides an alternative method for eliminating the peripheral (i.e., flanking) 'extra' images 14 and 15 of FIG. 3, as described earlier for the first embodiment of the present invention. A profound advantage of system 50 of the fourth embodiment as compared for example with systems 16 and 35 described above is that system 50 does not require eyeglasses to be worn by the viewer to obtain a perception of depth (i.e., three-dimensionality).

As shown in FIG. 6, system 50 includes a display 1 which includes a frame 22 divided into at least one left region 52 where at least a part of a first image (i.e., all the first image or a picture element derived from the first image) is displayed and a at least one right region 53 where at least a part of a second image (i.e., all the second image or a picture element derived from the second image) is displayed.

It should be noted that many of the various embodiment in the specification refer to left and right orientations with respect to regions (or subregions) of the display of the various systems described. In many such embodiments, however, other orientations such as upper and lower, etc., are also permissible. Therefore, when the terms 'left region (or subregion)' and 'right region (or subregion)' are used in the specification, they also refer to the terms 'first region (or subregion)' and 'second region (or subregion)', which relate to all the permissible orientations.

Preferably the first image is a left image and the second image is a right image, yet, as explained in the discussion of FIG. 2 above and as will be appreciated from the following description, it is also possible to inverse the placement of the left and right images. Points 54 and 55 represents the position of the viewer's left and right eyes, respectively.

System 50 further includes first and second layers 56 and 57, respectively, interposed between the viewer and display 1. Layer 57, which for sake of clarity appears somewhat distanced from display 1, can in fact be very close (e.g., adjacent) to display 1. Each of layers 56 and 57 is divided into subareas (arranged in strips of which a cross section is shown in FIG. 6) of two types, marked in FIG. 6 as dark 58 and light 59 subareas. Subareas 58 polarize light in a first orientation, whereas subareas 59 polarize light in a second orientation which is substantially perpendicular to the first orientation.

Given a particular position of layer 57 adjacent to display 1 and particular positions and sizes for subareas 58 and 59 of layer 57, it is possible to choose a position for layer 56, and positions and sizes for subareas 58 and 59 of layer 56, such that subareas 58 and 59 of layer 56 will intercept (and transmit) light from display 1 passing through subareas 58 and 59 of layer 57 in the direction of the appropriate eye, and will also intercept (and block) light from subareas 58 and 59, when that light is aimed at the inappropriate eye.

The distance 62 between layer 56 and layer 57, as well as the size and placement of subareas 58 and 59 of layer 56, are dictated by the position of the viewer's eyes and the interpupillary distance 64 between them, by the distance between the viewer and layer 57, and by the size of subareas 58 and 59 into which layer 57 has been divided. Proper placement of layer 56 and of its subareas 58 and 59 ensures that left eye 54 views substantially only the left image and that right eye 55 views substantially only the right image and that a perception of depth (i.e., three-dimensionality) is obtained. Exact determination of the size and placement of these various elements is further discussed in the following, in particular with reference to FIG. 24.

Consider for example light emanating from zone 61b of left region 52 displaying the left image. Due to the arrangement of subareas 58 and 59 across layer 57, upon passing through layer 57, the light emanating from zone 61b is polarized by a subarea 59 of layer 57 in a first orientation. Therefore, and due to the alternate arrangement of subareas 58 and 59 across layer 56, and the position of layer 56 relative to layer 57 and the viewer as explained above, upon passing through layer 56, the light emanating from zone 61b and directed towards right eye 55 encounters a subarea 58 and is blocked because of that subarea's opposite polarization orientation, whereas the light emanating from zone 61b and directed towards left eye 54 encounters subarea 59, of the same polarization orientation, and is transmitted to left eye 54. In a similar manner, light emanating from zone 61a of right region 53 displaying the right image, is initially polarized by its passage through a subarea 58 of layer 57. Such light directed towards left eye 54 is blocked when it encounters a subarea 59 of opposite polarization on layer 56, yet, directed towards the right eye 55 it encounters a subarea 58 of same polarization orientation on layer 57, and that subarea transmits it to right eye 55. Thus each of eyes 54 and 55 views only the zone appropriate to it. As shown in FIG. 6, this description is valid for all other zones of the left and right images, thus, each of eyes 54 and 55 views only the image appropriate to it and a perception of depth is obtained.

It will be appreciated to one ordinarily skilled in the art that more than one suitable distance 62 exists for layer 56. For example, layer 56 may be positioned along dashed line 65, yet it will be further appreciated that changing the distance also requires changing the size of subareas 58 and 59 across layer 56. Presently it is preferred to position layer 56 as close as possible to layer 57, thus rendering system 50 as thin as possible.

It will be further appreciated by one ordinarily skilled in the art that the example provided in FIG. 6 is by way of explanation only, and that the scope of the fourth embodiment of the present invention described herein is not limited to the specific details provided by way of illustration. In particular, (i) layers 56 and 57 need not necessarily be flat orientations; (ii) the subareas need not necessarily be rectangular strips; the left and right images may be divided into a plurality of subareas of arbitrarily small size, each area being related to one or more regions of first layer 57 in the manner in which regions 52 and 53 relates to it; and (iii) the sizes of the subareas of layers 57 and 56 need not necessarily be equal throughout each layer, more than two polarizing layers subdivided into subareas may be used, and the polarizing capabilities of each subarea need not necessarily fill the subarea. Thus, it may be convenient or even necessary for some applications, to prevent too great limitations on head movement, either to leave opaque zones around polarizing subareas 58 and 59 of layers 56 and/or 57, or to leave 'free' non-polarizing zones there and then compensate for this by using more than two layers (e.g., three layers).

It should further be noted that whereas FIG. 6 as a whole describes a situation in which the display area 1, or a portion thereof, is divided between a left region 52 displaying a left image or a portion thereof and a right region 53 displaying a right image, or a portion thereof, the interaction of polarizing subareas, as described in FIG. 6 and in the description above, is equally effective should one wish to devote, say, an entire display area to one of the two images, say the left image. In this case the apparatus would be constructed as pictured in the upper half of FIG. 6, in the area facing region 52. Similarly an apparatus could be constructed as pictured in the lower half of FIG. 6, in the area facing region 53, in which the entire display would constitute a right region displaying the right image. As a practical example of such an application, one might construct an apparatus for which horizontal regions of the display (e.g., the region of one scan line of a television display) would be constructed as described by the upper half of FIG. 6, and these horizontal areas might alternate with other horizontal areas of the display, of similar shape and dimensions, constructed as described by the lower half of FIG. 6. The result would be a television display unit which shows even-numbered scan lines to one eye, and odd numbered scan lines to the other eye. It is interesting to note in this context that one of the display formats generated by some contemporary computer games, intended for e.g., the Cybermaxx virtual reality helmet display hardware, will on a normal VGA CRT display an image with just this characteristic, that horizontal rows of pixels, one or several pixels high and extending all across the screen, intended for the right eye, alternate with horizontal rows of pixels of the same width and height all intended for the left eye. Thus such a display system would display a 3-D image in Cybermaxx format on a standard CRT screen.

The use of the fourth embodiment described hereinabove is now compared with the first embodiment described in FIGS. 1 and 2. It will be appreciated that in the fourth embodiment, as in the first embodiment, each of the viewer's eyes sees it's appropriate image, and does not see the inappropriate image. The left image is displayed as a whole unified image on the left side of the screen and the right image is displayed as a whole unified image on the right side of the screen, and the user, as in the first embodiment, combines the images by diverging his eyes such that the left eye looks at the left image and the right eye looks at the right image. In the current fourth embodiment, however, as differentiated from the first embodiment, there are no accompanying peripheral images because the right eye is blocked from seeing the left image and the left eye is blocked from seeing the right image. This improvement greatly facilitates the process by which the user fuses the two appropriate images into a single apparent 3D-image, viewed stereoscopically and capable of giving the illusion of depth. This stereoscopic viewing of the images is accomplished without eyeglasses or lenses, and the system required is relatively simple and inexpensive to make, has no necessary electronic components, and can easily be adapted to operate with existing hardware.

Nevertheless, the fourth embodiment hereinabove described shares one of the limitations mentioned in the discussion of the first embodiment, namely that there is a practical maximum to the width of image which can comfortably be displayed in this manner. This is due to the fact that the images are placed side by side on the display, and there are limits to the degree to which the viewer's eyes (in the absence of lenses, mirrors, or other optical aids) can comfortably converge or diverge in order to allow the left eye to point towards the left image and the right eye to point towards the right image.

With reference now to FIGS. 7-12, presented is a fifth embodiment of the present invention. According to the fifth embodiment of the invention provided is still another system 70 for three-dimensional viewing. System 70 does not have the limitation of a practical maximum width as described hereinabove for the first and fourth embodiments.

System 70 is similar to system 50 of the fourth embodiment, with the difference that at least some of the elements of polarization, represented above by layers 56 and 57 of FIG. 6, are switchable under electronic control or otherwise, e.g., mechanical control. That is, system 70 is constructed in such a manner that the orientation of polarization of certain elements can be either electronically or mechanically altered rapidly. The following examples of system 70 all concern switching the polarization effect of elements of polarization by electronic control, yet, as will be appreciated by one ordinarily skilled in the art, switching of elements of polarization by mechanical means, although perhaps more complicated than by electronic means, would, as briefly described in the summary of the invention, yield similar results.

Figure 7:
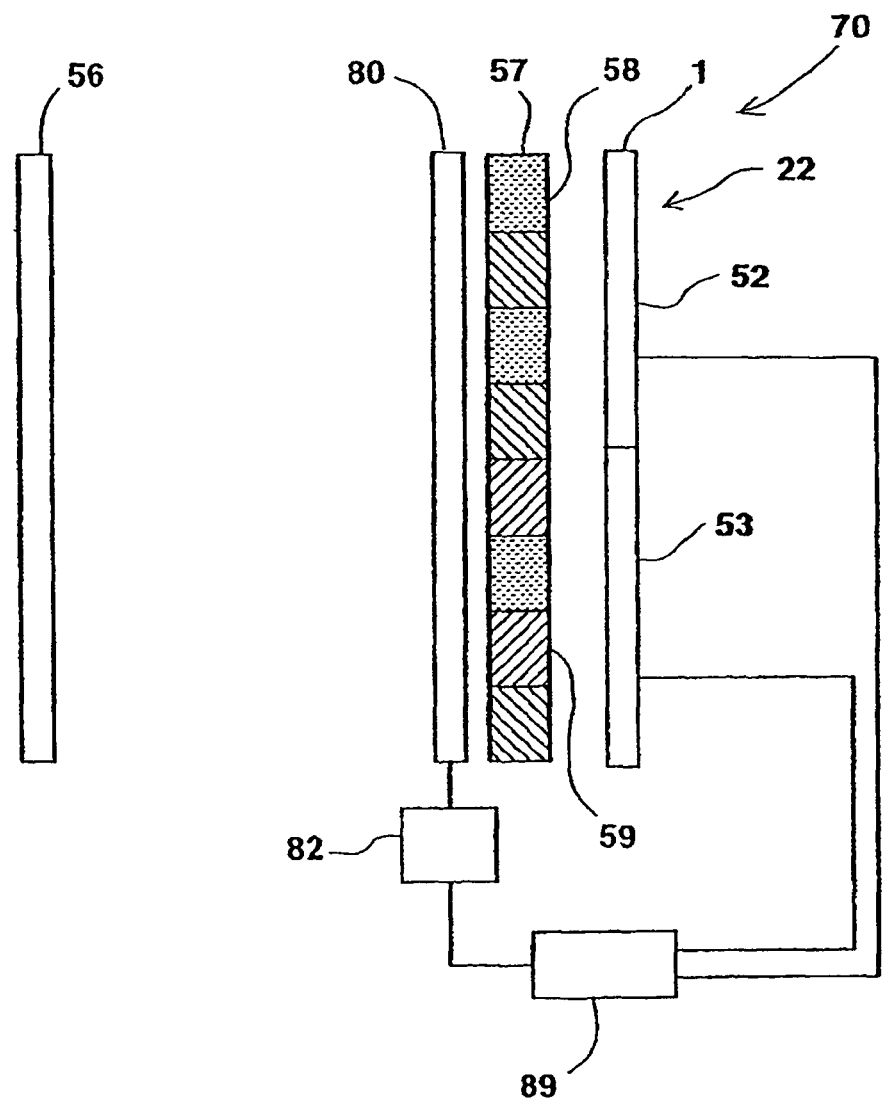
FIG. 7 is a simplified cross-section view of a system for three-dimensional viewing according to a fifth embodiment of the present invention, the system including a switching mechanism for rapid alternation of parts of the display which are visible to each eye at any given time.

FIGS. 7-9 illustrate a first configuration of system 70, yet it should be understood that the example of FIGS. 7-9 is provided by way of illustration, and the scope of the invention is not limited to any particular method of switching polarization. Thus, system 70 includes a display 1 displaying a frame 22, and first and second light polarizing layers 56 and 57. The width of layer 57, and the distance between layer 57 and display 1, as shown in FIGS. 7-9, have been exaggerated for sake of clarity.

Between layer 57 and layer 56, an on/off switchable light rotating means in the form of layer 80 has been added, which layer 80 provides what is known in the art as the Kerr effect. Thus, layer 80 is capable of changing the orientation of polarization of light passing through it by 90 degrees, and can be switched on/off under control of a switching element 82, in turn controlled by a coordinating element 89. If the light rotating activity of layer 80 is inactivated, the layer has no effect and system 70 operates similar to system 50 described above, except for a change in the image content of the regions 52 and 53, to be described shortly. If, on the other hand, the light rotating activity of layer 80 is activated, then the orientation of polarization of light emanating from display 1, passing through each of the subareas 58 and 59 of layer 57, and then passing through activated layer 80, is subsequently perpendicular to what it is when layer 80 is inactivated. Thus, light previously polarized in the first orientation is now polarized in the second orientation, and light previously polarized in the second orientation is now polarized in the first orientation.

As a result, when layer 80 is activated, the effect of layer 56 upon the light reaching it is the exact opposite of that described in the preceding section. Light from left region 52 is prevented from reaching the left eye, but allowed to reach the right eye, and light from right region 53 is prevented from reaching the right eye but allowed to reach the left eye.

Further according to the fifth embodiment of the present invention, the left and right images are used in the manner depicted in FIGS. 8 and 9, which describe alternate states of system 70. In general, each of the images is displayed on the entire width of display 1, but only part of each image is displayed at any given time. FIG. 8 shows the distribution when layer 80 is inactive. In this case left region 52 of display 1 is visible to left eye 54, and right region 53 of display 1 is visible to right eye 55. During this phase, and under the control of coordinating element 89 (shown in FIG. 7) display 1 displays (i.e., presents), in left region 52, a first (e.g., left) part of a first (e.g., left) image, marked as 81 in FIG. 8, and also displays (i.e., presents), in right region 53, a second (e.g., right) part of a second (e.g., right) image, marked as 82a in FIG. 8. The left eye 54 sees the left part of its appropriate image on the left part of the screen as indicated by field of view marked 83, and the right eye sees the right part of its appropriate image on the right part of the screen as indicated by field of view marked 84.

As shown in FIG. 9, during a second phase, which second phase is initiated and controlled by coordinating element 89, layer 80 is activated, the polarization of the light arriving at layer 56 is changed in 90 degrees, and the fields of view are the opposite of what they were in the previous phase described in FIG. 8. Thus, as indicated by field of view marked 87 in FIG. 9, left eye 54 now sees right region 53 located on the right-hand side of display 1, whereas, as indicated by field of view marked 88, right eye 55 now sees left region 52 located on the left-hand side of display 1. At the same time, display 1 displays (i.e., presents) the right part of left image 86 in right region 53, and the left part of the right image 85 in left region 52.

It will however be appreciated to one ordinarily skilled in the art that display 1 of system 70 may simultaneously present additional sets of right and left regions as these regions are depicted in FIGS. 7-9.

Thus, the left eye sees the left part of its appropriate image, on the left side of the display, during the first phase, and the right side of its appropriate image, on the right side of the display screen, during the second phase, whereas the right eye sees the right side of its appropriate image on the right side of the screen during the first phase, and the left side of its appropriate image on the left side of the screen during the second phase. Neither eye sees any part of the image not appropriate to it at any given time. When the switching speed is sufficiently fast, e.g., >20, preferably >30, more preferably >40, most preferably >60 switches per second, and the light intensity provided by the display is sufficiently strong, the visual persistence of the human vision system creates the illusion that each eye sees its full image all the time.

Hence, system 70 provides the user with full-screen full color stereoscopic viewing from an apparently flat screen, without need of special diverging or converging of the eyes to coalesce the left image and right image into a single stereoscopic image, and without necessitating the use of eyeglasses of any kind, which right and left images are not limited by a maximal width.

It should again be noted that the details of the example provided are illustrative only, and not intended to limit the scope of the invention herein described. In particular, using combinations of the methods presented in the above embodiments, the objectives described in the preceding paragraph can be obtained under a variety of different schemes for distributing parts of the left and right images over the display during two or more phases.

Figure 10:
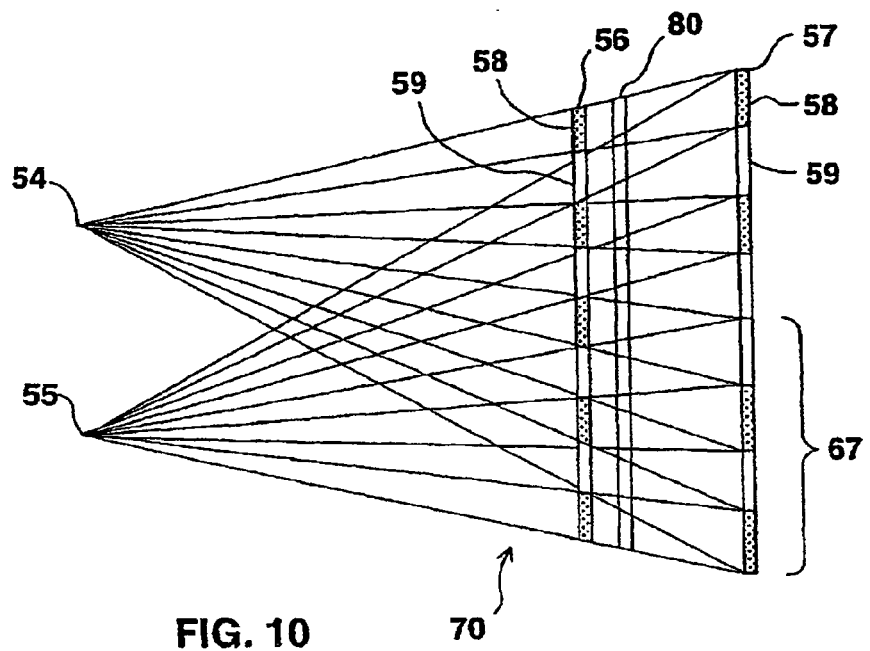
FIG. 10 repeats some of the information of FIG. 6, in a manner convenient for comparison with FIG. 11.
Figure 11:
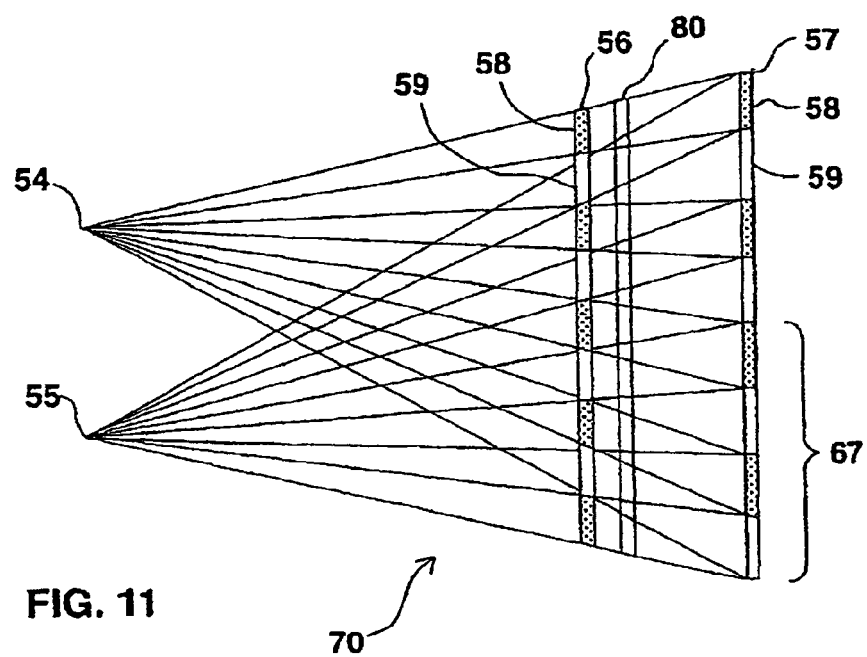
FIG. 11 depicts an example of an alternative arrangement of elements of the system according to the fifth embodiment of the present invention, such that the entire left image or the entire right image may be made visible at any given time to a selected right or left eye.

For example, FIGS. 10 and 11 illustrate a second configuration of system 70, which second configuration involves a simple change in the distribution of polarization orientations, with the effect of causing the entire screen of the display to be visible to left eye 54 when light rotating layer 80 is inactivated, and the entire screen to be visible to right eye 55 when light rotating layer 80 is activated. FIG. 10 is a reproduction of FIG. 6, simplified to facilitate comparisons, to which reproduction switching rotating layer 80 has been added. FIG. 10 shows an arrangement of subareas 58 and 59 providing different orientations of polarization. FIG. 11 is almost identical to FIG. 10, but the arrangement of certain subareas, those under region marked 67, have been switched. Thus, when layer 80 is inactivated, polarizing subareas 58 and 59 of layers 56 and 57 have the effect of making all of the display visible to left eye 54 and blocked from the vision of right eye 55, whereas activating layer 80 has the effect of reversing the activity of layer 56, thereby making the entire display visible to right eye 55 and blocked from the view of left eye 54. This particular arrangement of polarizing subareas 58 and 59 across layer 57 may be of advantage, for example, for use when display 1 is derived from a television, since it would presumably be simpler to alternate between the left and right images than it would be to create composite frames in which each scan line is partly derived from the left image and partly derived from the right image.

Figure 12:
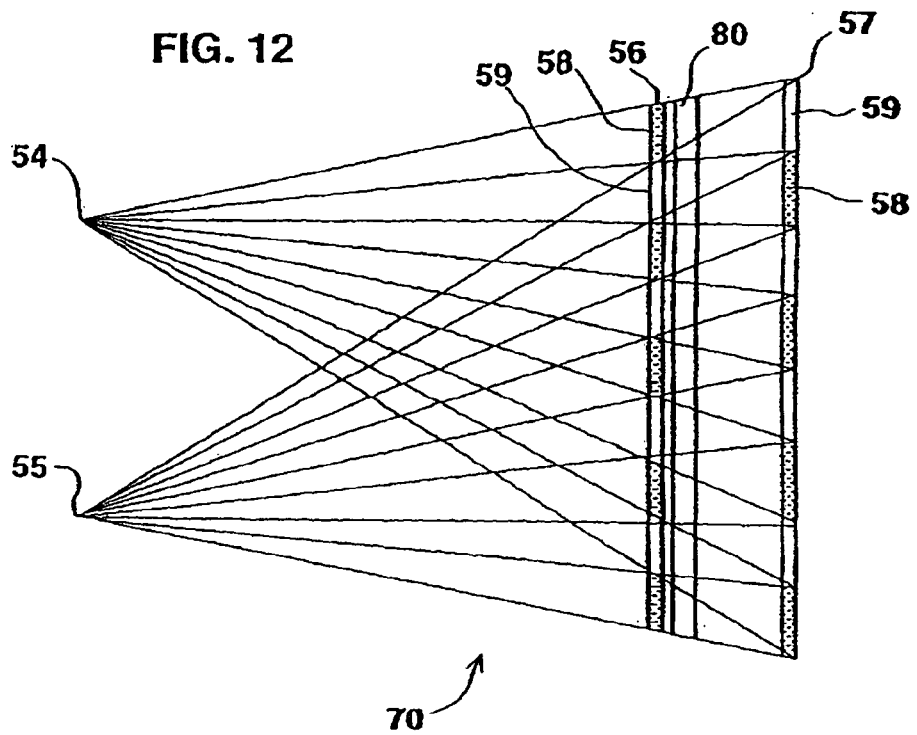
FIG. 12 depicts another example of alternative arrangement of elements of the system according to the fifth embodiment of the present invention.

Yet another example of arranging subareas 58 and 59 is shown in FIG. 12. It is possible to divide the polarizing strips (subareas 58 and 59) in the vertical direction as well. One such division might provide for first level of each strip to have polarization orientations as described in FIG. 11, a second level to have orientations as depicted in FIG. 12, where each of the subareas of layer 57 have orientations opposite to those of FIG. 11. The third, fifth, seventh, etc. levels (not shown) are oriented as the first, and the fourth, sixth, eight, etc. levels (not shown) are oriented as the second. The depth of each level could be that of a single scan line or a single pixel, or any multiplicity thereof which is convenient. Depending on the display used, this distribution scheme is likely to make it easier to produce a display which appears free of flickering, as compared to schemes in which the entire image, or large areas of the image, appear and disappear from a given eye simultaneously. Under this scheme, neighboring pixels or scan lines would appear and disappear as system 70 cycles between phases, and each eye would have an image, grainy but showing the complete image gestalt, present to it at all times, with only a very slight shifting of detail distinguishing the phases from each other.

It should be noted that (i) the sizes of the subareas of layers 57 and 56 need not necessarily be equal throughout each layer; (ii) more than two polarizing layers subdivided into subareas may be used; and (iii) the polarizing capabilities of each subarea need not necessarily fill the entire subarea. Thus, it may be convenient, or even necessary for some applications, to prevent too great limitations on head movement, either to leave opaque zones around polarizing subareas 58 and 59 of layers 56 and/or 57, or to leave 'free' non-polarizing zones there and then compensate for this by using more than two layers (e.g., three layers).

It may be noted that the scheme for distribution of subareas described in the preceding paragraphs is suitable for use in certain contexts even without the presence of switchable light rotating layer 80. For example, using system 50 as presented in FIG. 6, it is possible to distribute the left image and the right image, in a checkerboard pattern of alternating pixels throughout the width and height of the display. Alternatively, slightly larger areas of the images might be grouped, creating a display less sensitive to small movements of the viewer's eyes with respect to the display. The result, in either case, would be a display which is relatively grainy when compared to the relatively smooth and more detailed display made possible, as described, through the use of layer 80, yet it would nevertheless provide full-screen full-color stereoscopic viewing without eyeglasses, which does not require special diverging or converging of the eyes in order to coalesce the left and right images into a single image, and which has the additional advantages of being relatively inexpensive and requiring no electronic hardware, and of being compatible for use with static images such as printed material (e.g., books and magazines) or for use as a physical add-on to existing hardware devices, making the standard hardware able to use appropriate sources of stereoscopic computer programs, video tapes, television programs, etc.

Figure 13:
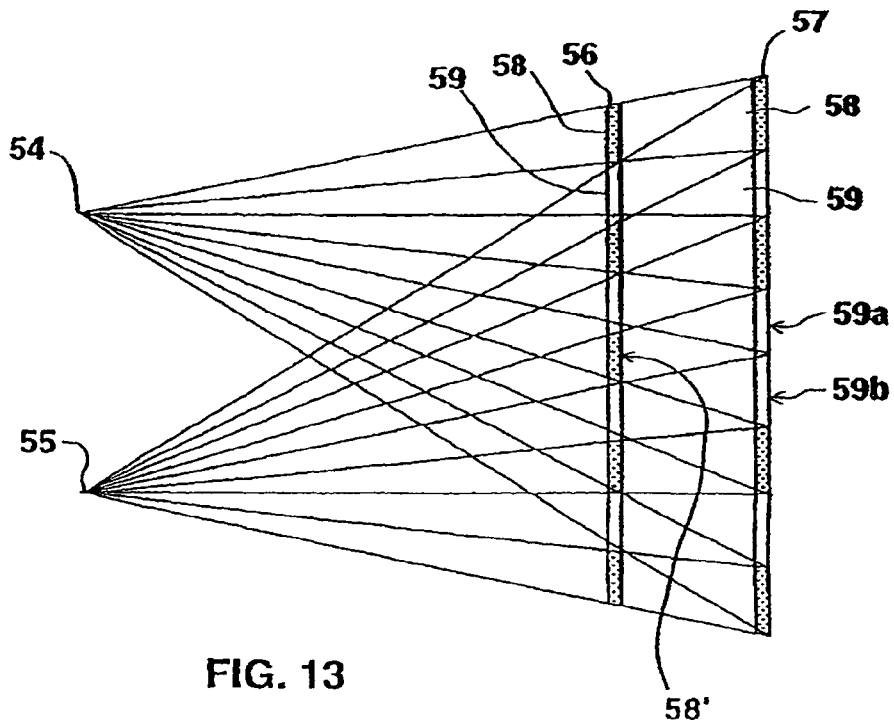
FIG. 13 depicts part of the information of FIG. 6, demonstrating the use of an opaque subarea.
Figure 14:
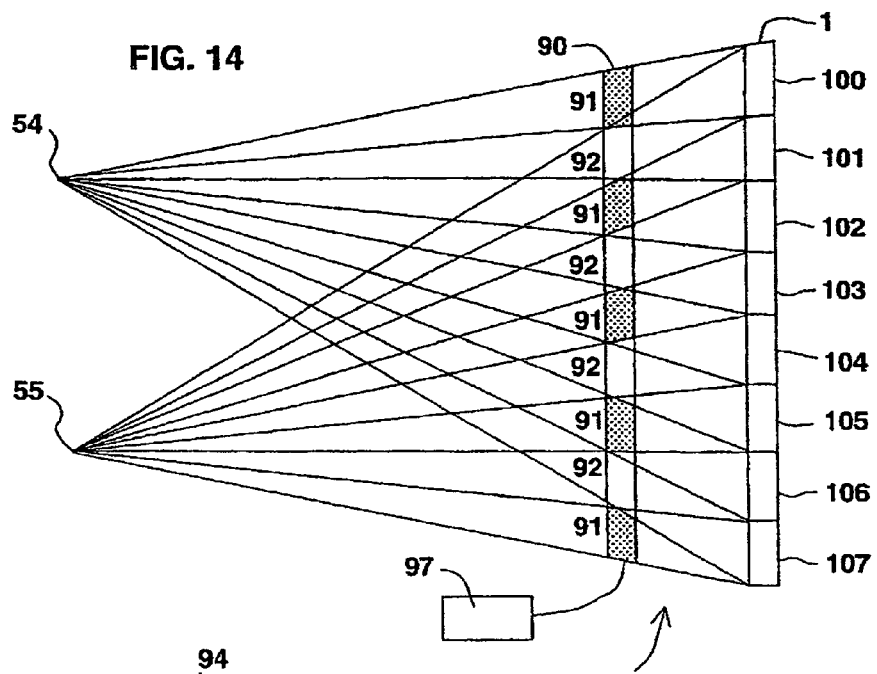
FIG. 14 is a simplified cross-section view of a system for three-dimensional viewing according to a sixth embodiment of the present invention having a switching shutter layer, in a first phase of operation.

With reference now to FIGS. 13-15, presented is a sixth embodiment of the present invention. The sixth embodiment of the invention provides still another system 93 enabling a flatscreen fullcolor stereoscopic vision without eyeglasses, as accomplished in yet a different manner.

Attention is called to a specific subarea 58, marked in FIG. 6 as 58'. The situation of this particular subarea 58' is unusual. Its position, to the right of left region 52 of the display as seen by left eye 54, and to the left of right region 53 of the display as seen by right eye 55, is such that its function with respect to both eyes is that of blocking the transmission of light. Thus, in the polarization distribution arrangement as defined in FIG. 6, subarea 58' never transmits light to either eye. In other words, this subarea, rather than being polarized at any particular orientation, could in fact simply be opaque.

The situation of subarea 58', and its immediate neighborhood, is reproduced in FIG. 13. As shown, if subarea 58' is opaque, light passing through subarea 59*a* is visible to left eye 54 and hidden from right eye 55, while light passing through subarea 59*b* is visible to right eye 55 and hidden from left eye 54.

FIG. 14 shows a generalization of this situation. Here polarization layers 56 and 57 are replaced by a shutter layer 90 divided into alternating subareas 91 and 92. Display 1 is divided into multiple subregions 100-107 in the example of FIG. 14, displaying various portions (i.e., picture elements) of the left and right images as is described hereafter.

Figure 14A:
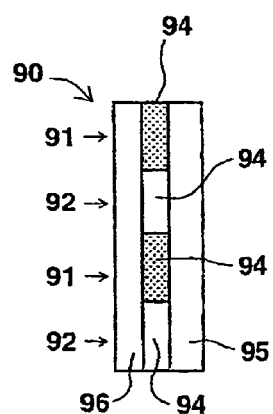
FIG. 14a is a first simplified cross-section view of a switching shutter layer optionally employed in the system of FIG. 14.

Each subarea 91 and 92 of shutter layer 90 may be made either substantially transparent (as shown in white in FIGS. 14 and 15) or substantially opaque (shown in black), under electronic control (i.e., via a coordinating element 97). There are various known techniques for accomplishing this. One example shown in FIG. 14*a* is an arrangement whereby light rotating means 94 are placed between two light polarizing elements 95 and 96 oriented in the same orientation. When any of the light rotating means 94 is inactivated (indicated in white in FIG. 14*a*), light passes through polarizing elements 95 and 96 since they have an identical orientation, and the subarea (92 in the example of FIG. 14*a*) as a whole is light transparent. When, on the other hand, any of light rotating means 94 is activated (indicated in black in FIG. 14*a*), light polarized by first polarizing element 95 and whose orientation is now 90 degrees changed by light rotating means 94 is unable to pass through second polarizing element 96, and the subarea (91 in the example of FIG. 14*a*) as a whole is substantially opaque.

Figure 14B:
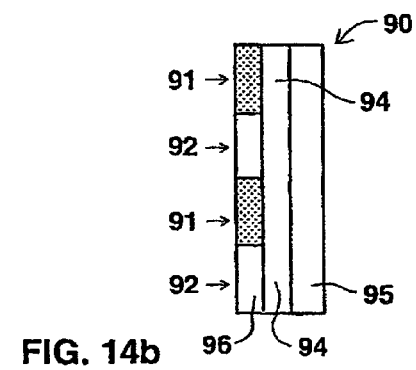
FIG. 14b is a second simplified cross-section view of a switching shutter layer optionally employed in the system of FIG. 14.

Another example to achieve a similar effect as shown in FIG. 14*b*, is an arrangement whereby a light rotating means layer 94 is placed between two light polarizing elements 95 and 96 wherein one of the light polarizing elements (96 in the example of FIG. 14*b*) includes alternating subareas 91 and 92 polarizing light in perpendicular orientations, whereas the other light polarizing layer (95 in the example of FIG. 14*b*) polarizing light in one of the orientations (the orientation of subareas 92 in the example of FIG. 14*b*). As is clearly apparent, activating/deactivating layer 94 results in alternating subareas 91 transparent/opaque and at the same time alternating subareas 92 opaque/transparent, respectively.

Each subareas 91 and 92 of shutter layer 90 in FIG. 14, is then a shutter unit of the type described above under FIG. 14*a* or 14*b*, or of a type in which other technology with the same purpose of creating a unit which is either substantially transparent or substantially opaque under electronic control, and capable of being switched rapidly, is used.

System 93 has two operation phases. In the first phase of operation, depicted in FIG. 14, subareas 91 of shutter layer 90 are made opaque, while subareas 92 of shutter layer 90 are left transparent. Thus, light emanating from subregions 101, 103, 105, and 107 of display 1 is visible to left eye 54, yet hidden from right eye 55, whereas light emanating from subregions 100, 102, 104, and 106 of display 1 is visible to right eye 55, yet hidden from left eye 54.

In the second phase of the operation of system 93, depicted in FIG. 15, subareas 92 of shutter layer 90 are made substantially opaque and subareas 91 are made substantially transparent. Thus, light emanating from subregions 100, 102, 104, and 106 of display 1 is now visible to left eye 54 but is not seen by right eye 55, whereas light emanating from subregions 101, 103, 105, and 107 of display 1 is now visible to right eye 55 but is not seen by left eye 54.

If, then, the left image is displayed on display 1 in such a manner that the areas falling in subregions 101, 103, 105, and 107 are displayed during the first phase of the operation as described above, and areas falling in subregions 100, 102, 104, and 106 are displayed during the second phase of the operation as described above, whereas the right image is displayed on display 1 in such a manner that areas falling in subregions 100, 102, 104, and 106 are displayed during the first phase and areas falling in subregions 101, 103, 105, and 107 are displayed during the second phase, and if there is a sufficiently rapid alternation back and forth between the first and the second phases, then the persistence of vision in the human visual system will create the impression that the left eye is seeing the left image in its entirety in a continuous manner, and that the right eye is seeing the right image in its entirety in a continuous manner. As in the other embodiments previously described, if the right and left images represent a scene viewed from two slightly different perspectives, the resultant visual experience can be that of full-screen binocular stereo-optic illusion of depth, with no need for eyeglasses to be worn by the viewer.

As can be seen from the Figures describing the preceding embodiments and as will be further described subsequently, the geometry of the various arrangements of layers of polarizing means and/or of shutter means is dependent on such factors as the distance of the viewer from the display and the distance between the viewer's left and right eyes.

Figure 16A:
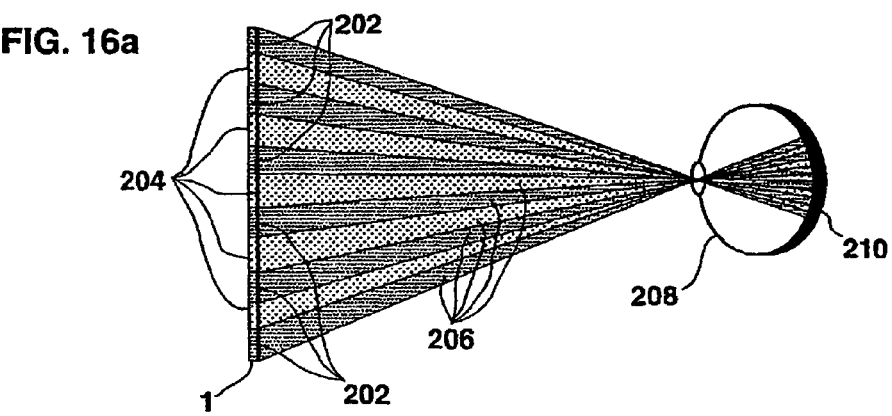
FIG. 16a is a schematic presentation of how a display is normally viewed by the human vision system.
Figure 16B:
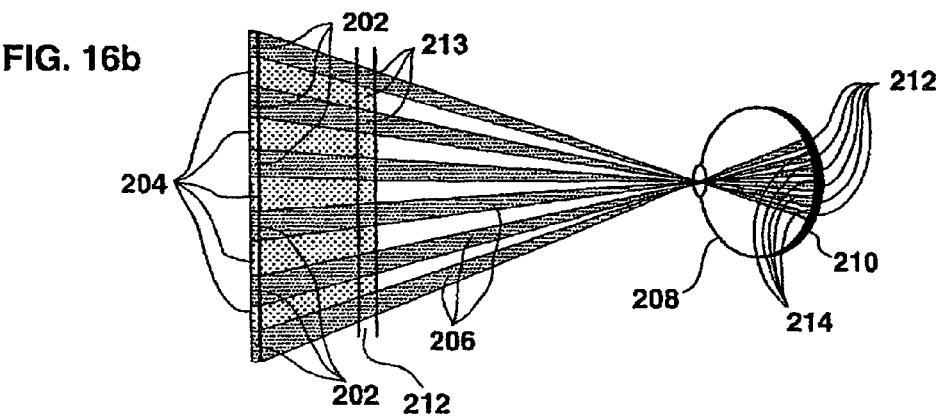
FIG. 16b is a schematic presentation of how a display is viewed by one of the eyes when a blocking system is employed to block some of light emanating from the display, to obtain a three-dimensional perception, according to the present invention.
Figure 16C:
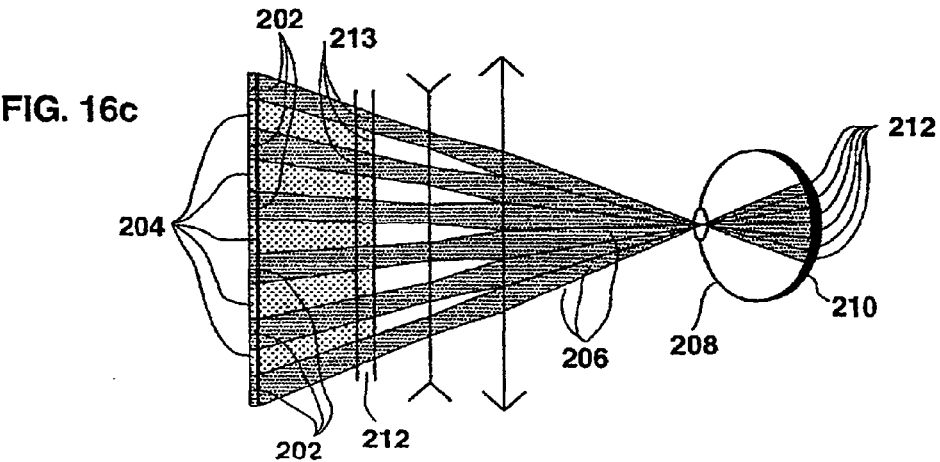
FIG. 16c is a schematic presentation of how a display is viewed by one of the eyes when a blocking system is employed to block some of light emanating from the display, to obtain a three-dimensional perception, as combined with an optical system aimed at reducing graininess, according to the seventh embodiment of the present invention.

With reference now to FIGS. 16*a*-*c*, presented is a seventh embodiment of the present invention. Several systems described hereinabove, as well as various other systems for creating three-dimensional displays as described in the background section above, accomplish their purpose by hiding certain picture elements of the display from one eye, while allowing them to be seen by the other eye, by a light blocking system (e.g., layer 90 of FIG. 14, layers 56 and 57 of FIG. 13, etc.), in order to present a left image to the left eye while hiding it from the right eye, and to present a right image to the right eye while hiding it from the left eye, thereby providing the viewer with a perception of depth.

A disadvantage common to such systems is that for any given eye, part of the screen is invisible at any given time, creating a grainy image. That image is improved and the graininess reduced according to the current seventh embodiment, where lenses or arrays of lenticular elements are interposed between the eye and those components of the system which serve to block areas of the display from view.

This use of lenses is described as used in conjunction with the systems described hereinabove, but it can clearly be seen to be equally relevant to other methods which accomplish the same purpose by blocking alternating pixels or small regions of the screen.

Presented in FIG. 16*a* is a display 1 divided into multiple subregions 202 and 204. The pattern of these subregions, carried by rays of light 206 emanating from display 1 and aimed towards the eye 208, is reproduced within the eye 208 on the retina 210, all as well known in the art.

As shown in FIG. 16b, a light blocking system 212, having light blocking elements 213, has been added for blocking rays of light emanating from subregions 204 of display 1 aimed toward eye 208, while allowing the passage of rays of light emanating from subregions 202 of display 1 aimed toward eye 208, and vice versa regarding the other eye (not shown). Various methods for doing this are described hereinabove, a shutter means (e.g., in a form of a layer) is one example. Thus only the rays of light 206 emanating from subregions 202, but not those emanating from subregions 204, reach eye 208. The result on retina 210 is a series of areas 212 reproducing subregions 202 of the display, interspersed with blank areas 214 where the display has been blocked and no part of the image is represented.

As shown in FIG. 16c, a diverging lens 216 and a converging lens 218 are placed between blocking system 212 and eye 208, such that rays of light 206 are made to expand as they pass through diverging lens 216, and such that at an appropriate distance the expansion is halted by converging lens 218. When the focal lengths and placements of the lenses 216 and 218 are chosen appropriately, the result is that the rays of light arriving at eye 208 and retina 210 are spread more than they are under the situation described in FIG. 16b (i.e., without the intervention of the lenses), such that areas 212 on the retina, which reproduce subregions 202 of display 1, present a continuous image without the blank areas 214 between areas 212 of the image obtained under the situation of FIG. 16b.

Thus in this embodiment, although the pixel resolution of the image on display 1 is half that of what it would have been without the intervention of blocking system 212, the image displayed is nevertheless smooth and complete and does not present the graininess of the image which would be seen without the intervention of the lens system, i.e., lenses 216 and 218.

Clearly, lenses 216 and 218 can be a pair of single lenses, or two individual arrays of diverging and converging lenticular elements for each blocking element 213, or any other combination with the requisite optical characteristics of divergence and convergence.

Figure 17:
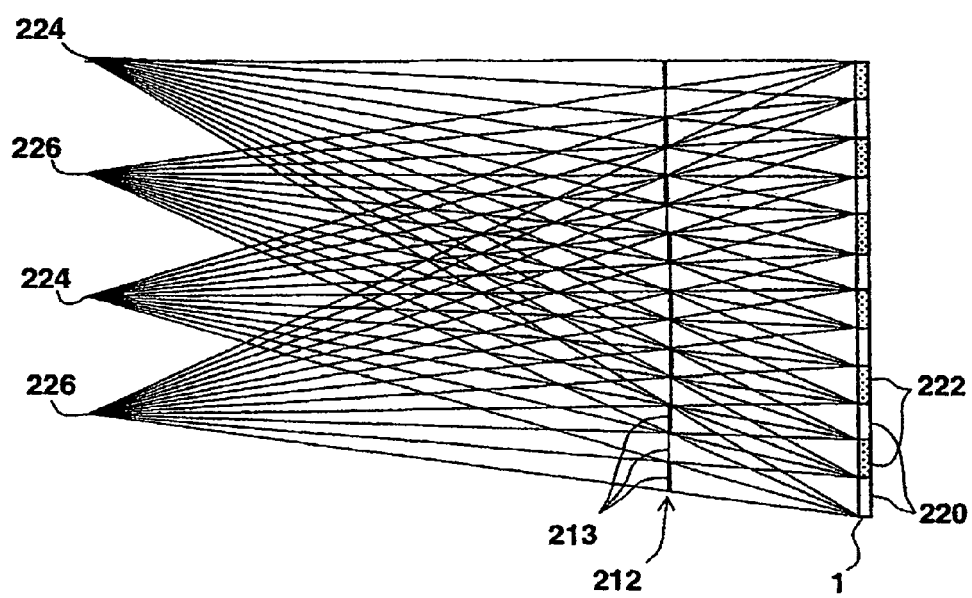
FIG. 17 is a schematic presentation of how a display is viewed by two viewers simultaneously, when a blocking system is employed to block some of light emanating from the display, to obtain a three-dimensional perception, according to the present invention.

With reference now to FIG. 17. The systems according to the embodiments of the present invention described herein in this document are designed to enable multiple viewers to three-dimensionally view a display at the same time.

As shown in FIG. 17, a display 1 which is divided into first 220 (in white) and second 222 (in black) subregions, presenting picture elements of left and right images, respectively, can be viewed three-dimensionally by two left eyes 224 and two right eyes 226 of two viewers, provided that a suitable light blocking system, 212 having light blocking elements 213 as for example described above is disposed at a suitable distance between display 1 and the viewers. It is clear that the described system is also suitable for multiple (e.g., more than two) viewers.

Figure 18:
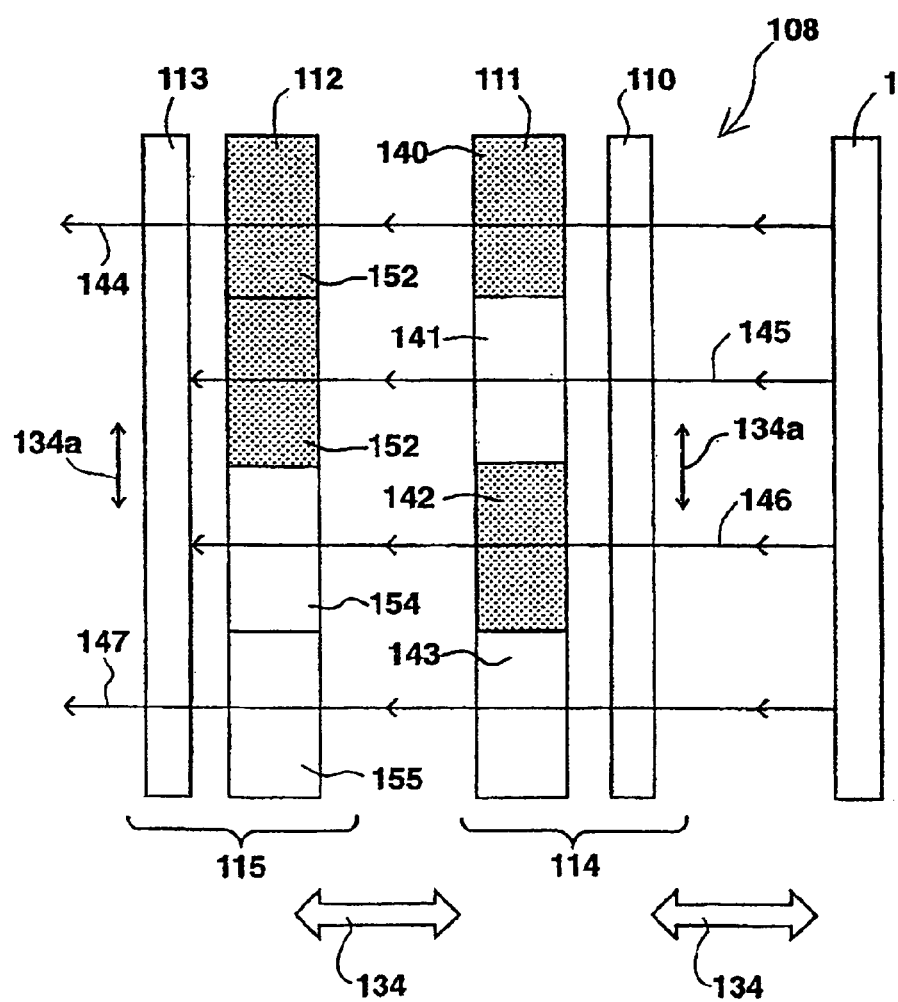
FIG. 18 is a simplified cross-section view of a system for three-dimensional viewing according to an eighth embodiment of the present invention having polarizing layers whose subareas can be modified under electronic control.
Figure 19:
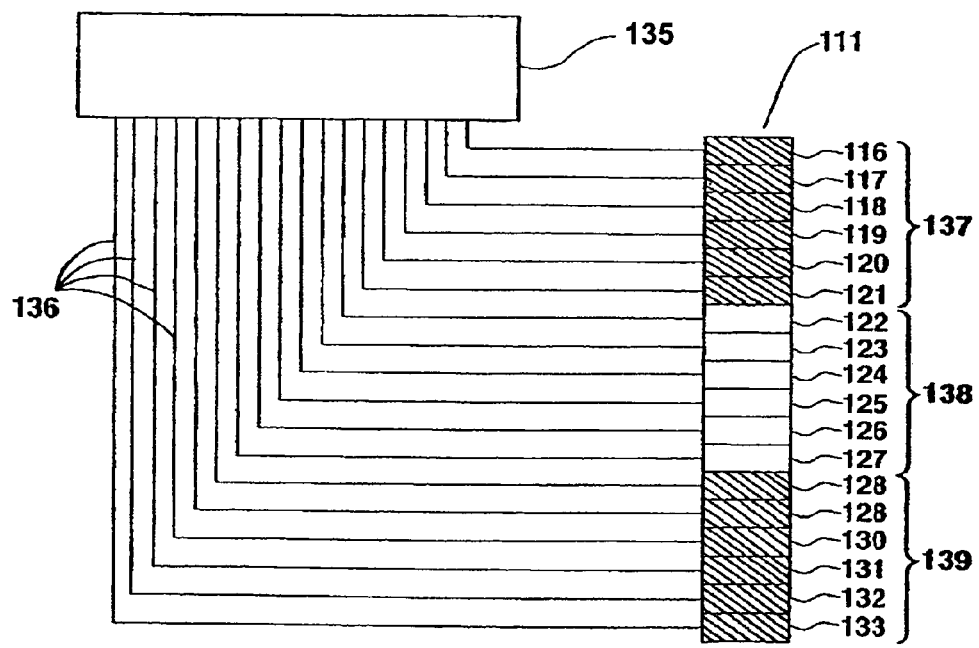
FIG. 19 is a simplified cross section view of a section of a polarizing layer according to the eighth embodiment of the present invention presenting details of a switching mechanism for one such layer.
Figure 20:
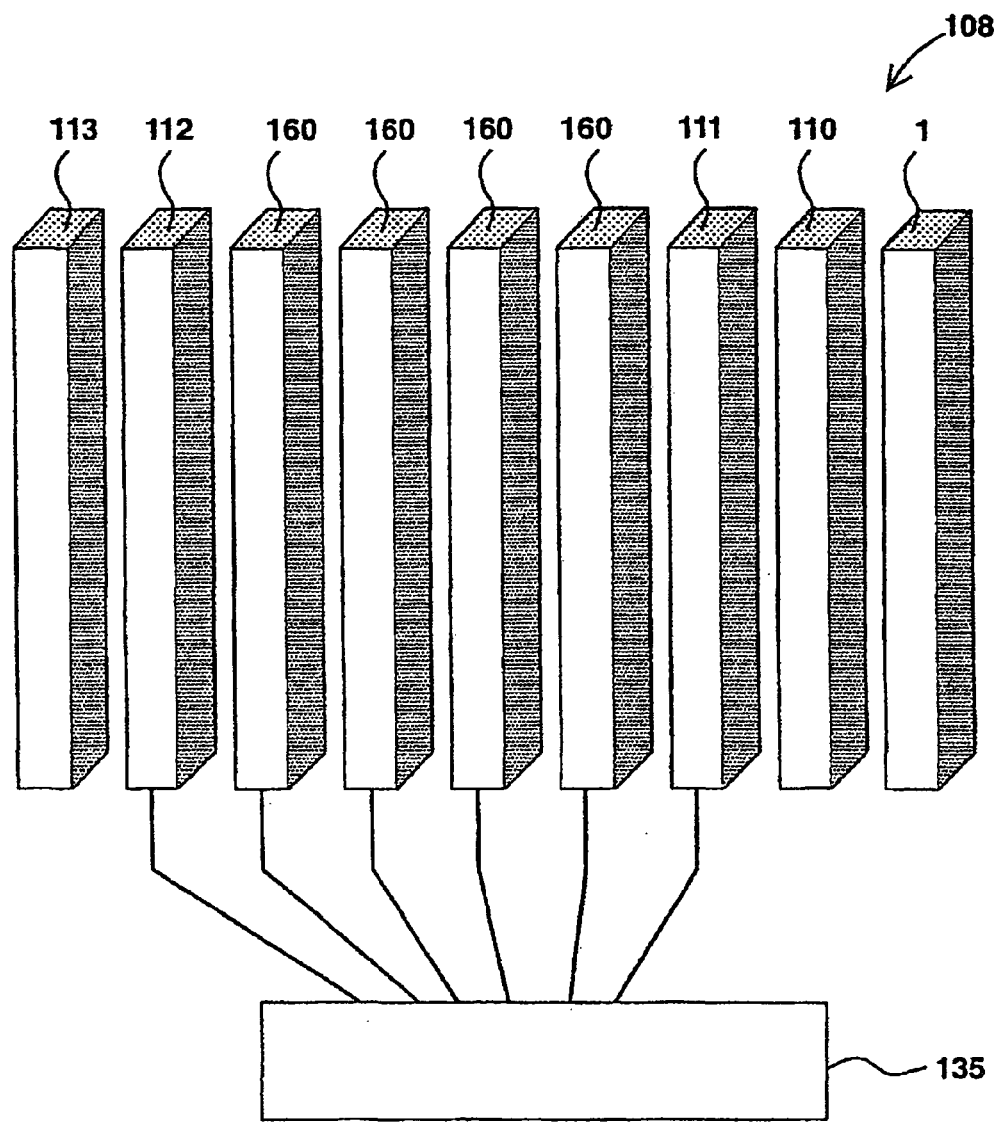
FIG. 20 depicts an array of polarizing layers at varying distances from the display according to the eighth embodiment of the invention.

With reference now to FIGS. 18-20, presented is an eighth embodiment of the present invention. According to the eighth embodiment, systems 50, 70 and 93 described under the fourth through sixth embodiments above are modified so as to be adjustable and thus capable of accommodating various positions and distances of the viewer from the display.

Thus, the eighth embodiment and ones to follow it hereinbelow, incorporate means for varying the geometry of the subareas of polarizing layers (such as layers 56 and 57 of FIG. 6), or of the subareas of shutter layers (such as layer 90 in FIGS. 14-15), under the control of switching means. Accordingly, each subarea is itself composed of a plurality of elements. Depending on the embodiment in which this variable geometry is implemented, each element is either an independently controllable shutter element (an element of "shutter means" as defined), or an independently controllable subarea of light rotating means capable, when activated, of changing the polarization orientation of polarized light passing through it 90 degrees, or an element composed of a combination of independently controllable light rotating means combined with a polarizing layer.

As shown in FIG. 18, the eighth embodiment of the present invention is a modification of system 50 of the fourth embodiment described hereinabove, referred to herein as system 108. FIG. 18 may be considered as a schematic view of parts of display 1 and polarizing layers 57 and 56 of FIG. 6, yet in FIG. 18 describing the eighth embodiment, polarizing layers 56 and 57 are modified as follows. Former layer 57 is now labeled 114 whereas former layer 56 is now labeled 115. Layer 114 includes a first and a second sublayers 110 and 111, respectively, whereas layer 115 includes a third and a fourth sublayers 112 and 113, respectively.

Sublayers 110 and 113 are of polarizing means, functioning similarly to layers 56 and 57 as described for FIG. 6, yet in the example of FIG. 18, sublayers 110 and 113 are not themselves divided into subareas with differing polarization orientations, rather both sublayers 110 and 113 pass light polarized in the first orientation throughout the entire sublayer.

Both sublayers 111 and 112 include switchable light rotating means divided into a plurality of independently switchable elements. FIG. 19 presents a detail view of part of one such sublayer 111, which is divided into a plurality of elements 116-133. Each element 116-133 is independently connected by connecting means 136 to a multi-line controlling switching means 135, by which each element 116-133 of layer 111 may be activated or inactivated. Switching means 135 is typically used to activate groups of elements selected from elements 116-133. In the example given in FIG. 18, elements 116-121 are activated as indicated by their dark color, elements 122-127 are inactive as indicated by their light color and elements 128-133, like elements 116-121 are also activated, etc., creating activated blocks 137 and 139, and inactive block 138. Blocks 137-139 of elements 116-133 of layer 111, both active and inactive, are used in conjunction with polarizing sublayer 110 (FIG. 18) to produce the functionality described for layer 57 of FIG. 6.

Sublayer 112, like sublayer 111 is also constructed according to as shown in FIG. 19 and described hereinabove for sublayer 111, and the active and inactive blocks of layer 112, are similarly used in conjunction with polarizing sublayer 113, to produce the functionality described for layer 56 of FIG. 6.

As shown in FIG. 18 and described above, layer 114 is constructed of two sublayers, sublayer 110 of polarizing means, polarizing light in the first orientation, and sublayer 111 of switchable light rotating means constructed as described in FIG. 19. Subareas 140 and 142 (each made of a plurality of elements not detailed in FIG. 18) are marked dark as being activated (that is, each of the elements of which each of subareas 140 and 142 are composed of is activated), whereas subareas 141 and 143 are marked light as being inactivated.

As further shown, layer 115, like layer 114 is also constructed of two sublayers, sublayer 113 of polarizing means, polarizing light in the second orientation, and sublayer 112 of switchable light rotating means constructed as described for sublayer 111 in FIG. 19. Subareas 152 and 153 (each made of a plurality of elements not detailed in FIG. 18) are marked dark as being activated (that is, each of the elements of which each of subareas 152 and 153 are composed is activated), whereas subareas 154 and 155 are marked light as being inactivated.

Lines 144, 145, 146, and 147 represent four possible combinations of activation/inactivation which can be encountered by rays of light originating from display 1, traversing layer 114 and then encountering layer 115 while traveling in the direction of the viewer's eyes. Light ray 144 encounters activated regions in both sublayer 111 and 112, light ray 145 encounters an activated region only in sublayer 112, light ray 146 encounters an activated region only in sublayer 111, and light ray 147 encounters no activated regions.

Since in the example of FIG. 18, polarizing sublayer 110 polarizes light in the first orientation, it is apparent that for subareas of layer 114 in which layer 111 is not activated (e.g., subareas 141 and 143 in FIG. 18), layer 114 as a whole functions just like subareas 58 of layer 57 of FIG. 6. Thus, sublayer 110 polarizes light passing through it in the first orientation, and the non-activated subarea (141 or 143) of layer 111 makes no changes the polarization of that light. As for rays of light passing through areas of layer 114 for which sublayer 111 is activated (e.g., subareas 140 and 142 in FIG. 18), the situation is different. These rays are also polarized in the first orientation by their passage through sublayer 110, but then they are rotated 90 degrees into the second orientation by the activated subareas 140 or 142 of sublayer 111 through which they pass. Thus, these activated subareas of layer 114 have the same functionality as subareas 59 of layer 57 of FIG. 6.

Consideration is now focused on these light rays as they progress to layer 115. Due to the effect of layer 114, light ray 144 arrives at layer 115 polarized in the second orientation. There light ray 144 encounters activated subarea 152 of switchable rotating sublayer 112. Activated sublayer 112 rotates light ray 144 90 degrees back to the first orientation. Light ray 144 proceeds onto polarizing sublayer 113 having the first orientation, which sublayer 113 consequently passes ray 144 on towards the viewer's eye. Light ray 145, which is polarized in the first orientation after passing through layer 114, as described above, encounters activated subarea 153 of sublayer 112, which rotates it 90 degrees to the second orientation. This light ray then encounters sublayer 113 which has the first orientation, and consequently is blocked and goes no further. Light ray 146 arrives at layer 115 polarized at the second orientation, encounters sublayer 113 and is blocked. Light ray 147 arrives at layer 115 polarized at the first orientation. It's polarization is unchanged by inactivated subarea 155 of sublayer 112, thus, it is then passed on through sublayer 113 and proceeds onto the viewer's eye. From the above description it is clear that sublayer 113 functions as an analyzing filter for polarized light.

Thus, for subareas of layer 112 which are inactivated at a given time, layer 115 as a whole passes light of the first orientation and blocks light of the second orientation, whereas for subareas of layer 112 which are activated at that time, layer 115 as a whole passes light of the second orientation and blocks light of the first orientation. In other words, for subareas where layer 112 is inactivated, layer 115 behaves like subareas 58 of layer 56 of FIG. 6, whereas in subareas where layer 112 is activated, layer 115 behaves like subareas 59 of layer 56 of FIG. 6.

Hence, layer 115 of FIG. 18 provides the same functionality as that described for layer 56 of FIG. 6, whereas layer 114 provides the same functionality as that described for layer 57 of FIG. 6.

Yet, in contradistinction to system 50 of the fourth embodiment presented in FIG. 6, according to the present eighth embodiment, the sizes and placements of the various subareas are not physically fixed by the material construction, rather these sizes and placements are subject to configuration using multiple switching means 135, as described in the discussion of FIG. 19.

Consequently, the size and placement of activated and inactivated subareas of layers 111 and 112 of FIG. 18 can be varied under electronic control. In turn, the various subareas can now be effectively modified in such ways that various aspects of the geometry of the embodiment can be adjusted to the convenience of the viewer, taking into account his position, personal characteristics as the distance between his eyes, the degree to which he tends to move his head while watching the display, and various other considerations of convenience and taste.

It is also clear, that various aspects of the geometry of the embodiment can be adjusted to the convenience of the viewer, if only layer 115 is constructed as described by FIG. 18, while layer 114 is made in a fixed geometry as for example described above under the forth embodiment concerning layer 57 of for Example of FIG. 6. Similarly, if layer 114 is constructed as described by FIG. 18, while layer 115 is made in a fixed geometry as for example described above under the forth embodiment concerning layer 56 of for Example of FIG. 6, various aspects of the geometry of the embodiment can be adjusted to the convenience of the viewer.

Finally, it may be noted that even if both layer 114 and layer 115 (or the equivalent, layers 56 and 57 of FIG. 6) are constructed of fixed geometry, either or both of the layers may yet be moved sideways with respect to the viewer and to the display using mechanical means, as indicated by arrows 134*a* in FIG. 18, so as to accommodate the system to the particular position of the viewer at any given time.

A remaining dimension in which one might wish to vary the system presented in FIGS. 18 and 19 is the distance between layers 114 and 115 (or layers 56 and 57 in FIG. 6), and between these layers and display 1. This can be accomplished in two alternative ways.

Firstly, as indicated by arrows 134 mechanical means may be used to simply slide the layers closer together or further apart from one another and from display 1. This is also the case for any of the embodiments described in this document, wherein change in position of a viewer may be compensated either electronically or mechanically.

Secondly, with reference now to FIG. 20, accomplishing the same purpose under electronic control with no moving parts involved is described. As shown in FIG. 20, multiple layers 160 each identical to layer 111 (or 112) are placed between sublayers 111 and 112. Since any of sublayers 111, 112 or 160 have no substantial influence on the light unless they are activated, and since each layer by definition can be activated or not activated under control of electronic switching means 135, any pair from among the sublayers 111, 112 and 160 can be used as described for layers 111 and 112 in FIG. 6. Thus, it will be appreciated that not only do layers constructed as in FIG. 19 allow for flexibility in the size and placement of subareas along the orientation of their construction, but that an array of such layers along the axis joining the viewer and the display provides for flexibility in fixing the distance of the active layer one from the other and their distance from the display.

Since the construction principles elucidated in FIG. 19 can in fact refer to elements (e.g., layers) of arbitrary shape, and in particular to elements which could be organized in a checkerboard pattern rather than in a pattern of strips as described in FIG. 19, it is clear that the arrangement gives total flexibility, under electronic control, concerning the placement and spacing of the active layers of the device.

Figure 21:
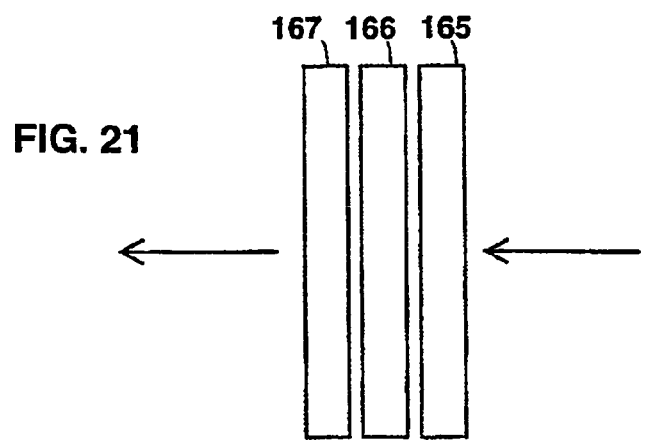
FIG. 21 is a simplified cross-section view of a subarea of a shutter layer.
Figure 22:
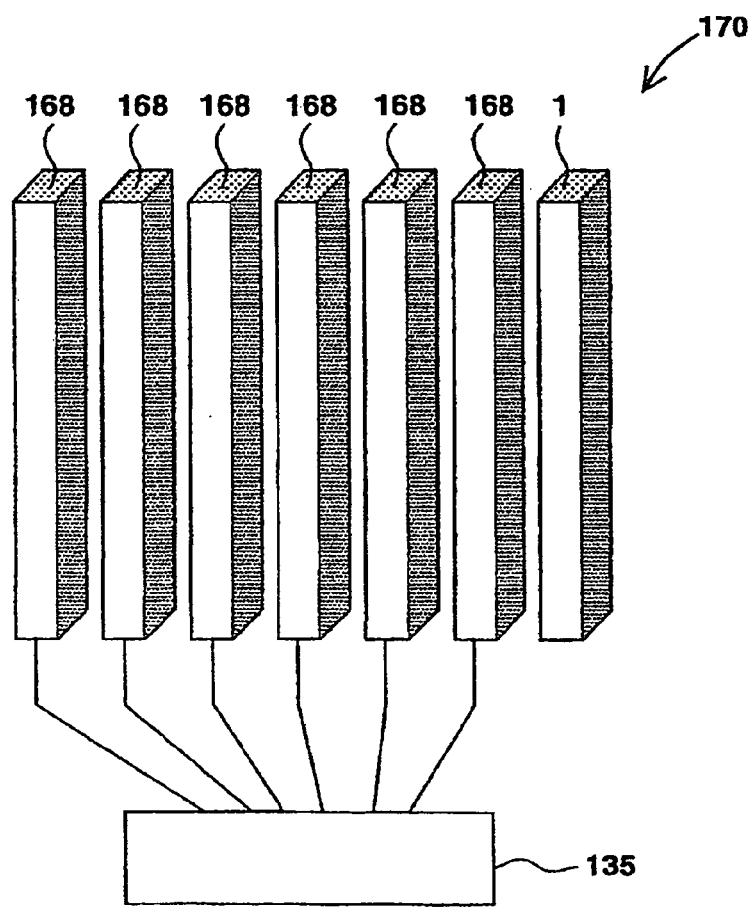
FIG. 22 depicts an array of shutter layers at varying distances from the display according to a ninth embodiment of the present invention.

With reference now to FIGS. 21-22, presented is a ninth embodiment of the present invention. According to the ninth embodiment provided is a system 170 to enable flexibility of the internal geometry of system 93 as described above under the sixth embodiment of the present invention (FIGS. 14-15). As shown in FIGS. 14-15, shutter means formed as layer 90 having subareas capable of being turned on/off under electronic control. As shown in FIG. 14a and described above, one method for constructing such shutter means is to sandwich a layer of switchable light rotating material (i.e., providing what is known in the art as the Kerr effect) between two light polarizing layers having the same orientation, as now redepicted in FIG. 21. Thus, light entering a first polarizing layer 165 having a first orientation traverses a switchable light rotating layer 166. If layer 166 is inactivated, the light is unaffected and passes freely through a second polarizing layer 167, itself also oriented in the first orientation. If, on the other hand, layer 166 is activated, then the orientation of the polarized light passing through it is rotated 90 degrees, giving the light the second orientation. This light is then blocked by polarizing layer 167 which has the first orientation.

It will be appreciated that layer 166 can be constructed similar to layer 111 as described in FIG. 19, and that consequently it can be divided into subareas as desired, controlling each of the subareas under electronic control. Thus, the size and spacing of the subareas (as used in FIGS. 14 and 15) can be adjusted according to the convenience, placement, and personal characteristics and preferences of the viewer.

It may be noted that here, as with the preceding eighth embodiment, the flexibility provided in varying over time the choice of elements involved in each subarea provides great versatility in the use of these elements. For example, rather than simply assigning sets of elements to subareas and then switching the subareas on/off as blocks, as was described in FIGS. 14 and 15, one might create a light blocking subareas of a particular width, and then add individual elements to one side of the blocking subarea while removing (inactivating) elements from the other side of the blocking subarea, with the effect of causing the light blocking subarea (or block) to be translated along the layer. This effect may be useful, for example, to accommodate viewers whose position is too far from the display to allow the size of blocking blocks to be comparable to the size of pixels on the display.

As for the eighth embodiment, the ninth embodiment too can provide flexibility along the axis stretching between the viewer and the display. As shown in FIG. 22, light emanating from display 1 and directed towards the user's eye encounters a plurality of shutter layers 168, each of which is constructed as described above and depicted in FIG. 21. This arrangement provides system 93 of the sixth embodiment (as described by FIGS. 14-15) flexibility in the placement of the shutter layers along the axis joining the viewer and the display, just as the arrangement shown in FIG. 20 provided such flexibility for the fourth embodiment of the present invention.

Figure 23:
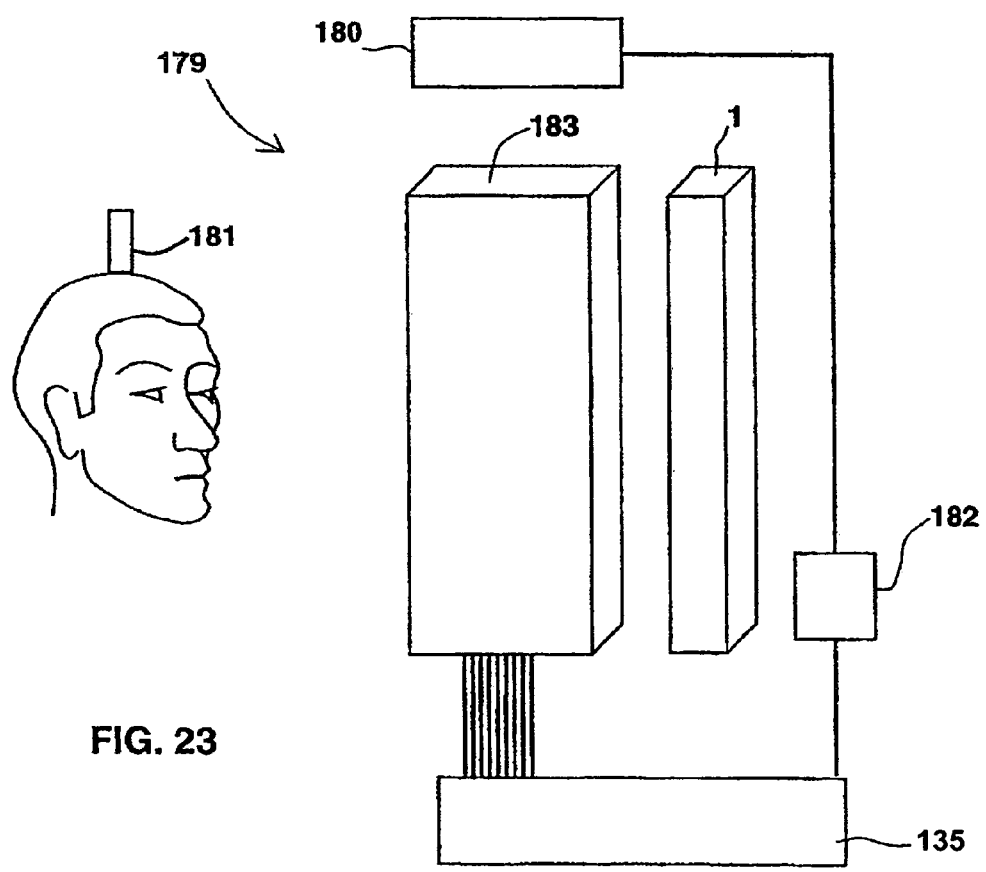
FIG. 23 depicts means to control a system for three-dimensional viewing, according to a tenth embodiment of the present invention, whose internal arrangements of subareas are modified automatically under the control of means for sensing the position of the viewer with respect to the system.

With reference now to FIG. 23, presented is a tenth embodiment of the present invention. According to the tenth embodiment, provided is means 179 for sensing the position of the viewer with respect to the display, and using that information, as interpreted by programmed computing means 182, to control switching means 135. As is recalled from FIGS. 19, 20, and 22, switching means 135 is used to modify the size and placement of the various subareas of the various layers (grouped together in FIG. 23 under 183) in order to adapt the system to the position of the viewer with respect to the display.

There are a variety of known techniques whereby the position of the user can be sensed. For one example, a "three-dimensional mouse" 181, marketed by Pegasus Ltd. corporation of Jerusalem Israel, is capable of reporting its location in three-dimensions with respect to a predefined origin point. If "mouse" 181 was worn by the viewer in a manner which retains a fixed relationship between the position of "mouse" 181 and the position of the viewer's eyes, and the system were then calibrated to take into account the relationship between the position of mouse 181 and the position of the eyes, then by simple calculation the position of the eyes with respect to the system can be determined.

Another technique which might be used would be the wearing of a pin with a pair of emitters of infrared or visible light, coupled with a sensor capable of reporting the angle of the emitter with respect to the system, and the angular distance between the two emitters (from which its distance may be calculated). For a more complex but more convenient example, given a video camera 180 mounted on the system and pointing generally in the direction of the viewer, computing means can be programmed to identify the viewer's face in the received picture, and the eyes within the face. Once calibrated, such a system could report the direction of the eyes with respect to the display, and, by triangulation, their distance.

The information generated by any such system for determining the placement of a viewer with respect to the apparatus can then be used, subsequent to appropriate calculation, to determine which elements are to be activated by switching means 135 to produce the desired configuration.

Figure 24:
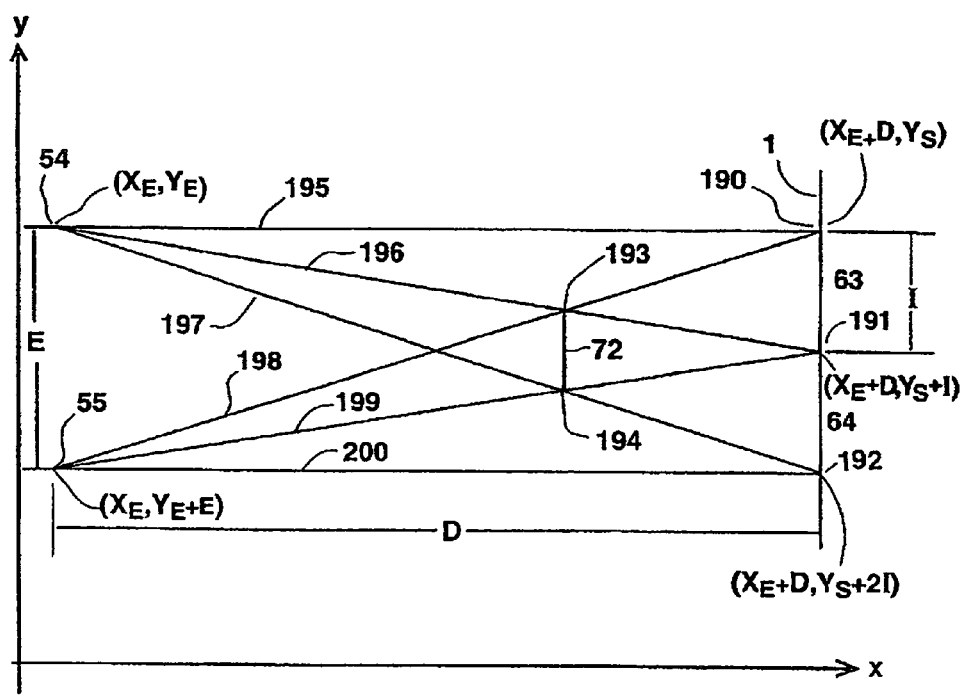
FIG. 24 depicts part of a system for three-dimensional viewing in Cartesian coordinates, as a basis for distance and size calculations.

FIG. 24 shows an example of how distance and position information can be used in calculation. The following paragraph refers to the terms of FIGS. 13-15 and the sixth embodiment, but clearly can be generalized to the other embodiments in obvious manner.

In FIG. 24 a representative area from FIG. 13 is shown in the context of Cartesian x/y coordinates. Let E be the distance between left eye 54 and right eye 55, D the distance between each of eyes 54 and 55 and display 1, and I the length of segment of image (63, 64) on the display, and if the position of left eye 54 is $(X_E, Y_E)$, and if the height 63 of the start of a given segment on the display is taken to be $(Y_S)$, then the following coordinates describe the associated points on the Figure:

$(X_E, Y_E+E)$ is the position of the right eye 55;
$(X_E+D, Y_S)$ is the position of point 190 on the display;
$(X_E+D, Y_S+I)$ is the position of point 191 on the display;
$(X_E+D, Y_S+2I)$ is the position of point 192 on the display;
$(X_E+D, Y_S+nI)$ is the position for the "n"th succeeding point on the display.

Simple algebra can now be used to derive equations for each of the lines-of-sight (195, 196, 197, 198, 199, 200) appearing in FIG. 24, and for any similar lines extending above and below the section of the system depicted.

Solving the simultaneous equations for lines of sight 196 and 198 yields point 193. Solving the equations for lines of sight 197 and 199 yields point 194. Points 193 and 194 are the endpoints of shutter segment 72. Once points 193 and 194 are known, the position and the length of shutter segment 72 has been determined.

In this manner, given information about the position of the eyes with respect to the display, the size of the display, and the number of areas into which the image is to be divided, one can calculate the position of the shutter layer and the appropriate configuration of its internal subdivisions. In similar manner, given information about the position of the eyes, the size and position of the display, and the position and orientation of shutter layer 90, one can calculate the sizes and positions for the subareas into which shutter layer 90, and the image being displayed on display 1 must be divided.

As heretofore described, switching means 135 can select elements of rotating means which are activated in the context of the eighth and ninth embodiments, thereby adapting the internal geometry of layers and subareas of those embodiments to the distance and angle of view of the viewer. Since these processes are all controlled at electronic speeds, the internal geometry of the system can adapt to changes in the viewer's position on an ongoing basis.

It will be appreciated by one ordinarily skilled in the art that having layer 57 positioned contiguously with display 1 and ensuring that its subareas coincide with the subregions (e.g., pixels) of display 1, enables use of layer 56 having subareas of a fixed dimension, while adjusting the system for a viewer positioned at different distances from display 1 simply involves translating layer 56 back or forth relative to display 1.

It should be noted however, that in some applications mechanical means, being simpler and less expensive, would be preferable.

With reference now to FIGS. 25-30, presented is an eleventh embodiment of the present invention, directed at providing three-dimensional viewing for multiple viewers. The above embodiments of the invention describe various systems for allowing selected regions of a display to be seen by a viewer's left eye while blocking them from the view of his right eye, and at the same time allowing other selected regions of the display to be seen by a viewer's right eye while blocking them from the view of his left eye. It is stated with respect to various embodiments above that the systems described can be used to provide for multiple viewers of the same display. Herein, one such embodiment is described, using a modification of the techniques described under the eighth embodiment above, to provide three-dimensional binocular vision without eyeglasses for multiple viewers of the same display at the same time.

Figure 25:
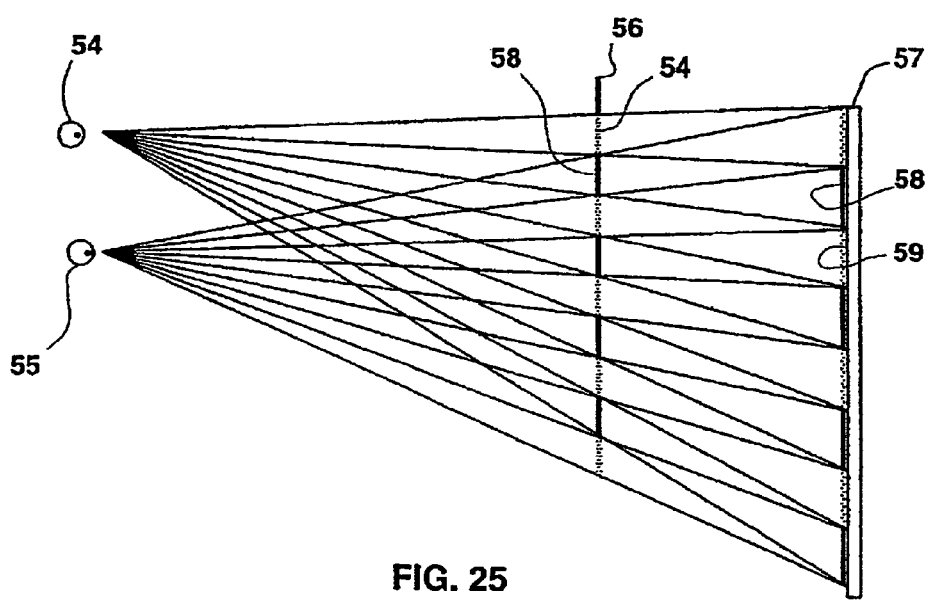
FIG. 25 is a reproduction of FIG. 11, with the switching layer removed.

FIG. 25 is a reproduction of FIG. 11, with the switching layer 80, shown in FIG. 11, removed. As in FIG. 11, the polarizing subareas 58 and 59 of layers 56 and 57 are presently arranged so that the left eye 54 sees the entire display 1, and the right eye 56 is prevented from seeing display 1.

In the current embodiment, layer 57 is contiguous to display 1 and is preferably constructed according to the description of the construction of the layer 114 (combining sublayers 110 and 111) as described above under FIG. 18, whereas layer 56, the layer nearest the viewer, is preferably constructed according to the description of the construction of layer 115 (combining sublayers 112 and 113) as further described under FIG. 18 above. Recall that sublayers 111 and 112 are described in greater detail under FIG. 19 and include a set of individually switchable Kerr elements capable (when switched on) of rotating the axis of polarization of linearly polarized light by 90 degrees.

Figure 26:
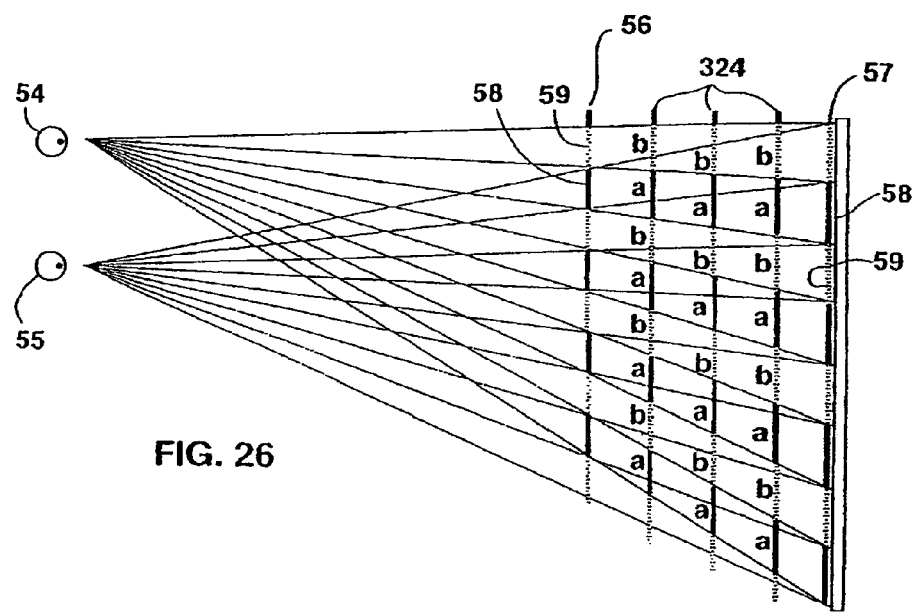
FIG. 26 is a simplified cross-section view of a system for three-dimensional viewing according to an eleventh embodiment of the present invention, the system enabling three-dimensional viewing by more than one viewer.
Figure 27:
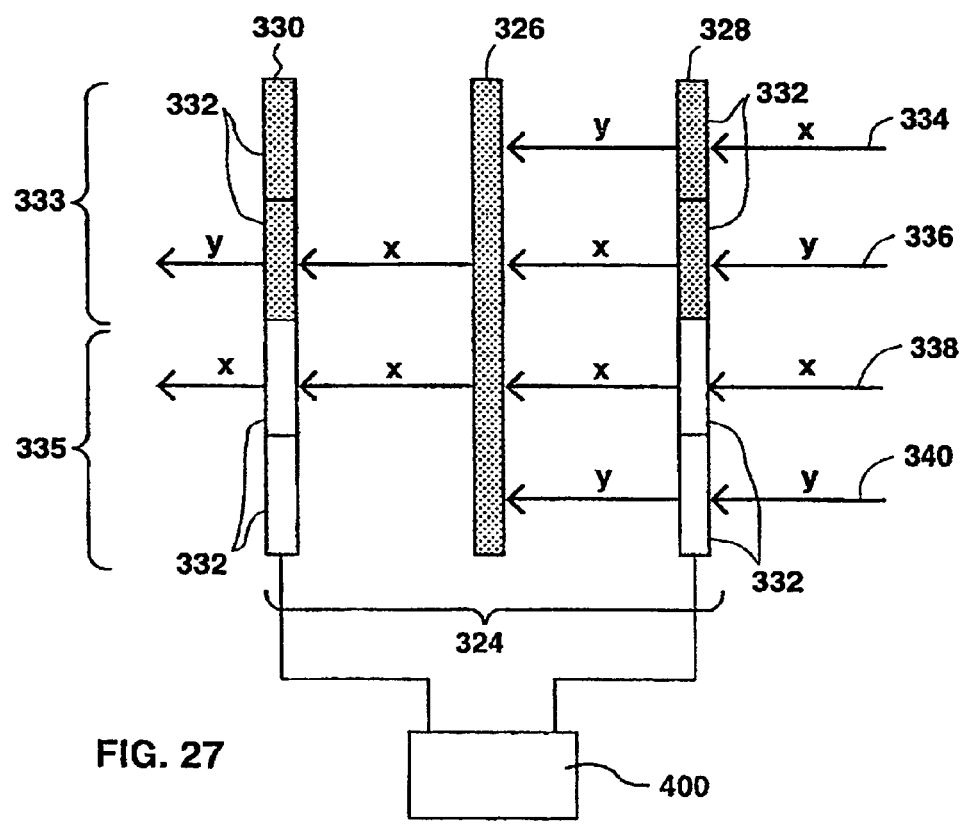
FIG. 27 is a cross section view of one of the layers deployed in the system of FIG. 26.

In FIG. 26 a set of additional layers 324, each having at any given time, an arrangement of first a and second b subunits, as described in detail below, are introduced between layers 56 and 57. The construction of each of layers 324 of FIG. 26 is given in detail in FIG. 27. Sublayer 326 of FIG. 27 is a light polarizing filter oriented in a particular axis of polarization. Sublayers 328 and 330 are each constructed of a multitude of elements 332 of switchable Kerr cells as described under FIG. 19 above (elements 116-133 there). That is, elements 332 of which sublayers 328 and 330 are made, are capable of acting as half-wave retarders, i.e., they are capable of changing the axis of orientation of linearly polarized light passing through them by 90 degrees, and that effect may be turned on or turned off in any desired combination of elements 332, and hence in any desired area of any of layers 324, under electronic control. It should be noted that in FIG. 27 the distance between the sublayers has been exaggerated to facilitate the explanation, but they may be thought of as being contiguous.

FIG. 27 is now used to describe the effect of layer 324 upon beams of polarized light incident from the right. Beams 334 and 338 are taken to be polarized in a first orientation X, and beams 336 and 340 are polarized in a second orientation Y, perpendicular to X. For purposes of the example, filter layer 326 is taken to pass light polarized with the X orientation and block light polarized with the Y orientation. The darkened elements 332 of layers 328 and 330 are taken to be switched so that their half-wave retardant effect as described above is activated. Blank elements 332 of layers 328 and 330 are switched so that their retardant effect is inactivated and they have no significant influence on the light passing through them. Beam 334, polarized in the X orientation, on passing through activated element 332 of layer 328 is changed to the Y orientation, and is consequently blocked by filter 326 and goes no further. Beam 336 arrives at the activated element 332 of layer 328 having the Y orientation. Element 332 changes that orientation to X. The beam, now having the X orientation, passes through filter 326 and reaches activated element 332 of layer 330, which changes it back to the Y orientation. Beam 338 having the X orientation is unaffected by the inactive element 332 of layers 328. It reaches filter 326 with its X orientation unchanged, is passed by filter 326, reaches inactive area 332 of layer 330, by which it is also unchanged, and passes on through, unblocked and with the same orientation X which it originally had. Whereas, beam 340 having the Y orientation passes through inactive element 332 of layer 328 unchanged, and reaches filter 326 with the Y orientation. It is consequently blocked and goes no further.

Thus, FIG. 27 shows how inactive elements 332 of layer 324 have the effect of passing light polarized with the X orientation and blocking light polarized with the Y orientation, whereas active elements 332 of layer 324 have the effect of blocking light polarized with the X orientation and passing light polarized with the Y orientation. In both cases, the light which does succeed in passing through layer 324 retains its original polarization. In other words, each layer 324 is a combination of sublayers 326, 328, and 330, which have elements 332 that can be activated or inactivated for selected blocks or units (i.e., forming first 333 or second 335 types of units) along the length of layer 324. The activated units 333 behave as linear polarizing filters in the Y orientation, the inactivated units 335 behave as linear polarizing filters in the X orientation. At least one layer 324 of this construction is utilized as shown in FIG. 26.

Figure 28:
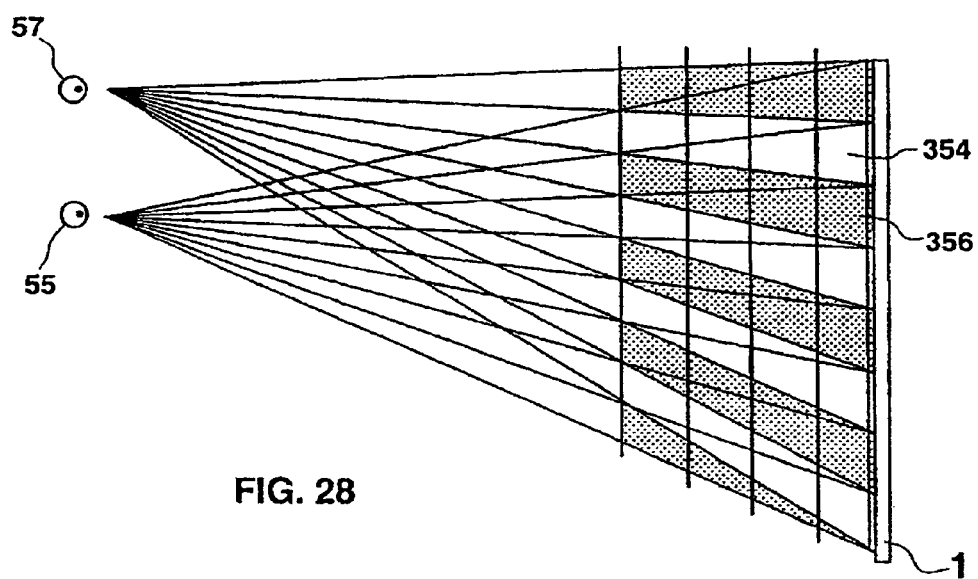
FIG. 28 is a cross section view of the system of FIG. 26, wherein the polarization orientation of the columns of light has been emphasized in light and dark emphasis.

As mentioned previously, subareas 58 and 59 of layers 56 and 57 of FIG. 26 are switched so as to have the same polarization orientations as was depicted for layers 56 and 57 of FIG. 11 described above. Consequently, at the moment depicted, left eye 54 can see all of display 1, and right eye 55 can see none of display 1. Layers 324 of FIG. 26, as described individually in FIG. 27, can be switched in whole or in part so as to behave as polarizing filters of either orientation. Assume then that each of layers 324 is switched in such a way that any first subunit a (corresponding to subunit 335 of FIG. 27) situated between X-oriented polarizing subareas 58 of layer 57 and X-oriented polarizing subareas 58 of layer 56 are switched so as to also have the X polarization orientation. Similarly, second subunits b (corresponding to subunit 333 of FIG. 27) of layers 324 which are between Y-oriented subareas 59 of layers 56 and 57 are switched so as to have the Y orientation. The same situation is depicted in FIG. 28, but in this Figure, for the sake of clarity, the polarization orientation of the columns of light has been emphasized in light 354 and dark 356 emphasis. All display 1 is visible to left eye 54 and hidden from right eye 55.

Figure 29:
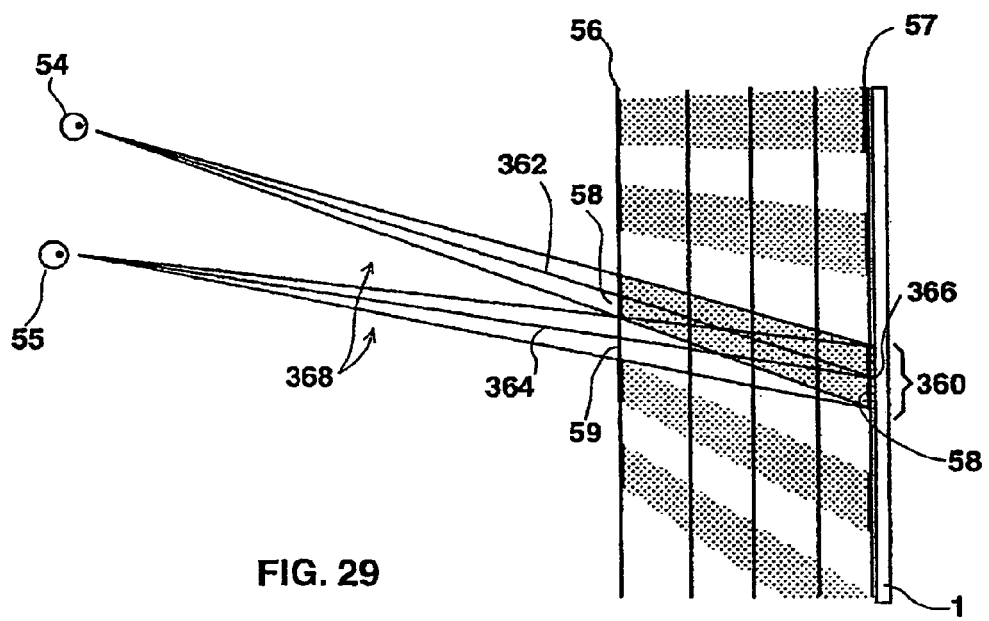
FIG. 29 depicts features of FIG. 28, used for further explanation.

The same situation is reproduced in FIG. 29, but for the sake of clarity shown are only lines of sight 368 between each of eyes 54 and 55 and a single particular area 360 of display 1. In addition, line 362 shows the line of sight from left eye 54 to a particular pixel 366 on display 1, and line 364 shows the line of sight from right eye 55 to that same pixel 366. As can be seen from FIG. 29, line of sight 362 traverses only through subareas 58 polarized in one same orientation, hence eye 54 can see pixel 366 along that line. Line 364, on the other hand, crosses a subarea 59 of one orientation in layer 56, and a subarea 58 of the opposite orientation in layer 57. Consequently that light is blocked and the pixel cannot be seen from the right eye.

Figure 30:
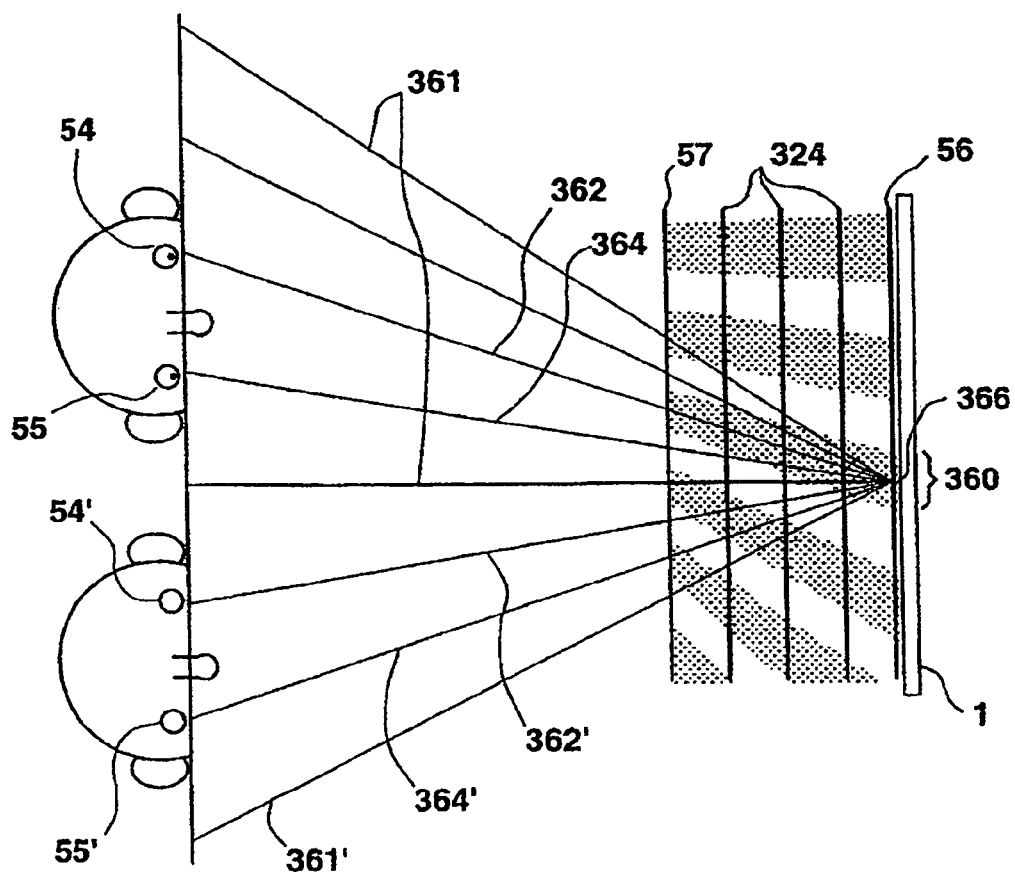
FIG. 30 is a cross section view of the system of FIG. 26, wherein the polarization orientation of the columns of light has been emphasized in light and dark emphasis, when used by two viewers.

The same arrangement is carried over into FIG. 30, which reproduces line of sight 362 between left eye 54 and pixel 366 and line of sight 364 between right eye 55 and pixel 366. In addition, a plurality of other possible lines of sight (e.g., 362' and 364') have been drawn. In particular, the eyes 54' and 55' of another possible viewer have been drawn at 362' and 364'.

The above description demonstrates that it is possible to arrange subareas 58 and 59 of layers 56 and 57 in such a way as to block all of display 1 from right eye 55 while showing it to left eye 54, and then by switching orientations where appropriate, it is possible to do the opposite and show all of display 1 to right eye 55 while hiding it from left eye 54. Inspection of FIG. 30, however, will show that layers 56 and 57 alone are not sufficient to hide a given pixel (e.g., pixel 366) from all other possible lines of sight.

In the absence of layers 324 pixel 366 would be visible to right eye 55' of the second viewer, because on layers 56 and 57 the polarizing sections (i.e., subareas 58) are of the same orientation. The presence of layers 324, however, prevent any such viewing 'from the side'. As seen from inspecting FIG. 30, each of the additional potential lines of sight will cut at least one of the layers 324 at a point where the polarization of layer 324 is contrary to that imposed by the polarizing subarea of layer 56 adjacent to pixel 366. In other words, the first viewer's left eye 54 can see the pixel, but his right eye cannot, and similarly neither eye (54' or 55') of the second viewer can see the pixel, nor can that pixel be seen from any of the other potential lines of sight, some are shown in the Figure and are collectively indicated by reference sign 361.

Consequently, the system as described under the present eleventh embodiment has the potential for showing the entire display only to a narrow line of sight. In the situation depicted in FIG. 30, only left eye 54 of the first viewer can see the display in the configuration depicted. However, as will be appreciated, the same principles allow for a subsequent configuration of the switchable elements of the system into a configuration which will allow for left eye 54' of the second viewer, and only the left eye of the second viewer, to see display 1. At a later time the configuration can be changed so that only right eye 55 of the first viewer sees display 1, and at a still later time the configuration can be changed so that only right eye 55' of the second viewer sees the display.

In this manner, the system as a whole can be made to cycle through a set of configurations which make display 1 as a whole, or any selected part thereof, visible to the appropriate eyes of each of the viewers. Similar to the description under the eighth embodiment above, the changes in configuration are timed to coordinate with the presentation of a left image on the portions of the display which are visible to the viewers' left eyes, and with the presentation of a right image on the portions of the display which are visible to the viewers' right eyes. In this manner, a plurality of viewers can see the binocular three-dimensional display. The density of layers 324 (that is, the number of layers 324 interposed between layers 56 and 57) is determined by the extent to which it is desired to prevent inappropriate vision from extreme sideways angles: if all viewers are at angles nearly perpendicular with the face of the display, a single layer 324 may suffice. On the other hand, if there are viewers viewing the screen substantially from the side, a plurality of layers 324 will be necessary to prevent inappropriate vision.

Note that this embodiment is appropriate for providing viewing for multiple viewers under embodiments, wherein the display system as a whole is sensitive to the position of the viewer (e.g., the tenth embodiment described hereinabove). Under the present embodiment, multiple viewers, whose positions change independently, can be accommodated.

The number of viewers able to view the display according to the described system of the present embodiment is limited by the amount of light generated by the display, since each eye will be seeing the display for only a fraction of the time. It is moreover limited by the speed of the switching mechanisms employed, and by the physiological limitations of the viewers' optical systems for responding to light which is visible for only short periods of time. A control system 400, shown in FIG. 27, aimed at controlling the on or off situation of light rotating means in elements 332 of sublayers 328 and 330 of layer 324, is used to control the direction of light emanating from the display at any given time.

Figure 31:
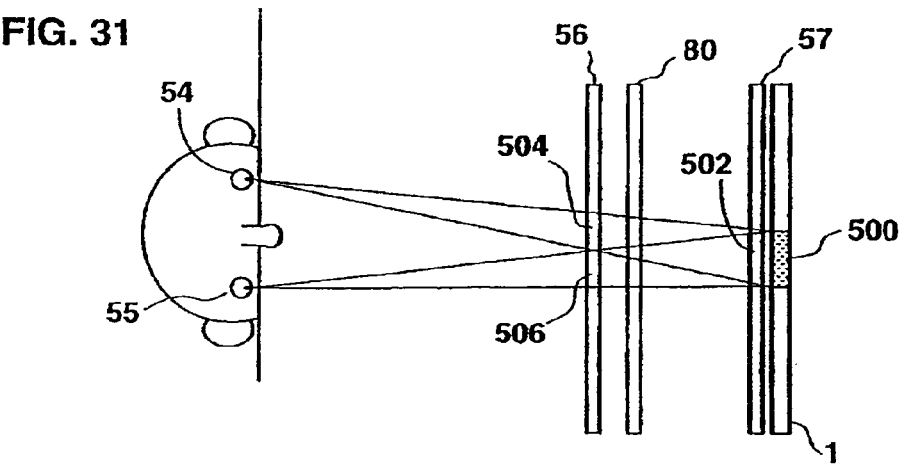
FIG. 31 depicts components of the system of FIG. 11.

With reference now to FIGS. 31-31a, presented is a twelfth embodiment of the present invention. One of the characteristics of the systems described above for controlling the presentation of the left and the right images to the left and right eyes of the viewer has been the systems' dependence on a specific position of the viewer for their operation. Some of the embodiments provide for the systems' awareness of the position of the viewer's eyes and its adaptation to his movements (see the tenth embodiment above).

The current twelfth embodiment describes a minor change in the system's configuration which renders the exact positioning of the user's head with respect to the display screen less critical than it would otherwise be.

In FIG. 31 a few of the components of the system pictured for example in FIG. 11 are presented in isolation. Thus, FIG. 31 shows a single region 500 from within display 1, a single polarizing subarea 502 from within first polarizing layer 57 which is contiguous to display 1, and two polarizing subareas 504 and 506 from second polarizing layer 56. As has been explained for the various embodiments above, if subarea 504 polarizes in the same orientation as subarea 502 and if subarea 506 polarizes in the perpendicular orientation, then the portion of image presented at region 500 of display 1, will be seen by left eye 54 and blocked to the vision of right eye 55. If then switchable half-wave retarding layer 80 is activated, region 500 of display 1 becomes visible to right eye 55 and is blocked from left eye 54.

The arrangement is clearly sensitive to the position of the eyes. Were the user's head to move slightly to the right or to the left, or if the viewer were to move towards the display or away from it, then part of region 500 would become blocked to the appropriate eye, or visible to the inappropriate eye.

Figure 32:
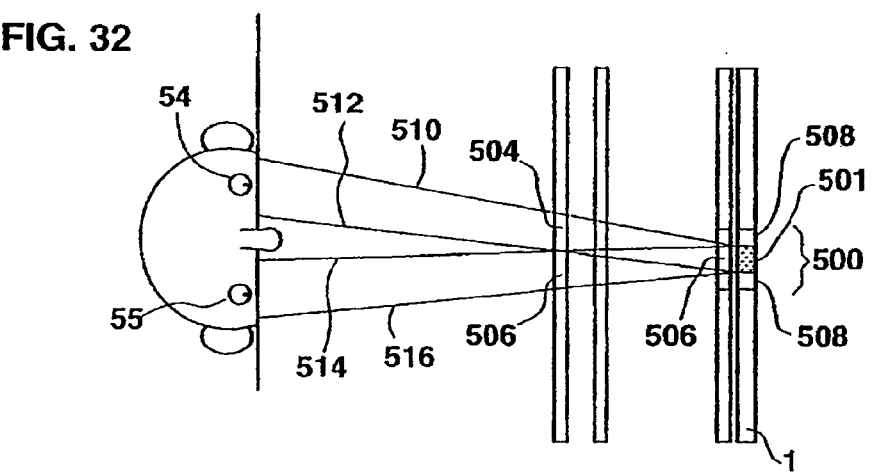
FIG. 32 is a simplified cross-section view of a system for three-dimensional viewing according to a twelfth embodiment of the present invention, the system uses a special display pattern in one region of the display for permitting head movements of the viewer.

FIG. 32 provides a slight modification to the arrangement of FIG. 31, which modification makes the system more permissive of head movements. It is well known to those practiced in the art that the human visual system will combine discreet points of light into the appearance of a continuous field, if the individual points are sufficiently close together and sufficiently bright. Close inspection of newspaper photograph reproductions demonstrates this phenomenon, as does the inspection of many television screens under a magnifying glass.

This phenomenon is utilized in FIG. 32. Region 500 of display 1 is reproduced in FIG. 32, but the part of region 500 actually used to depict region 500's section of the image is herein depicted as first subregion 501. Thus, subregion 501 shows an appropriate pixel from within the image being displayed on this part of the display, and it will be surrounded by small second subregions 508 within which the image is not displayed. In contrast, polarizing subareas 502, 504, and 506 have the same relative dimensions and placement as they had in FIG. 31, and perform the same functions.

Line-of-sight 510 is drawn from the top of subregion 501 through the top of polarizing subarea 504. Line of sight 512 is drawn from the bottom of subregion 501 through the bottom of polarizing subarea 504. These lines consequently define the limits of the area through which the viewer's left eye 54 can move, without modifying the image seen by that eye in region 500 of the display.

Similarly, line-of-sight 514 is drawn from the top of subregion 501 through the top of polarizing subarea 506, and line of sight 516 is drawn from the bottom of subregion 501 through the bottom of polarizing subarea 506. These lines consequently define the limits of the area through which the viewer's right eye 55 can move, without modifying the image seen by that eye in region 500 of display 1.

Thus by utilizing small and intensive pixels within subregion 501 of display 1, and surrounding them with small subregions 508 which do not emit light and are not used to display the image, a situation is created which is relatively tolerant of movements of the viewer's head and eyes while he is watching the image.

It is to be remembered that FIG. 32 depicts the arrangement for a single region 500 of display 1. An arbitrary number of other regions of display 1, or indeed all the regions of the display, can be arranged in this manner, so that the areas of freedom of motion they enable, overlap. Thus the same display arrangement can be used by different users despite minor differences in the distance between their eyes, and each viewer can move somewhat to the left and to the right while viewing the display, and can move somewhat forward and back while watching the display, without his view of the display being impaired.

Figure 33:
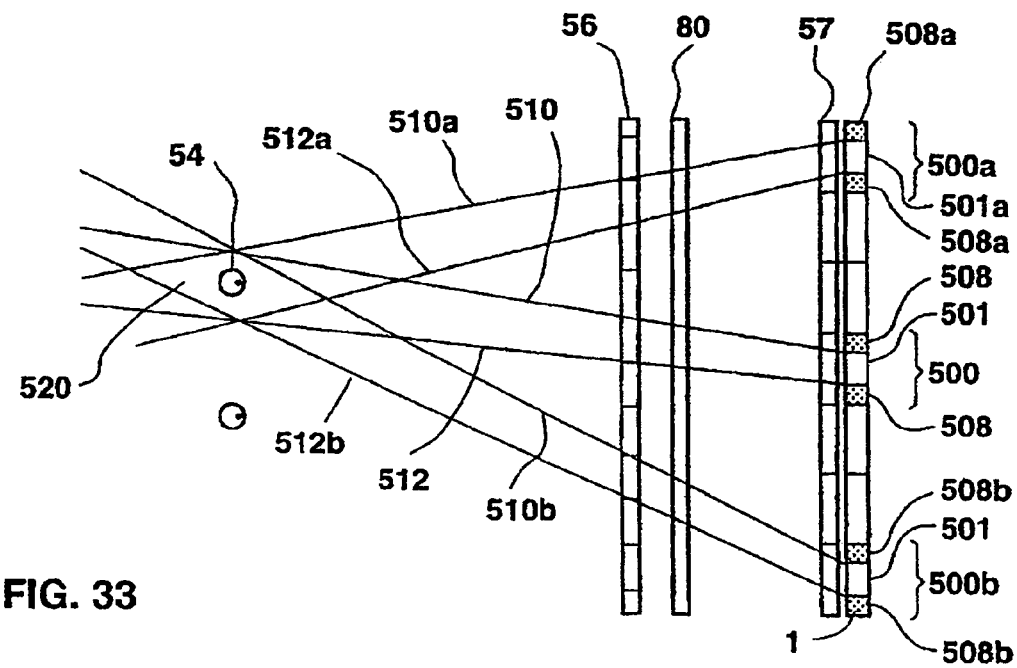
FIG. 33 depicts the system of FIG. 32, wherein three regions of the display are displayed in the special pattern.

FIG. 33 depicts the same arrangement, but includes the details for several regions 500, 500a and 500b located at different regions of display 1. Lines 510, 510a and 510b and lines 512, 512a and 512b, show the boundaries of permitted movements of left eye 54, within which all of subregions 501, 501a and 501b within each of regions 500, 500a and 500b, respectively, will be seen without disturbance. The clear, diamond-shaped area 520 formed around left eye 54, which is the area formed by intersection of all the lines of sight from all the subregions as described above, constitutes the area around that eye within which the viewer can move without his view of display 1 being affected. It should be noted that the drawing has been made somewhat out of scale as compared to the expected dimensions of the system in actual use. Distance of the user from the display are likely typically to be, say, from two to twenty times greater than the width of the display. Under those circumstances the diamond-shaped area will be considerably elongated, and the consequent freedom of movement of the viewer in the dimension of towards or away from the display may be considerable.

This arrangement may provide an additional advantage in that it may simplify the construction of the various layers 56 and 57. Depending on the method of construction of layers 56 and 57, the areas of transition between subregions of polarization of one orientation and subregions of polarization in the second orientation may present problematic optical characteristics. Under the present arrangement those areas of transition are of reduced importance, because they are not actually viewed by the viewer, since they fall in each case on a line between the viewer's eyes and the unused subregions 508, 508a and 508b (in the example of FIG. 33) of display 1. In other words, from the viewer's point of view, the areas of transition on the layers 56 and 57 are "in front of" blank or unused portions of display 1.

Figure 33A:
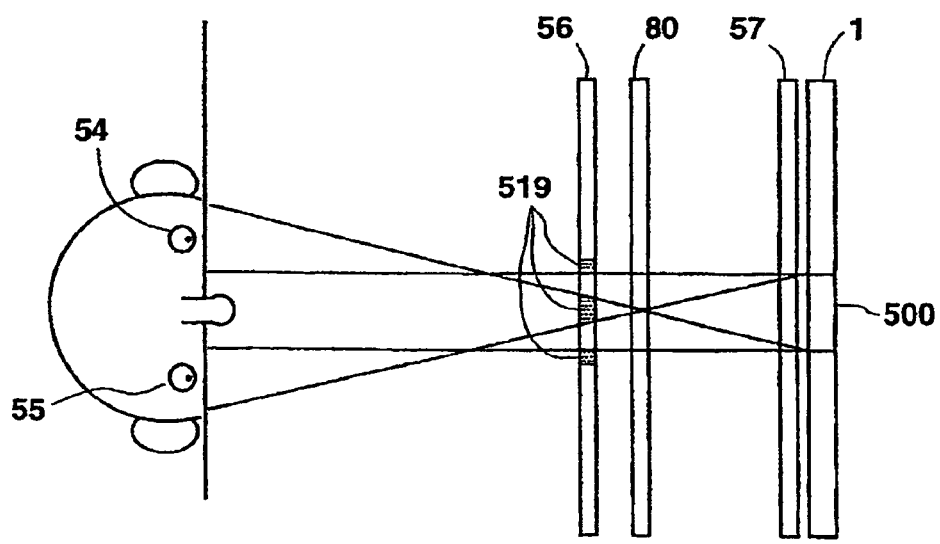
FIG. 33a depicts the system of FIG. 32, wherein opaque regions in one of the layers is employed to achieve a similar effect as by displaying the special pattern.

With reference now to FIG. 33a, note that an effect identical with the effect achieved using the construction presented in FIG. 32 is achieved if, instead of providing subregions 508 of display 1 which do not emit light, one provides small opaque regions on either layer 56, layer 57, or 80 in such positions that they hide from the eyes of the viewer any light which might have been emitted by areas 508 of display 1, should these areas emit light. Both situations are generally referred to herein and in the claims section below as 'a region (or subregion) substantially not emitting light'. FIG. 33a demonstrates that opaque elements 519 on layer 56 allow extended eye movement without eyes 54, 55 seeing the inappropriate images, though displayed region 500 is undiminished in size.

Further note that the effect herein described is the same whether the light blocking system in use is based on polarized subareas such as depicted in FIGS. 31-33 and described under the fourth and fifth embodiments of the invention, or is rather based on a light blocking system including a grid of alternating transparent and opaque elements. In the latter case, making the opaque segments of the grid longer than the transparent segments would have the same effect.

Thus, in the broad sense, the system according to the present embodiment includes a display for displaying small and intensive picture elements of right and left images, at least a fraction of which are adjacent to (e.g., surrounded by) subregions which are substantially not emitting light visible to the viewer (e.g., black subregions); and (b) means for directing light emanating from picture elements of the right image to a right eye of a viewer and light emanating from picture elements of the left image to a left eye of the viewer, such means are for example layers 56, 57 and 80 of FIG. 33. Yet, as will be appreciated by one ordinarily skilled in the art, any other similar means, some of which are described hereinabove under other embodiments of the invention, are also suitable.

According to many of the embodiments described hereinabove, at least one light polarizing layer including alternating stripes or checkerboard patterns of first and second subareas polarizing light in perpendicular orientations is used.

Figure 34:
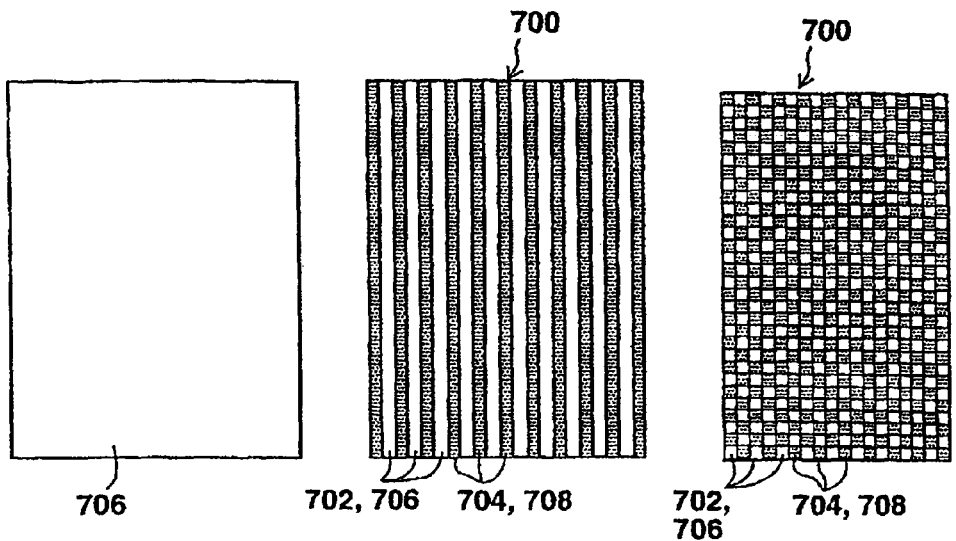
FIG. 34 is a top view of a light polarizing layer having first and second subareas polarizing light in perpendicular orientations and sublayers required for its assembly.
Figure 35:
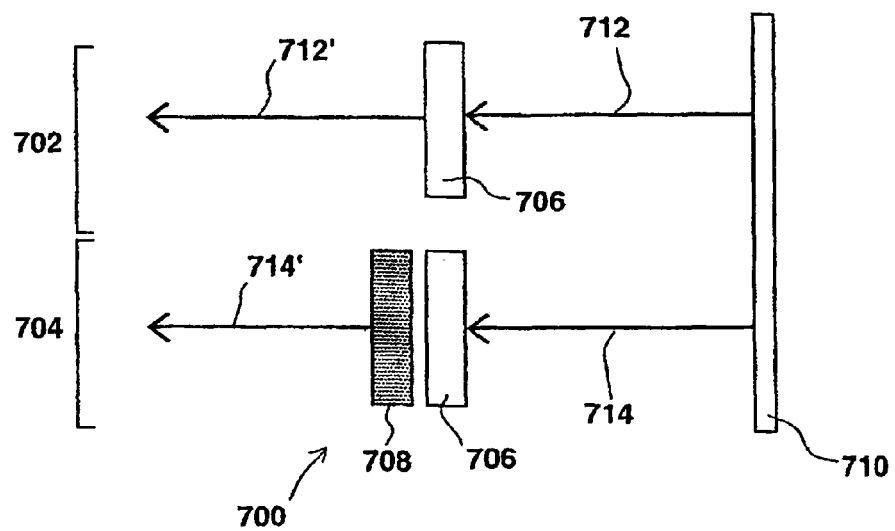
FIG. 35 is an enlarged cross section view through the first and second subareas of the layer of FIG. 34, demonstrating their modes of operation.

FIGS. 34 and 35 present such a layer, referred herein as layer 700. Layer 700 is characterized by first subareas 702 (indicated by white zones in FIG. 34) polarizing light in a first orientation and second subareas 704 (indicated by black zones in FIG. 34) polarizing light in a second orientation, perpendicular to the first.

Layer 700 includes a first sublayer 706 polarizing light in the first orientation, and a second sublayer of light rotating means 708 which is shaped to solely correspond to second subareas 704.

The operation of layer 700 in polarizing light is presented in FIG. 35. Consider a light source 710 producing a non polarized light, two beams of which, marked 712 and 714, are shown passing through first 702 and second 704 subareas of layer 700, respectively. Beam 712, while passing through first sublayer 706 is polarized in the first orientation and afterwards continues its propagation as indicated by 712' polarized in the first orientation. Beam 714, while passing through first sublayer 706 is polarized in the first orientation and afterwards is rotated 90 degrees by second sublayer 708 and continues its propagation as indicated by 714' polarized in the second orientation.

As further shown in FIG. 34, in preferred embodiments first 702 and second 704 subareas are arranged in alternating stripes pattern or alternatively in a checkerboard pattern, dictating the shape of second sublayer 708 to corresponding alternating stripes or checkerboard shapes, respectively.

Figure 36A:
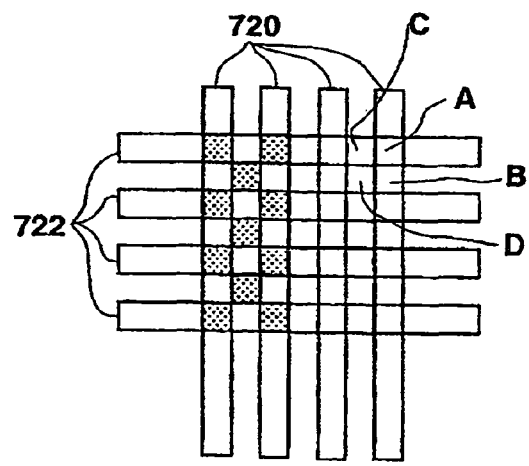
FIGS. 36a-c demonstrate ways of obtaining a checkerboard shape of second sublayer of he layer of FIG. 34.
Figure 36B:
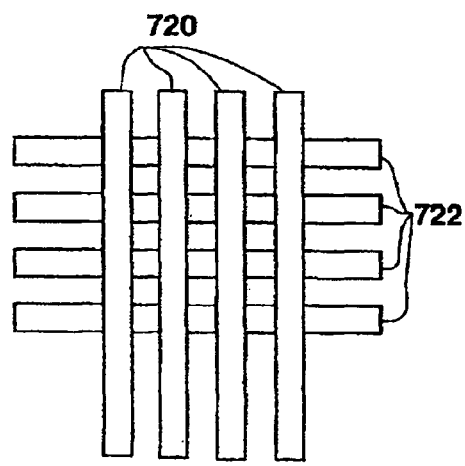
Figure 36C:
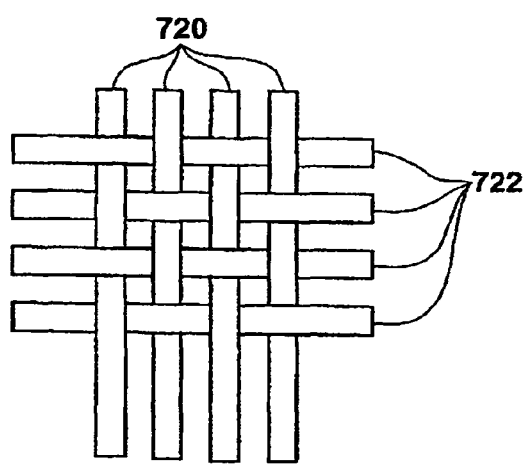

With reference now to FIGS. 36a-c, in a preferred embodiment a checkerboard shape of second sublayer of light rotating means 708 is obtained by disposing a first set of parallel stripes 720 vertically in relation to a second set of parallel stripes 722, all stripes have light rotating capabilities. Thus disposing the stripes results in four types of regions indicated A-D in FIG. 36a. Regions A include two layers of light rotating means and therefore have no light rotating effect, so are regions D, that have no light rotating layers. On the other hand, regions B and C have a light rotating effect. On the left side of FIG. 36a, regions A and D are shown dark, whereas regions B and C are shown light, to highlight the checkerboard pattern obtained. It will be appreciated that disposing first set of parallel stripes 720 vertically in relation to second set of parallel stripes 722 may be achieved in many ways, two of which are shown in FIGS. 36b-c, wherein in FIG. 36b first set of parallel stripes 720 are vertically disposed on top of second set of parallel stripes 722 and in FIG. 36c first set of parallel stripes 720 and second set of parallel stripes 722 are arranged in a weaving pattern.

It will be appreciated that thus constructing layer 700 is very simple, all it requires is the preparation of a light polarizing layer polarizing light in a given orientation and a light rotating layer shaped as desired to produce the first and second subareas having perpendicular light polarizing capabilities.

Alternatively, light rotating sublayer 708 may be divided into first and second subareas coinciding with first subareas 702 and second subareas 704, respectively. As defined in the definitions section above, such first subareas may have certain light rotating capabilities, say m degrees (m may equal zero), in this case the second subareas should have m+90 degrees light rotating capabilities. Therefore, should light rotation be a function of the thickness of the material of which light rotating layer 708 is made, attributing different thicknesses to the first and second subareas will result in a similar effect.

It will be further appreciated that some displays emit polarized light. Examples include but are not limited to flat LCD screens such as those found in "laptop" and "notebook" computers and other portable computing and communication devices. In these cases, only second sublayer of light rotating means 708 is required. Therefore, in cases where the light emanating from the display is polarized, the display is considered as including light source 710 and first sublayer 706. This situation is true for other embodiments of the invention, wherein a layer of light polarizing means is employed to polarize light emanating from a display.

Figure 37:
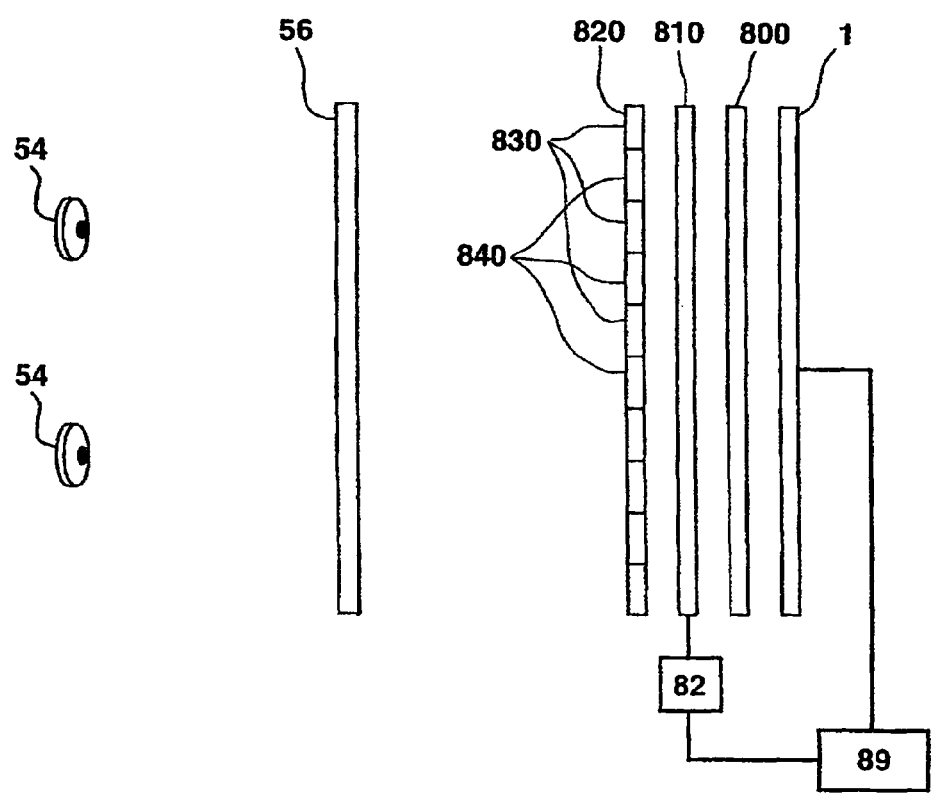
FIG. 37 is a simplified cross-section view of a system for three-dimensional viewing according to a thirteenth embodiment of the present invention, the system employs a polarizer, a switchable light rotating layer and a light retarding layer divided into first and second subareas, collectively for obtaining a system wherein subdivided layers are adjacent.

With reference now to FIG. 37, presented is a thirteenth embodiment of the present invention. According to several of the embodiments described hereinabove, a switchable light rotating layer is used between two light polarizing layers including alternating first and second subareas polarizing light in perpendicular orientations, such as layers 56 and 57 of FIGS. 7 and 12. For various reasons, including ease and simplicity of construction, it may in some cases be advantageous to avoid situating a switchable light rotating layer between the two highly subdivided polarizing layers. In particular, if one wishes (e.g. for high resolution displays) to minimize the size of each subarea, the geometry of the apparatus allows and requires one to reduce the distance between layers 56 and 57.

At extremely small sizes selected for the subareas, layers 56 and 57 may become too close to allow convenient inclusion of layer 80 therebetween. Hence an alternative construction may be desirable, which will produce the functionality described for the fifth embodiment (FIGS. 7-12) and for other embodiments which teach use of a switchable light rotating layer such as layer 80.

One alternative construction is shown (not drawn in proportion) in FIG. 37. Light emanating from display 1 is polarized by a first polarizer 800 in a uniform orientation. A switchable light rotating layer 810, whose light rotating effect may either be turned on (i.e., active in light rotation) or turned off (i.e., inactive in light rotation, wherein the light is given a K orientation, which may equal its original uniform orientation) by switching element 82 which is in turn controlled (as is display 1) by coordinating element 89, either does or does not rotate the orientation of that light into a second orientation 90 degrees from K, which is referred herein as J.

Layer 820 is comparable in its geometry to layer 57 of FIG. 7, but whereas layer 57 is a polarizing layer divided into subareas of differing polarization orientations, layer 820 is a light retarding (also known in the art as light turning) layer divided into first subareas 830 which rotate the orientation of polarized light to some degree n (optionally, n=0), and second subareas 840 which rotate it 90 degrees more than the amount of rotation of regions 830 (i.e., n+90 degrees). Since the light arriving at retarding layer 820 is uniformly polarized, the effect is that the light passing through its subareas 830 is polarized in some orientation, and the light passing through its subareas 840 is polarized in another orientation which differs by 90 degrees from the orientation of light passing through areas 830.

If the light arriving at layer 820 is in the K orientation, and if one designates as "X" (i.e., first) the orientation of K-oriented light after it passes through subareas 830 of layer 820, then the orientation of K-oriented light after it passes through subareas 840 of layer 820 may be designated "Y" (i.e., second), which is perpendicular to X.

When layer 810 is inactive, light from display 1 arrives at layer 820 polarized in the K orientation, and leaves it polarized in the X orientation if it passed through any of subareas 830, or polarized in the Y orientation if it passed through any of subareas 840.

If layer 810 is activated, light from display 1 arrives at layer 820 with the J orientation. Since J-oriented light is 90 degrees from the K orientation, passing J-oriented light through subareas 830 of layer 820 results in Y-oriented light, and passing J-oriented light through subareas 840 of layer 820 results in X-oriented light.

Consequently, if layer 810 is activated, light passing through layer 820 is in the Y orientation if it passed through any of subareas 830, or the X orientation if it passed through any of subareas 840. In other words, subareas 830 pass X-oriented light if layer 810 is off, and Y-oriented light if layer 810 is on, and subareas 840 pass Y-oriented light if layer 810 is off and X-oriented light if layer 810 is on.

Layer 820 is placed within the apparatus and is divided into subareas 830 and 840 according to the rules described above for the placement of layer 57 and its division into subareas. If layer 810 is inactive, layers 800 and 820 together function as variously described for layer 57 in the various embodiments above.

Layer 56 in FIG. 37 is identical in placement, form, and function to layers 56 of FIGS. 6, 7, and 12. Used in conjunction with layers 800 and 820, and assuming appropriate image pixels displayed on display 1, it enables the viewer whose eyes are at 54 and 55 to see a binocular three dimensional image as variously described above.

When switchable light rotating layer 810 is activated, the effect is the same as when switchable light rotating layer 80 of FIGS. 7 and 12 is activated. Light traveling from display 1 through a particular subarea of layer 820 towards a particular eye, and which had previously been blocked by a subarea of layer 56, now becomes visible to that eye, while light traveling from display 1 through a particular subarea of layer 820 towards a particular eye and which had been visible to that eye, is now blocked and therefore becomes invisible to that eye. In other words, pixel areas of display 1 which had been visible to left eye 54 and blocked from the right eye 55 now become visible to right eye 55 and blocked from left eye 54, while pixels which had been visible to right eye 55 and blocked from left eye 54 become visible to left eye 54 and blocked from right eye 55.

This is clearly the same effect as that described with respect to the functionality of the switchable light rotating layer 80 of FIGS. 7, 12, and others, and it produces the same effect. When layer 810 is switched off, each eye of the viewer sees a particular set of pixels on display 1. When layer 810 is switched on, each eye sees a different set of pixels. Switching element 82 can then be used by coordinating element 89, as was described with respect to the fifth embodiment, to reduce apparent graininess of the image by showing the left image in a first set of pixels whenever the left eye can see the first set of pixels, and showing the left image in the second set of pixels whenever the left eye can see the second set of pixels, and similarly with the right eye and the right image.

Thus the arrangement of FIG. 37 does not interpose a switching layer between the two static highly subdivided layers 56 and 57, but nevertheless produces the same effect as the arrangement depicted in FIGS. 7, 12, and others.

One may also note that the same effect could be obtained by reversing the order, placing a polarizing filter divided into subareas (like layer 56 or 57 of FIG. 6) as the first layer near display 1, followed by a subdivided light retarding layer as described for layer 820, followed by a switchable light retarding layer as described for layer 810, followed (closest to the viewer) by a uniform polarizing filter such as described above for layer 800.

Figure 38:
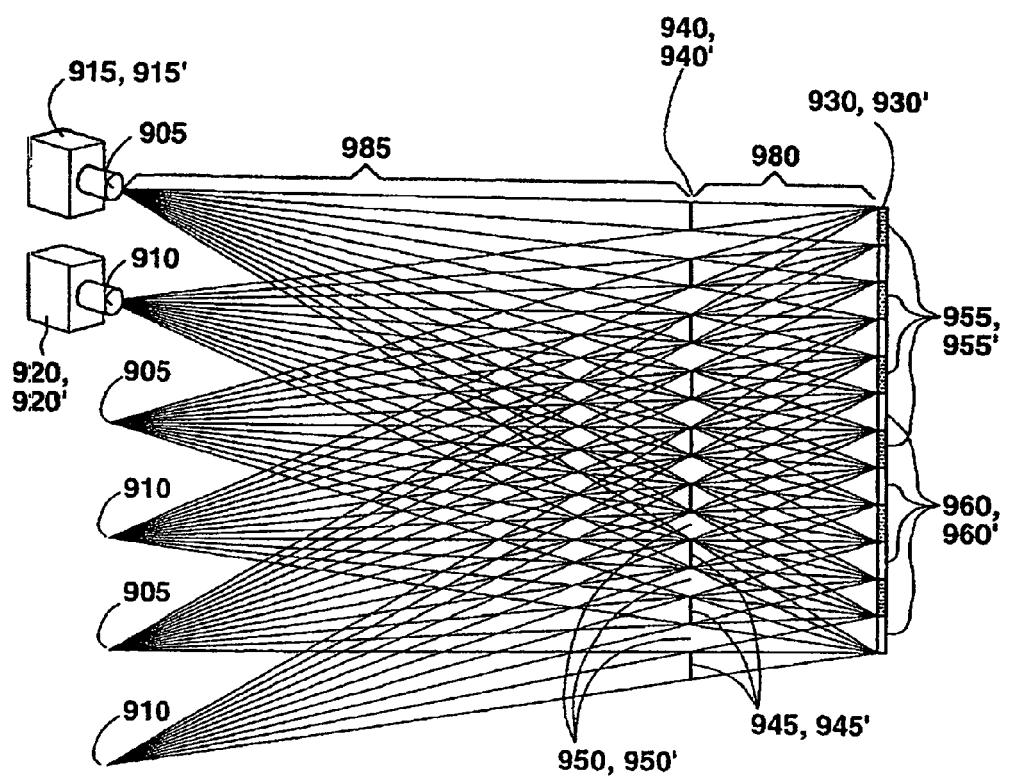
FIG. 38 is a simplified cross-section view of systems for three-dimensional viewing according to the present invention both for three dimensional projection and viewing of the projected display.

With reference now to FIG. 38, presented is a fourteenth embodiment of the present invention, in which a light blocking grid is used in conjunction with a pair of image projectors to produce a binocular three-dimensional display which can be viewed without eyeglasses.

FIG. 38 is similar to FIG. 17, which was previously used to demonstrate that light blocking and polarizing grids as described in the various embodiments permit more than one user to view a binocular display. FIG. 38 reproduces FIG. 17 while adding an additional pair of positions from which a viewer's left eye and right eye might view their appropriate images.

In FIG. 38, 905 stand for left-eye positions, whereas 910 stand for right-eye positions. At one of the left-eye positions, a projector 915 is placed. This might be a motion picture projector, a television projector, a computer-driven projection device, a slide projector, or some other equipment of appropriate size capable of focusing an image on a screen. A second projector 920 is at one of the right eye positions 910. In FIG. 38 projectors 915 and 920 are shown placed one next to the other, like a pair of eyes, yet this is not a requirement of the system. Projector 915, in a left-eye position 905, projects a left image as previously defined, and it is therefore referred hereinbelow and in the claims section as a "left projector". Projector 920 projects a right image as defined hereinabove, and is therefore referred to hereinbelow and in the claims section as a "right projector".

Both projectors 915 and 920 project images onto a screen 930, which may be a standard projection screen or any other appropriate surface. A light blocking system, as this term is defined hereinabove, in the form of grid 940 which includes opaque subareas 945 alternating with transparent subareas 950 is placed, and is subdivided into subareas, as has been described with reference to various grid-based embodiments above.

Inspecting the system presented in FIG. 38, reveals that the same arrangement which ensured (as mentioned above in reference to FIG. 17) that several pairs of right and left eyes could each see the appropriate right and left images, also ensures that if a left projector 915 positioned at one of the left-eye positions 905 projects a left image onto screen 930, then the projected light will reach only regions 960 of screen 930 which regions 960 are visible to the left eyes of the one or more viewers from positions 905. Similarly a right projector 920 positioned at one of the right-eye positions 910 can project a right image only to regions 955 of screen 930 which are visible to the right eyes of the one or more viewers from positions 910.

In other words, regions 955 of screen 930 receive light only from right projector 920, whereas regions 960 receive light only from left projector 915. Any viewer's left eye at one of positions 905 sees only regions 955 of the screen, while his right eye at a position 910 sees only regions 960. Since left projector 915 projects a left image and right projector 920 projects a right image, viewers' left eyes at positions 905 see only the left image and their right eyes at positions 910 see only the right image, thus permitting binocular stereoscopic viewing of a three-dimensional image without eyeglasses.

It may be noted that this embodiment can benefit from various enhancements which were described in the context of previous embodiments. In particular, as described in the context of the sixth embodiment (FIGS. 14-15), grid 940 may be a moving or vibrating grid, or an LCD grid; in both cases the effect is to vary, over time, the placement of the opaque subareas, and consequently to vary the subregions of display screen 930 which are visible to any particular eye at any particular time. If the variation is sufficiently rapid, the effect may be to reduce the apparent graininess of the observed image.

Also, as described in the context of the twelfth embodiment (FIGS. 31-33a), providing the opaque subareas 945 of grid 940 larger than transparent subareas 950 results in greater freedom of movement for the viewer by enlarging the space within which each eye may move (both forward and backward and from right to left) without moving into a position from which it can see a screen subregion whose light originated in a projected image inappropriate to it.

Still referring to FIG. 38, presented now is a fifteenth embodiment of the present invention, in which a light polarizing layer divided into subareas of differing polarizing orientations is used in conjunction with a pair of image projectors to produce a binocular three-dimensional display which can be viewed without glasses by a plurality of viewers.

As in the previous embodiment, left projector 915 projects a left image, whereas right projector 920 projects a right image. In the present embodiment layer 940 is a light polarizing layer with subareas 945 having a particular first axis of polarization, X, and subareas 950 having a second axis of polarization, Y, perpendicular to the first.

In this embodiment screen 930 is aluminized, or constructed in one of the other known manners such that screen 930 does not change the polarization orientation of light projected on it and reflected from it, i.e., a light polarization maintaining screen. The placement of layer 940, and the size and placement of its subareas, are determined in the same manner as were the placement and the subdivisions of the polarizing layer 56 of FIGS. 6 and 12.

If subareas 945 of layer 940 polarize light from projectors 915 and 920 in the first orientation, say X, and subareas 950 polarize light from the projectors in the second orientation, say Y, 90 degrees from the first, then subregions 955 of screen 930 will receive light from left projector 915 polarized in the first orientation and also light from right projector 920 polarized in the second orientation, while subregions 960 of the screen will receive light from left projector 915 polarized in the second orientation and also light from right projector 920 polarized in the first orientation. Neither X-oriented light from right projector 920 nor Y-oriented light from left projector 915 will reach subregions 955, nor will Y-oriented light from right projector 920 nor X-oriented light from left projector 915 reach subregions 960.

Wherever a left eye of a viewer looks from any of positions 905 through one of subareas 945, it sees light from one of subregions 955 of screen 930, which subregions, as described above, are illuminated only by light from the left image polarized in the X orientation and light from the right image polarized in Y orientation. Since subareas 945 pass only light polarized in X orientation, only the left-image light is passed onto the viewer's left eye.

Similarly, when the left eye of the viewer looks through one of subareas. 950 it sees light from one of subregions 960, which are illuminated by light from the left image polarized in the Y orientation and light from the right image polarized in the X orientation. Subareas 950 transmit only Y-oriented light, so again only the left image light is passed. Thus, wherever the left eye looks, it sees the left image.

The opposite is true for right eyes. Subregions 955 are illuminated by left image X-polarized light and by right-image Y-polarized light. The right eye at 910 can see subregions 955 only by looking through any one of subareas 950 of layer 940, which passes only Y-oriented light, consequently only right-image light from subregions 955 can be seen by the right eye.

Similarly, light from subregions 960 is either left-image Y-oriented or right-image X-oriented, and to reach a right eye at 910 it must pass a subarea 950 which passes only X-oriented light.

In consequence of the above, wherever a left eye at 905 looks on screen 930, it will see the left image and only the left image, and a right eye at 910 will see the right image and only the right image throughout the screen. If the left projector projects an appropriate left image and the right projector projects an appropriate right image, and the two images are properly aimed to coincide on screen 930, viewers will see binocular stereoscopic three-dimensional images without needing to use eyeglasses.

One notes that it may be desirable to raise the projectors above the level of the viewers' eyes, or to lower them below that level, to avoid light from the projectors being reflected back directly into viewers' eyes from the surface of layer 940. Another method for redirecting such reflection might be to incline or curve layer 940, adjusting the spacing of layer's 940 subareas accordingly, so that subareas of layer 940 are smaller where layer 940 is closer to screen 930, and larger where layer 940 is further from the screen, thus satisfying the requirements of the system geometry for any given height.

Yet another method might be to place layer 940 vertically within an inclined surface (e.g. plastic), or segments of such a surface, which would then divert the reflection. Additionally, anti-reflective coatings or other known means for preventing or redirecting reflection might be used.

Embodiments fourteen and fifteen enjoy flexibility in setting the viewers'/projectors' distance from screen 930. In the case of projection from films or slides, where the image is fine-grained, subregions 955 and 960 of the display need not be of a fixed size nor position. For a given size of the subareas of layer 940, distance 980 between layer 940 and screen 930 stands in constant ratio to distance 985 between layer 940 and the viewers/projectors at positions 905/910, but the absolute distance of layer 940 from screen 930 and from the viewers/projectors, is indeterminate.

In other words, a viewer at a particular position 905/910, wishing to move further from the screen, will merely need to move layer 940 proportionally further away as well, whereas no changes in the layer itself would be required. Please note that with respect to the fourth and fifth embodiments, if the position and subarea of layer 57 (FIGS. 6, 7 and 12) is fixed, layer 56 can be moved in a similar manner.

As stated with respect to the twelfth embodiment (e.g., FIG. 33*a*) and as mentioned in embodiment fourteen above, it is possible to enhance the viewers' freedom of movement, increasing the distance they can move away from the ideal viewing positions 905/910 without thereby causing the eyes to see inappropriate images.

As explained above, the method in general includes surrounding each subregion of the display with an area which displays neither the right image nor the left image. One possible implementation is to place to the left and to the right of each of the polarizing subareas 945 and 950 of layer 940 a short opaque element (in analogy to the opaque element 519 shown in FIG. 33*a* with respect to another embodiment), which will then produce some of the effects described in relation with FIGS. 31-33*a*. Such opaque elements on layer 940 will prevent the viewer from seeing inappropriate images if he moves his eyes somewhat away from their ideal position as represented by their position as shown in FIG. 38, although their use in the current embodiment will not, beyond a certain point, prevent some diminution of the intensity of the light from the appropriate image, as the eyes are moved away from their ideal position.

A preferred arrangement is to place non-reflective elements on screen 930, which will not reflect parts of any image, in analogy to subregions 508 of FIG. 33. The distance from one element to the next equals the length of subregions 955 and 960 of screen 930 (which length is a function of the length of subareas 945 and 950 of layer 940, and of the inter-ocular distance of the viewer). This method prevents seeing inappropriate images and also prevents changes in light intensity of the appropriate images, when the eyes are moved somewhat away from their ideal positions. Optimum results are obtained when the non-reflective elements are positioned to correspond to the juncture between subregions 955 and 960 of screen 930, but so long as the length of each such element, added to the distance between elements, equals the length of each subregion 955 or 960 of screen 930, substantially good results are obtained even if there is no specific alignment between the position of the non-reflective elements and the position of the subregions.

This may, of course, be combined with a system for maintaining awareness of a viewer's position and automatically adjusting the position of layer 940 accordingly, as is described with respect to FIGS. 18 and 23. Preferably, means for moving layer 940 are connected to a remote control.

As noted above, the functional relationship of the components depicted in FIG. 38 is preserved, for a given size of the subareas of layer 940, so long as the ratio (along any particular line of sight) of distance 980 (from screen 930 to layer 940) to distance 985 (from layer 940 to the viewpoints 905/910) remains constant.

For this reason, the system will function as described even if, say, the viewers and projectors (points 905, 910) were aligned with the bottom of a tall screen 930, so that image regions projected to the top of the screen were much further from the viewers than image areas projected to the bottom of the screen. So long as the plane of layer 940 is parallel to the plane of screen 930, a line of sight from any viewpoint 905 or 910 to any particular region of screen 930 will intersect layer 940 at a point such that the ratio of distance 980 to distance 985 will be preserved.

Thus, the arrangement depicted allows for multiple viewers to three-dimensionally view a pair of images projected onto screen 930, as long as the projectors and the viewers are all substantially at the same distance from screen 930.

Figure 39:
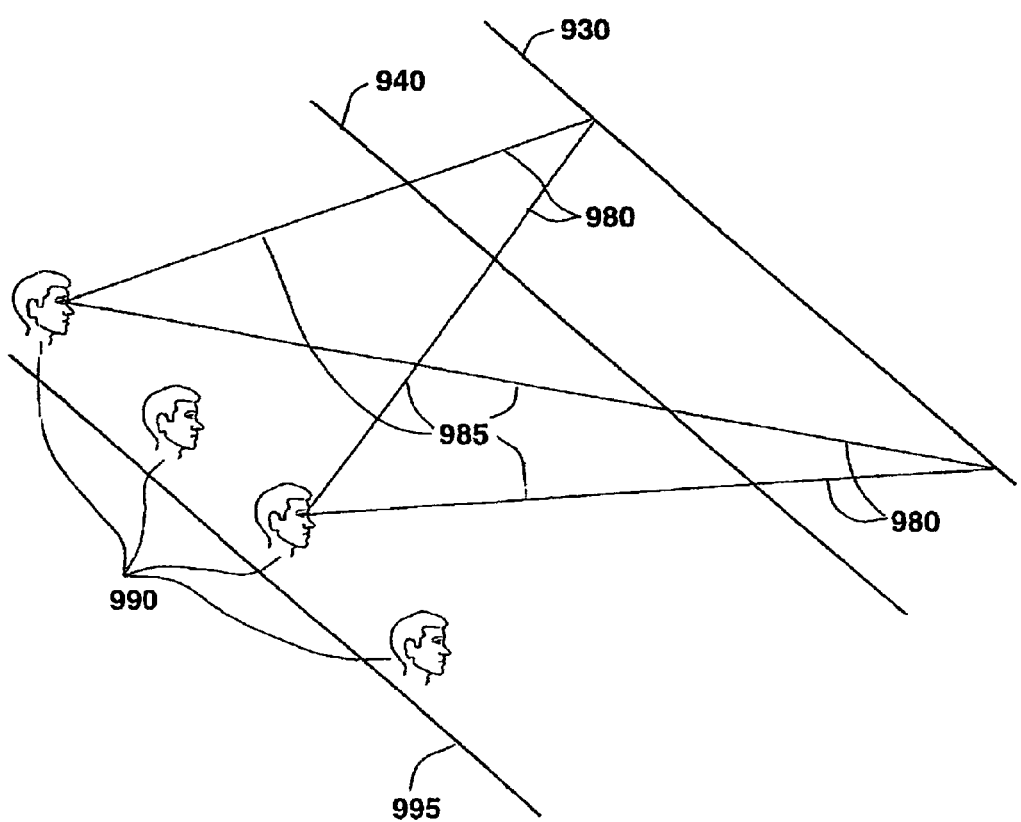
FIG. 39 is a simplified cross-section view of a system for three-dimensional viewing according to the present invention for three dimensional projection and viewing of the projected display in a theater.

FIG. 39 makes explicit an additional advantage implicit in this arrangement. In order to provide seating, e.g., in a movie theater, for a large number of viewers, if one were to use a vertical screen 930 and areas 945 and 950 (shown in FIG. 38), which are of constant width irrespective of the height of their placement on layer 940, then having filled a row of seats facing screen 930, and wishing to provide additional seating, one would be obliged to seat additional viewers substantially vertically above the first row of seats, in order to fulfill the condition that all viewers be substantially at equal distances from screen 930.

FIG. 39, however, makes it clear that the geometry described above can equally well be applied to a screen 930 which is tilted, in which case the arrangement allows for additional rows of seating both above and behind initial rows, as is convenient and conventional in theater arrangements. While FIG. 38 depicts a row of viewers (with eye positions 905 and 910) as seen from above, FIG. 39 depicts several rows of viewers 990 as seen from the side, that is, as seen from beyond the end of the rows. As shown in FIG. 39, on condition that plane 995 on which rows 990 are situated is parallel to the plane of the screen 930, there is preserved a constant ratio of distance 980 to distance 985, as measured along any viewer's line of sight to any particular point on screen 930. Thus in a projection theater arrangement as described, multiple rows of seating may be accommodated.

Referring to the geometry which has been previously described in particular by reference to FIGS. 6, 24, 38, and 31-33*a* (ignoring the presence of the light-rotating layer 80 in the latter) it may be noted a similar result (e.g., stereoscopic vision, freedom of head movement) may be achieved if areas and subareas of color filters are substituted for the areas previously identified as polarizing filters in the above descriptions of various embodiments. With particular reference to FIG. 6, one observes that if subareas 58 of layers 56 and 57 were to be constituted by a color filter transparent only to light of a particular color range (i.e., a wavelength range) and blocking light outside that range, and if subareas 59 of layers 56 and 57 were similarly constituted by a filter of a different color (i.e., transmitting light of a different wavelength range), with little or no substantial overlap between the color ranges transmitted by subareas 58 and 59, then the effect of the arrangement would be similar to the effect described above with reference to system 50. Light from display 1 passing through a subarea 58 of layer 57 and then a subarea 58 of layer 56 would be filtered to the particular color range of subarea 58, but within that color range would not be substantially blocked. Light from display 1 passing through a subarea 59 of layer 57 and then a subarea 59 of layer 56 would similarly be filtered to the color range of subareas 59, but within that color range would not be substantially blocked.

On the other hand, light emanating from display 1 and passing through a subarea 58 of layer 57 and then a subarea 59 of layer 56, would be substantially blocked and would not reach the viewer's eyes. Similarly, light emanating from display 1 and passing through a subarea 59 of layer 57 and then a subarea 58 of layer 56, would be substantially blocked and would not reach the viewer's eyes.

The use of color filters in the form of "anaglyph" eye glasses is well known in the art of stereoscopy. Two images are typically combined into a single image, one of the images usually being red in color, the other usually being blue or green.

Filter eyeglasses are then worn by the viewer, with the result that one eye will see the red image and the other the blue/green image. If these images are appropriate right and left images, as defined above, three-dimensional stereoscopic vision results. This traditional arrangement, however, has the usual disadvantage of dependence on eyeglasses, and the additional disadvantage that the use of a single filter color for each eye results in the fact that the perceived image, although three-dimensional, has very little, if any, residual color information. It is occasionally possible to see some color on traditional anaglyph images, but the amount of color is severely limited and the perceived images are essentially largely seen as being colorless.

The arrangement now described with reference to the geometry described in FIG. 6 and various other Figures above, but with reference to the use of color filters rather than polarizing filters in the various layers e.g., layer 56 and layer 57 of FIG. 6, has several advantages over the traditional anaglyph method of stereoscopic viewing. First, no eyeglasses are needed. Second, although color filtration is used to control the passage of light from each of the left and right images to the appropriate eye, each eye is not limited to only one of the filtration color ranges. Referring again to FIG. 6, it will be appreciated that left eye 54 is enabled to view a region of left image 52 while being prevented from viewing a region of right image 53. Within region 52, picture elements of a first color filtration subarea 58 alternate with color elements of a second color filtration subarea 59, so that although in each particular zone (e.g., 61*b*) only light of a limited range is transmitted, throughout region 52, as a whole, light of both color ranges is transmitted. As is well known in the art, when picture elements of different colors and of sufficiently small size are juxtaposed, the visual effect is that of a combining of the colors. In other words, the arrangement described, while using color filtration to control the passage of light from each image to the appropriate eye, largely avoids the disadvantage of traditional anaglyph viewing, because it does not limit each image, as a whole, to a particular range of color. Thus, three-dimensional viewing of colored images results.

It is additionally noted that the above observations apply equally well to the geometry described with respect to projection systems and described in detail in FIGS. 38 and 39. Here too, color filtration can replace polarization filtration in the construction of layer 940. As described above with respect to FIG. 6, this substitution does not affect the geometry of the system nor the logic of its operation.

FIG. 38 is hereinbelow used to describe a system in accordance with the above idea. The system of FIG. 38, includes a screen 930' for displaying the projected display; a left projector 915' projecting left picture elements of the display onto screen 930'; a right projector 920', projecting right picture elements of the display onto screen 930'; and a color filter layer 940' divided into first subareas 945' and second subareas 950'. Layer 940' is positioned between projectors 915' and 920' and screen 930'. First subareas 945' transmit light in a first wavelength range (e.g., 350-400 nm) and second subareas transmit light in a second wavelength range (e.g., 400-750 nm). The first and second wavelength range are substantially different ranges, said filter layer being between said projectors and said screen.

Light emanating from left projector 915' and passing through first subareas 945' is filtered to consist wavelengths restricted to the first range, reaches first subregions 955' on screen 930' and is then reflected from screen 930'. Light emanating from left projector 915' and passing through second subareas 950' is filtered to consist wavelengths restricted to the second range, reaches second subregions 960' on screen 930' and is then reflected from screen 930'. Light emanating from right projector 920' and passing through first subareas 945' is filtered to consist wavelengths restricted to the first range, reaches said second subregions 960' on screen 930' and is then reflected from screen 930'. Whereas, light emanating from right projector 920' and passing through second subareas 950' is filtered to consist wavelengths restricted to the second range, reaches first subregions 955' on screen 930' and is then reflected from screen 930'.

The positioning of screen 930', layer 940' and projectors 915' and 920' are selected such that a viewer's left eye, as indicated by 905, receives light originating from left projector 915', reflected from first 955' and second 960' subregions of screen 930', passing through first 945' and second 950' subareas of filter layer 940', respectively, while the viewer's right eye, as indicated by 910, receives light originating from right projector 920', reflected from first 955' and second 960' subregions of screen 930', passing through second 950' and first 945' subareas of filter layer 940', respectively.

Figure 40:
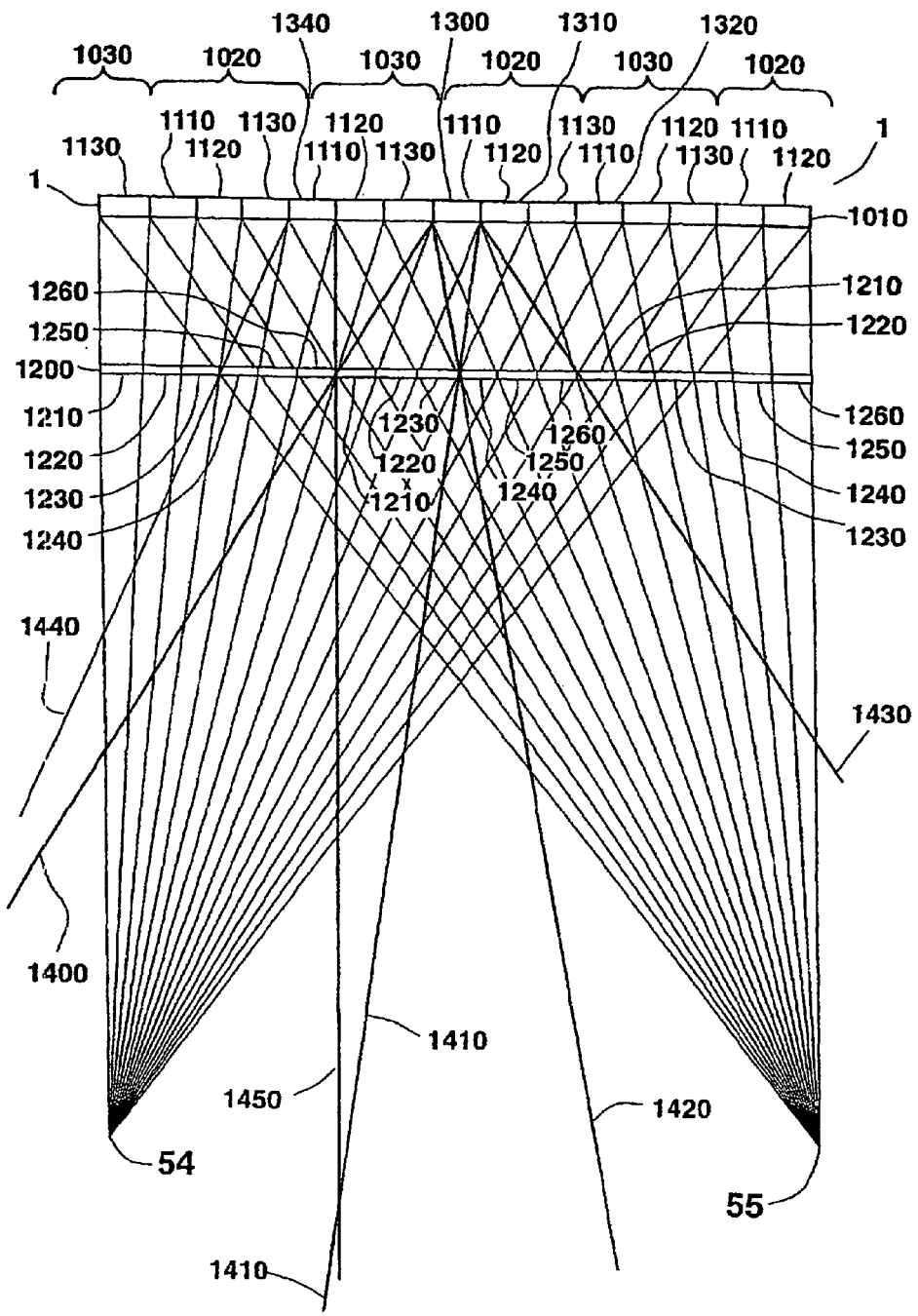
FIG. 40 is a simplified cross-section view of a system for three-dimensional viewing of a three-color display (e.g., an RGB display) according to the present invention.

Many display systems currently in use, for example many television displays and CRT color monitors, produce color by juxtaposing discrete individual color elements each of which provides one of the basic colors, these color elements often being aligned side by side on the monitor. FIG. 40 describes a further use of color filters in conjunction with such displays, in order to achieve stereoscopic vision without eyeglasses. The system described in FIG. 40 has the additional benefit of allowing for relatively free local movement of the eyes of viewer without that movement preventing each eye from seeing all parts of its appropriate image, and without causing either eye to see any part of its inappropriate image. Thus the system described in FIG. 40 presents the advantages previously described with reference to FIGS. 31-33a, but the present system has the additional advantage that, whereas the system of FIGS. 31-33a requires certain subregions of the display either not to emit light from either image or to be hidden from both eyes of the viewer, the current system achieves the effect of permitting similar freedom of movement of the viewer's head, while yet allowing substantially all of the display area to be used to emit light and to display images.

In FIG. 40 a display 1 presents a frame 1010 divided into a plurality of first regions 1020 presenting at least a part of a left image and a plurality of second regions 1030 presenting at least a part of a right image. Each of first 1020 and second 1030 regions is divided into a first subregion 1110 presenting a first base color characterized by a first spectral range, a second subregion 1120 presenting a second base color characterized by a second spectral range and a third subregion 1130 presenting a third base color characterized by a third spectral range. The spectral ranges are selected such that by displaying each of in selected intensities, each of first 1020 and second 1030 regions is perceived by a viewer as having a desired color. Typically the base colors would be red, green and blue in what is known in the art as an RGB display.

Further shown in FIG. 40 is a light filtering layer 1200 which is divided into first subareas 1210 for blocking light of the first spectral range, second subareas 1220 for blocking light of both of the first and the second spectral ranges, third subareas 1230 for blocking light of all three spectral ranges, fourth subareas 1240 for blocking light of the second and third spectral ranges, fifth subareas 1250 for blocking light of the third spectral range, and sixth subareas 1260 which transmit light of all the spectral ranges.

The position of layer 1200 and the size and position of the first to sixth subareas 1210, 1220, 1230, 1240, 1250, 1260 are determined in a manner similar to that described above with reference to the various Figures and the various embodiments, and in particular with reference to FIG. 24.

The functionality of the system will now be described with reference to randomly chosen subregion 1300, which is one of subregions 1110, by way of example. Subregion 1300 is part of a first region 1020 presenting a part of the first image emitting light of the first base color characterized by the first spectral range.

Left eye 54 cannot see light from subregion 1300, since subregion 1300 emits only light within the first spectral range, and such light is blocked by subarea 1220 which is positioned between left eye 54 and subregion 1300. Light from subregion 1300 is also blocked by subareas 1210 and 1230. Consequently line of sight 1400 represents the limit of movement of left eye 54 through which eye 54 can move to the left without being in a position from which it is able to see any part of subregion 1300. Similarly, line of sight 1410 represents the limit to which eye 54 can move to the right without being in a position from which it is able to see any part of subregion 1300.

Right eye 55, however, is able to see subregion 1300, because subarea 1250*, which is between right eye 55 and subregion 1300 does not block light of the first spectral range. Subareas 1240 and 1260 also do not block light of the first spectral range, consequently line of sight 1420 marks the limit to which eye 55 can move to the left without losing its ability to see all of subregion 1300, and line of sight 1430 shows the limit to which right eye 55 can move to the right without losing its ability to see all of subregion 1300. Thus the viewer's head may move nearly half the inter-ocular distance to the left, and nearly half the inter-ocular distance to the right, without the left eye seeing any part of subregion 1300 and without the right eye losing its ability to see all of subregion 1300.

Inspection of the system presented in FIG. 40 will show similar effects with respect to each of the subregions of frame 1010. Another randomly selected subregion 1320, for example, emits light of the first spectral range which is a part of a second image. That subregion is visible to left eye 54 because subareas 1240, 1250, and 1260 permit passage of light of the first spectral range. However, subregion 1320 is blocked from right eye 55 because subareas 1210, 1220, and 1230 block passage of light of the first spectral range. As another random example, consider subregion 1310 which emits light of the second spectral range belonging to the first image. It is blocked from left eye 54 because subareas 1220, 1230, and 1240 block light of the second spectral range, while light from subregion 1310 reaches right eye 55 because subareas 1250, 1260, and 1210 permit its passage.

Moreover it may be seen with respect to each subregion of frame 1010 that the positions through which each eye can move without light from that subregion being hidden from the appropriate eye, or seen by the inappropriate eye, is similarly broad. For example, lines of sight 1440 and 1450 show the limitation of positions within which left eye 54 may move without losing its ability to see all of the light from another subregion 1340, selected at random.

Thus the system of FIG. 40 provides an arrangement whereby right eye 55 sees all of the light from each of first regions 1020 presenting all or part of the right image, and left eye 54 sees all of the light from each of second regions 1030 presenting all or part of the left image, while neither eye sees any light from an inappropriate image. Moreover, FIG. 40 shows that each eye may move substantially both left and right and towards and away from the display without preventing that eye from seeing the appropriate image and without permitting that eye to see the inappropriate image. Thus the system of FIG. 40 makes possible binocular stereoscopic vision of the left and right images without need of eyeglasses, and permits some freedom of movement of the eyes without interfering with the quality of the image, while yet using all of the display surface to display the images.

Figure 41:
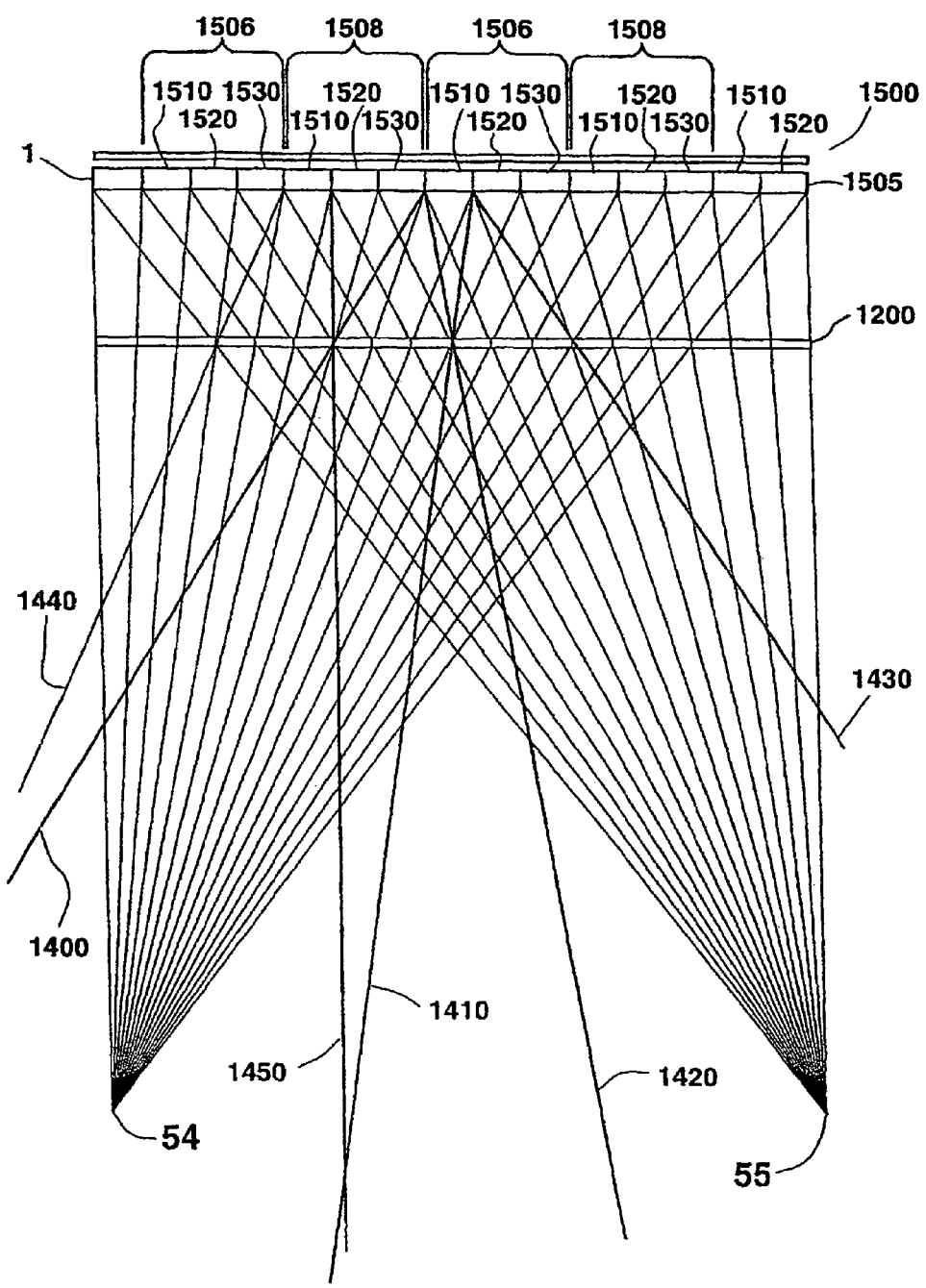
FIG. 41 is a simplified cross-section view of a second system for three-dimensional viewing of a three-color display (e.g., an RGB display), according to the present invention.

FIG. 41 demonstrates that the system of color filtration described with respect to FIG. 40 can also be used to provide stereoscopic vision without eyeglasses, and permit some movement of the viewers' eyes, for displays which do not emit light of discrete colors in an ordered pattern.

In this case display 1500, is of a type in which each picture element may potentially emit light of any spectral characteristics (e.g., a screen projected from behind). Display 1500 includes a frame 1505 divided into first regions 1506 presenting at least a part of a left image and second regions 1508 presenting at least a part of a right image. The system of FIG. 41 further includes a filter layer 1550, which is divided into subareas 1510 allowing the passage of light substantially only within a first spectral range, subareas 1520 allowing the passage of light within substantially only a second spectral range, and subareas 1530 allowing the passage of light substantially only within a third spectral range.

The combined effect of display 1500 together with filter layer 1550 is to provide a system which is characterized and subdivided exactly as described with respect to the light emanating from display 1 of FIG. 40. Therefore, when the term 'display' is used in the claims with respect to these embodiments of the invention, it refers to both options. In other words, a display in this context may be either display 1 of FIG. 40, or the combination of display 1500 and filter layer 1550 of FIG. 41.

The subdivisions and the functionality of light filtering layer 1200, shown in FIG. 41, are as described for the system of FIG. 40, and the significance of lines of sight 1400, 1410, 1420, 1430, 1440 and 1450 is the same as described above with respect to FIG. 40.

Thus FIG. 41 describes a system with the functionality and advantages of the system described by FIG. 40, yet whose display apparatus may be any display emitting light of any colors at any particular point of the display surface.

Hence, the invention described by way of example hereinabove is directed toward systems for three-dimensional viewing and projection aimed at providing means for flatscreen fullcolor stereoscopic vision without eyeglasses or other optical means engaged close to the eyes of the viewer or viewers. Furthermore, some of the systems for three-dimensional viewing according to the present invention do not restrict the viewer to specific position and distance relative to the display, which viewer is thus free to move his head while viewing the display. Yet furthermore, the more advanced systems of the present invention are highly suitable for three-dimensional viewing both for still and motion pictures, yet in contrast with prior art systems do not involve moving parts, some may even be installed using existing hardware such as computers, television sets and projectors.

While the invention has been described with respect to a limited number of embodiments, it will be appreciated that many variations, modifications and other applications of the invention may be made.

What is claimed is:

1. A method comprising:
    emitting, using a display, a plurality of light rays, wherein the display comprises a plurality of first and second sub-regions arranged in an alternating configuration;
    selectively blocking light, using a light blocking layer, wherein the light blocking layer comprises a first polarizing layer, a rotating layer, and a second polarizing layer;
    polarizing, using the first polarizing layer, light emitted by the plurality of first and second sub-regions of the display in a first direction;
    rotating, using the rotating layer, light from the first polarizing layer to a second direction when the rotating layer is active, wherein the rotating layer is not active to change a polarization orientation of polarized light passing therethrough in a first phase, and wherein the rotating layer is active to change the polarization orientation of polarized light passing therethrough in a second phase;
    polarizing, using the second polarizing layer, light from the rotating layer, wherein a plurality of first subareas polarize light in the first direction and a plurality of second subareas polarize light in the second direction, wherein the first and second directions are perpendicular;
    alternating, using a coordinating element, between the first phase and the second phase, wherein light from the first sub-regions of the display is directed to a first eye of a viewer and blocked from a second eye of the viewer and light from the second sub-regions of the display is directed to the second eye and blocked from the first eye in the first phase, wherein light from the first sub-regions of the display is blocked from the first eye and directed to the second eye and light from the second sub-regions of the display is blocked from the second eye and directed to the first eye in the second phase;
    expanding, using a diverging lens, light from the light blocking layer; and
    halting, using a converging lens, an expansion of light from the diverging lens, wherein the light from the converging lens presents a continuous image without blank areas, and wherein the blank areas are caused by the light blocking layer.

2. The method of claim 1, wherein the first and second sub-regions of the display and the first and second subareas of the second polarizing layer are formed as stripes.

3. The method of claim 2, wherein the stripes are formed as vertical stripes.

4. The method of claim 1, wherein a resolution of the continuous image presented on the display is reduced by half by the light blocking layer.

5. The method of claim 1, wherein the diverging lens is comprised of an array of diverging lenticular elements.

6. The method of claim 1, wherein the converging lens is comprised of an array of converging lenticular elements.

7. The method of claim 1, wherein light from the first sub-regions of the display is directed to a first eye of a second viewer and blocked from a second eye of the second viewer and light from the second sub-regions of the display is directed to the second eye of the second viewer and blocked from the first eye of the second viewer in the first phase, wherein light from the first sub-regions of the display is blocked from the first eye of the second viewer and directed to the second eye of the second viewer and light from the second sub-regions of the display is blocked from the second eye of the second viewer and directed to the first eye of the second viewer in the second phase.

8. The method of claim 1, further comprising:
tracking, using a tracking device, the position of the first and second eyes of the viewer relative to a point of origin, wherein the tracking device is fixed relative to the first and second eyes of the viewer.

9. The method of claim 8, wherein the tracking device is a three-dimensional mouse.

10. The method of claim 8, wherein the tracking device is an infrared light emitter.

11. The method of claim 8, wherein the point of origin is the display.

12. A system comprising:
a display configured to emit a plurality of light rays, wherein the display comprises a plurality of first and second sub-regions arranged in an alternating configuration;
a light block layer configured to selectively block light, wherein the light blocking layer comprises a first polarizing layer, a rotating layer, and a second polarizing layer;
the first polarizing layer configured to polarize light emitted by the plurality of first and second sub-regions of the display in a first direction;
the rotating layer configured to rotate light from the first polarizing layer to a second direction when the rotating layer is active, wherein the rotating layer is not active to change a polarization orientation of polarized light passing therethrough in a first phase and the rotating layer is active to change the polarization orientation of polarized light passing therethrough in a second phase;
the second polarizing layer configured to polarize light from the rotating layer, wherein a plurality of first subareas polarize light in the first direction and a plurality of second subareas polarize light in the second direction, wherein the first and second directions are perpendicular;
a coordinating element configured to alternate between the first phase and the second phase, wherein light from the first sub-regions of the display is directed to a first eye of a viewer and blocked from a second eye of the viewer and light from the second sub-regions of the display is directed to the second eye and blocked from the first eye in the first phase, wherein light from the first sub-regions of the display is blocked from the first eye and directed to the second eye and light from the second sub-regions of the display is blocked from the second eye and directed to the first eye in the second phase;
a diverging lens configured to expand light from the light blocking layer; and
a converging lens configured to halt an expansion of light from the diverging lens, wherein the light from the converging lens presents a continuous image without blank areas, and wherein the blank areas are caused by the light blocking layer.

13. The system of claim 12, wherein the first and second sub-regions of the display and the first and second subareas of the second polarizing layer are formed as stripes.

14. The system of claim 12, wherein the stripes are formed as vertical stripes.

15. The method of claim 12, wherein a resolution of the continuous image presented on the display is reduced by half by the light blocking layer.

16. The system of claim 12, wherein the light from the first sub-regions of the display is directed to a first eye of a second viewer and blocked from a second eye of the second viewer and light from the second sub-regions of the display is directed to the second eye of the second viewer and blocked from the first eye of the second viewer in the first phase, wherein light from the first sub-regions of the display is blocked from the first eye of the second viewer and directed to the second eye of the second viewer and light from the second sub-regions of the display is blocked from the second eye of the second viewer and directed to the first eye of the second viewer in the second phase.

17. The system of claim 12, wherein the processor is further configured to:
track, using a tracking device, the position of the first and second eyes of the viewer relative to a point of origin, wherein the tracking device is fixed relative to the first and second eyes of the viewer.

18. The system of claim 17, wherein the tracking device is a three-dimensional mouse.

19. The system of claim 17, wherein the tracking device is an infrared light emitter.

20. The system of claim 17, wherein the point of origin is the display.

* * * * *